United States Patent
Fujita et al.

(10) Patent No.: US 10,655,029 B2
(45) Date of Patent: May 19, 2020

(54) INKJET INK AND COLORING COMPOSITION

(71) Applicants: Takuya Fujita, Kanagawa (JP);
Yoshimasa Miyazawa, Kanagawa (JP);
Hisashi Habashi, Kanagawa (JP);
Tatsuya Tomura, Tokyo (JP);
Tomohiro Inoue, Kanagawa (JP);
Yukishige Kondo, Tokyo (JP); Yutaka Takahashi, Tokyo (JP)

(72) Inventors: Takuya Fujita, Kanagawa (JP);
Yoshimasa Miyazawa, Kanagawa (JP);
Hisashi Habashi, Kanagawa (JP);
Tatsuya Tomura, Tokyo (JP);
Tomohiro Inoue, Kanagawa (JP);
Yukishige Kondo, Tokyo (JP); Yutaka Takahashi, Tokyo (JP)

(73) Assignees: Ricoh Company, Ltd., Tokyo (JP);
Tokyo University of Science Foundation, Tokyo (JP)

( * ) Notice: Subject to any disclaimer, the term of this patent is extended or adjusted under 35 U.S.C. 154(b) by 293 days.

(21) Appl. No.: 15/723,417

(22) Filed: Oct. 3, 2017

(65) Prior Publication Data
US 2018/0094155 A1   Apr. 5, 2018

(30) Foreign Application Priority Data
Oct. 4, 2016  (JP) ................. 2016-196502

(51) Int. Cl.
*C09D 11/38*  (2014.01)
*C09D 11/322*  (2014.01)
*C09D 11/328*  (2014.01)

(52) U.S. Cl.
CPC ............ *C09D 11/38* (2013.01); *C09D 11/322* (2013.01); *C09D 11/328* (2013.01)

(58) Field of Classification Search
None
See application file for complete search history.

(56) References Cited

U.S. PATENT DOCUMENTS

| | | | | |
|---|---|---|---|---|
| 5,785,718 A | * | 7/1998 | Berneth ............... | C09D 11/328 8/436 |
| 2007/0221884 A1 | * | 9/2007 | Hoppe ..................... | A61K 8/25 252/301.28 |
| 2008/0182085 A1 | * | 7/2008 | Oyanagi ................ | C09D 11/36 428/195.1 |
| 2012/0174824 A1 | | 7/2012 | Takenaka et al. | |
| 2014/0198167 A1 | * | 7/2014 | Iftime .................... | B41J 2/2107 347/107 |
| 2016/0075917 A1 | | 3/2016 | Hoshino et al. | |
| 2016/0152845 A1 | | 6/2016 | Okada et al. | |
| 2016/0347962 A1 | | 12/2016 | Okada et al. | |
| 2017/0015102 A1 | | 1/2017 | Nagashima et al. | |
| 2017/0114237 A1 | | 4/2017 | Okubo et al. | |
| 2018/0223117 A1 | * | 8/2018 | Toeda .................. | C09D 11/101 |
| 2019/0211222 A1 | * | 7/2019 | Toeda ..................... | B41M 5/00 |

FOREIGN PATENT DOCUMENTS

| | | |
|---|---|---|
| JP | 2005-036079 | 2/2005 |
| JP | 2009-132641 | 6/2009 |
| JP | 4560611 | 8/2010 |
| JP | 2011-052041 | 3/2011 |
| JP | 2013-203785 | 10/2013 |
| JP | 2014-074127 | 4/2014 |
| JP | 2016-000815 | 1/2016 |
| JP | 5951062 | 6/2016 |
| JP | 2017-165834 | 9/2017 |
| WO | WO2014/021405 A2 | 2/2014 |

OTHER PUBLICATIONS

English translation of JP 2017/165834, dated Sep. 21, 2017; 25 pages.*
Bibliographic Data of JP 2017/165834 obtained from Espacenet, Sep. 21, 2017; 1 page.*

* cited by examiner

*Primary Examiner* — Helene Klemanski
(74) *Attorney, Agent, or Firm* — Oblon, McClelland, Maier & Neustadt, L.L.P.

(57) ABSTRACT

An inkjet ink including: a stilbene-based compound represented by General Formula (1) below;

General Formula (1)

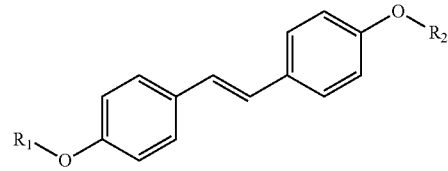

where in the General Formula (1), $R_1$ and $R_3$ each independently represent, for example, an alkyl group including 1 to 20 carbon atoms, an alkenyl group including 1 to 20 carbon atoms, a phenyl group, or a naphthyl group.

5 Claims, No Drawings

INKJET INK AND COLORING COMPOSITION

CROSS-REFERENCE TO RELATED APPLICATIONS

The present application claims priority under 35 U.S.C. § 119 to Japanese Patent Application No. 2016-196502, filed Oct. 4, 2016. The contents of which are incorporated herein by reference in their entirety.

BACKGROUND OF THE INVENTION

Field of the Invention

The present disclosure relates to an inkjet ink and a coloring composition, which are capable of forming an image having a metallic gloss color.

Description of the Related Art

There are many opportunities to see articles having metallic gloss in many situations of daily life because these articles give gorgeous impressions to people. A metal itself may be used to give design characteristics. However, in many cases, design characteristics are given by coating an ink having metallic gloss on a substrate.

As the method of the coating, there have been used a method of the printing through various printing methods by using a printing ink including a pigment having luster property and a method of performing the transfer foil by an adhesive or through heat seal.

Among colors having metallic gloss, gold is particularly a symbol of wealth, and has been popular among people from time immemorial. Therefore, gold is an indispensable color for auspicious events such as the New Year. In addition, silver is also popular because of calm tone and is often seen in many situations. Moreover, silver is different from gold because it can develop various metallic gloss colors including the gold color by mixing a silver-colored ink with another colored ink. Therefore, silver is versatilely used and provides a high value in terms of industrial applications compared to gold.

Conventionally, pigments used for an ink having metallic gloss of silver are, for example, aluminum fine particles and silver powders and the aluminum powders have widely been used in terms of cost. However, the aluminum fine particles have a high specific gravity and are difficult to stably exist in the ink, causing precipitation over time. In some cases, the aluminum fine particles may be adhered to each other to cause hard caking, which is problematic.

In recent years, as a result of development of the inkjet printing technology, there has been increased a need to obtain a print matter having metallic gloss even through inkjet printing. As described in Japanese Unexamined Patent Application Publication No. 2005-036079, for example, commercially available products of squamous aluminum pigments or titanium oxide-coated mica pigments serving as luster pigments are attempted to be used for inkjet inks.

In order to obtain metallic gloss products having various colors, use of an ink composition obtained by mixing a dye with a luster pigment, particularly a metallic luster pigment has been considered. However, use of this ink is problematic because it causes precipitation of the metallic luster pigment over time, resulting in aggregation.

Therefore, there has been developed an organic dye material having metallic gloss (see, Unexamined Patent Application Publication Nos. 2013-203785 and 2009-132641, WO2014-021405, and Japanese Patent No. 4560611). The organic dye material has a small specific gravity relative to a solvent compared to the metallic luster pigment and thus can solve the problems such as precipitation of the luster material in the ink.

In order to develop various colors having metallic gloss (e.g., red-based metallic color), as described in Unexamined Patent Application Publication No. 2016-000815, the color is reproduced by the ink set that includes: the ink composition including the aluminum pigment; the chromatic color composition including the chromatic pigment; and the white color ink composition including the white pigment. However, even in this case, the aluminum pigment is precipitated to cause nozzle clogging, which is problematic.

SUMMARY OF THE INVENTION

According to one aspect of the present disclosure, an inkjet ink includes a stilbene-based compound represented by General Formula (1) below,

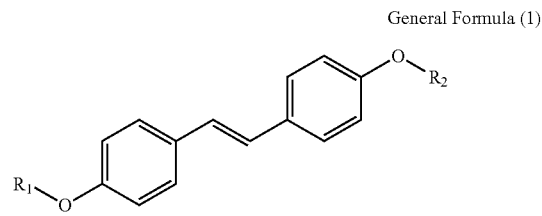

General Formula (1)

In the General Formula (1), $R_1$ and $R_2$ each independently represent an alkyl group including 1 to 20 carbon atoms, an alkenyl group including 1 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—OCOCH_3$;

$R_3$ represents a hydrogen atom an alkali metal atom, or an alkyl group including 1 to 2 carbon atoms;

$R_4$ represents a hydroxy group, an alkoxy group including 1 to 2 carbon atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms;

$R_5$ represents an alkyl group including 1 to 20 carbon atoms, an alkenyl group including 1 to 20 carbon atoms, or a hydroxyalkyl group including 1 to 12 carbon atoms;

$R_6$ represents a hydrogen atom or a methyl group;

$R_7$ represents an alkyl group including 1 to 4 carbon atoms;

$R_8$ represents an alkyl group including 1 to 5 carbon atoms; and n is an integer of from 1 to 12.

DESCRIPTION OF THE EMBODIMENTS (Inkjet Ink)

An inkjet ink of the present disclosure includes a stilbene-based compound represented by General Formula (1) below, preferably includes a coloring material, and further includes an organic solvent, water, a resin, a dispersing agent, a surfactant, and other components, if necessary.

General Formula (1)

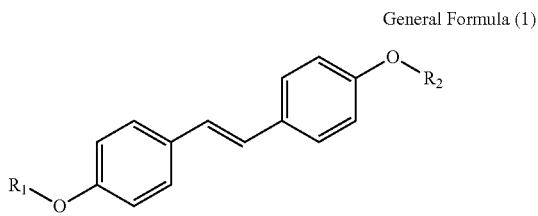

In the General Formula (1), $R_1$ and $R_2$ each independently represent an alkyl group including 1 to 20 carbon atoms, an alkenyl group including 1 to 20 carbon atoms, a phenyl group, a naphthyl group, or a group represented by $-(CH_2)_n-COO-R_3$, $-(CH_2)_n-R_4$, $-(CH_2)_n-CONH-R_5$, $-CR_6R_7-COO-R_8$, or $-(CH_2)_n-OCOCH_3$;

$R_3$ represents a hydrogen atom, an alkali metal atom, or an alkyl group including 1 to 2 carbon atoms!

$R_4$ represents a hydroxy group, an alkoxy group including 1 to 2 carbon atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms;

$R_5$ represents an alkyl group including 1 to 20 carbon atoms, an alkenyl group including 1 to 20 carbon atoms, or a hydroxyalkyl group including 1 to 12 carbon atoms;

$R_6$ represents a hydrogen atom or a methyl group;

$R_7$ represents an alkyl group including 1 to 4 carbon atoms;

$R_8$ represents an alkyl group including 1 to 5 carbon atoms; and n is an integer of from 1 to 12.

The inkjet ink of the present disclosure is based on the finding that the existing ink including, for example, metallic particles is problematic because the ink has large particles of the pigment in the ink, resulting in nozzle clogging and precipitation of the luster pigment.

In addition, the inkjet ink of the present disclosure is based on the following findings. That is, among the existing organic dye material-including inks, an ink including an organic material having silvery gloss and a color pigment has not been developed yet. Moreover, among the organic dye materials having metallic gloss, variation of the metallic gloss color is limited, which makes it difficult to obtain a desirable metallic gloss color.

In general, the metallic gloss means appearance of luster or gloss distinctive of metals and also includes metallic gloss having low luster property achieved by matte. Specifically, presence or absence of metallic gloss is judged by measuring the specular reflectance. The specular reflectance of 10% or more is judged "presence of the metallic gloss". When the specular reflectance is less than 10%, matt tone strongly appears, which may be difficult to be considered as "presence of the metallic gloss".

The silvery gloss of the present disclosure is defined as follows. That is, the specular reflectance is 10% or more, and a* value and b* value in the color value (a* value, b* value) are −3.5 or more but 3.5 or less. When these ranges are not satisfied, yellowish gloss or blueish gloss may appear, which is difficult to be considered as silver. Note that, the silvery origami has specular reflectance of 38%, a* value of −1.2, and b* value of −3.2.

The present disclosure has an object to provide an inkjet ink capable of forming an image having silvery gloss.

According to the present disclosure, it is possible to provide an inkjet ink capable of forming an image having silvery gloss.

<Stilbene-Based Compound>

In order that the stilbene-based compound represented by the General Formula (1) develops silvery gloss, the basic skeleton of the stilbene-based compound is more important than $R_1$ and $R_2$ of the stilbene-based compound. Meanwhile, the $R_1$ and the $R_2$ can be appropriately selected so long as the $R_1$ and the $R_2$ do not adversely affect the properties the basic skeleton has.

In order to develop silvery gloss, it is important for the stilbene-based compound to be a trans structure. A pure cis structure of the stilbene-based compound does not develop silvery gloss. Although the trans structure of the stilbene-based compound has been presented in the General Formula (1), slight incorporation of the cis structure thereof does not largely impart an adverse effect to silvery gloss. Therefore, the cis structure thereof may be incorporated so long as silvery gloss is not adversely affected.

$R_1$ and $R_2$ in the General Formula (1) each independently represent an alkyl group including 1 to 20 carbon atoms, an alkenyl group including 1 to 20 carbon atoms, a phenyl group, a naphthyl group, or any of the other groups.

The alkyl group including 1 to 20 carbon atoms in $R_1$ and $R_2$ in the General Formula (1) is not particularly limited and may be appropriately selected depending on the intended purpose. Examples thereof include a methyl group, an ethyl group, a propyl group, an isopropyl group, a hexyl group, a heptyl group, an octyl group, a 2-ethylhexyl group, a tert-octyl group, a cyclohexyl group, and a 2-methylpentyl group. When the number of carbon atoms is from 1 to 20, crystallinity of the compound can be improved, and silvery gloss can easily be developed. The number of carbon atoms of from 1 to 6 is preferable because it is easy to further develop silvery gloss. These may be used alone or in combination.

The alkenyl group including 1 to 20 carbon atoms in $R_1$ and $R_2$ in the General Formula (1) is not particularly limited and may be appropriately selected depending on the intended purpose. The aforementioned alkenyl group may include one or more carbon-carbon double bonds in its structure. Examples thereof include a vinyl group, a 1-propenyl group, an allyl group, a 2-butenyl group, a 3-butenyl group, an isopropenyl group, an isobutenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a cyclopentenyl group, a cyclohexenyl group, a 1,3-butadienyl group, a cyclohexadienyl group, and a cyclopentadienyl group. When the number of carbon atoms is from 1 to 20, crystallinity of the compound can be improved, and silvery gloss can easily be developed. The number of carbon atoms of from 1 to 6 is preferable because it is easy to further develop silvery gloss. These may be used alone or in combination.

The phenyl group in $R_1$ and $R_2$ in the General Formula (1) may include a substituent so long as it does not adversely affect development of silvery gloss. However, the phenyl group in $R_1$ and $R_2$ in the General Formula (1) is preferably free of the substituent in terms of development of silvery gloss. Examples of the substituent include an alkyl group, an alkenyl group, a hydroxy alkyl group, a hydroxy group, an alkoxy group, an alkenyloxy group, a cyano group, a cyanoalkyl group, a carboxy group, an alkoxycarbonyl group, and an amino group. The number of carbon atoms of an alkyl group portion of the substituent is preferably from 1 to 6. These may be used alone or in combination.

The naphthyl group in $R_1$ and $R_2$ in the General Formula (1) may include a substituent so long as it does not adversely affect development of silvery gloss. However, the naphthyl group in $R_1$ and $R_2$ in the General Formula (1) is preferably free of the substituent in terms of development of silvery gloss. Examples of the substituent include an alkyl group, an alkenyl group, a hydroxy alkyl group, a hydroxy group, an alkoxy group, an alkenyloxy group, a cyano group, a cyanoalkyl group, a carboxy group, an alkoxycarbonyl group, and an amino group. The number of carbon atoms of an alkyl group portion of the substituent is preferably from 1 to 6. These may be used alone or in combination.

Examples of the another group in $R_1$ and $R_2$ in the General Formula (1) include a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—$OCOCH_3$.

The $R_3$ represents a hydrogen atom, an alkali metal atom, or an alkyl group including 1 to 2 carbon atoms.

The $R_4$ represents a hydroxy group, an alkoxy group including 1 to 2 carbon atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms. Among them, a hydroxy group, an alkoxy group including 1 to 2 carbon atoms, a $SO_3Na$ group are preferable.

The $R_5$ represents an alkyl group including 1 to 20 carbon atoms, an alkenyl group including 1 to 20 carbon atoms, or a hydroxyalkyl group including 1 to 12 carbon atoms. Among them, an alkyl group having 1 to 6 carbon atoms and a hydroxyalkyl group including 1 to 6 carbon atoms are preferable.

The $R_6$ represents a hydrogen atom or a methyl group.

The $R_7$ represents an alkyl group including 1 to 4 carbon atoms.

The $R_8$ represents an alkyl group including 1 to 5 carbon atoms. These may be used alone or in combination.

The alkali metal group in the $R_3$ in the General Formula (1) is not particularly limited and may be appropriately selected depending on the intended purpose. Examples thereof include a sodium metal atom and a potassium metal atom. Among them, a sodium metal atom is preferable.

The alkyl group including 1 to 2 carbon atoms in $R_3$ in the General Formula (1) is not particularly limited and may be appropriately selected depending on the intended purpose. Examples thereof include a methyl group and an ethyl group.

The alkoxy group including 1 to 2 carbon atoms in $R_4$ in the General Formula (1) is not particularly limited and may be appropriately selected depending on the intended purpose. Examples thereof include a methoxy group and an ethoxy group.

The alkenyloxy group including 2 to 5 carbon atoms in $R_4$ in the General Formula (1) is not particularly limited and may be appropriately selected depending on the intended purpose. Examples thereof include a methyl vinyl ether group and an ethyl vinyl ether group.

The phenylalkyl group, where an alkyl portion of the phenylalkyl group includes from 1 to 3 carbon atoms, in $R_4$ in the General Formula (1) is not particularly limited and may be appropriately selected depending on the intended purpose. Any portion of the phenyl group portion may include a substituent so long as it does not adversely affect development of silvery gloss. Examples of the substituent include an alkyl group, an alkenyl group, a hydroxy alkyl group, a hydroxy group, an alkoxy group, an alkenyloxy group, a cyano group, a cyanoalkyl group, a carboxy group, an alkoxycarbonyl group, and an amino group. The number of carbon atoms in an alkyl group portion of the substituent is preferably from 1 to 6. These may be used alone or in combination.

The naphthylalkyl group, where an alkyl portion of the naphthylalkyl group includes from 1 to 3 carbon atoms, in $R_4$ in the General Formula (1) is not particularly limited and may be appropriately selected depending on the intended purpose. Any portion of the naphthyl group portion may include a substituent so long as it does not adversely affect development of silvery gloss. Examples of the substituent include an alkyl group, an alkenyl group, a hydroxy alkyl group, a hydroxy group, an alkoxy group, an alkenyloxy group, a cyano group, a cyanoalkyl group, a carboxy group, an alkoxycarbonyl group, and an amino group. The number of carbon atoms of the alkyl group portion of the substituent is preferably from 1 to 6. These may be used alone or in combination.

The alkyl group including 1 to 20 carbon atoms in $R_5$ in the General Formula (1) is not particularly limited and may be appropriately selected depending on the intended purpose. Examples thereof include a methyl group, an ethyl group, a propyl group, a butyl group, a pentyl group, a hexyl group, a heptyl group, an octyl group, a nonyl group, a decyl group, a dodecyl group, an octadecyl group, a trifluoromethyl group, an isopropyl group, an isobutyl group, an isopentyl group, a 2-ethylhexyl group, a sec-butyl group, a tert-butyl group, a sec-pentyl group, a tert-pentyl group, a tert-octyl group, a neopentyl group, a cyclopropyl group, a cyclobutyl group, a cyclopentyl group, and a cyclohexyl group. When the number of carbon atoms is from 1 to 20, the compound can be improved in crystallinity. As a result, it is easy to develop silvery gloss.

The alkenyl group including 1 to 20 carbon atoms in $R_5$ in the General Formula (1) is not particularly limited and may be appropriately selected depending on the intended purpose. The aforementioned alkenyl group may include one or more carbon-carbon double bonds in its structure. Examples of the alkenyl group include a vinyl group, a 1-propenyl group, an allyl group, a 2-butenyl group, a 3-butenyl group, an isopropenyl group, an isobutenyl group, a 1-pentenyl group, a 2-pentenyl group, a 3-pentenyl group, a 4-pentenyl group, a 1-hexenyl group, a 2-hexenyl group, a 3 hexenyl group, a 4-hexenyl group, a 5-hexenyl group, a cyclopentenyl group, a cyclohexenyl group, a 1,3-butadienyl group, a cyclohexadienyl group, and a cyclopentadienyl group. When the number of carbon atoms is 1 to 20, the compound can be improved in crystallinity. As a result, it is easy to develop silvery gloss.

The hydroxyalkyl group including 1 to 12 carbon atoms in $R_5$ in the General Formula (1) is not particularly limited and may be appropriately selected depending on the intended purpose. Examples thereof include —$(CH_2)_2$—OH and —$(CH_2)_{12}$—OH.

$R_6$ in the General Formula (1) is, for example, a hydrogen atom and a methyl group.

The alkyl group including 1 to 4 carbon atoms in $R_7$ in the General Formula (1) is not particularly limited and may be appropriately selected depending on the intended purpose. Examples thereof include a methyl group, an ethyl group, a propyl group, a butyl group, an isopropyl group, and an isobutyl group.

The alkyl group including 1 to 5 carbon atoms in $R_8$ in the General Formula (1) is not particularly limited and may be appropriately selected depending on the intended purpose. Examples thereof include a methyl group, an ethyl group, a propyl group, a butyl group, an isopropyl group, an isobutyl group, a sec-butyl group, a tert butyl group, an isopentyl group, a neo-pentyl group, and a tert-pentyl group.

In $R_1$ and $R_2$ in the General Formula (1), n is an integer of from 1 to 12. When the n is from 1 to 12, the compound is improved in crystallinity. As a result, it is easy to develop silvery gloss.

Specific examples of the stilbene-based compound of the present disclosure, but are not limited to, the following compounds. All of the compounds exhibit silvery gloss.

<<Compound Group a>>

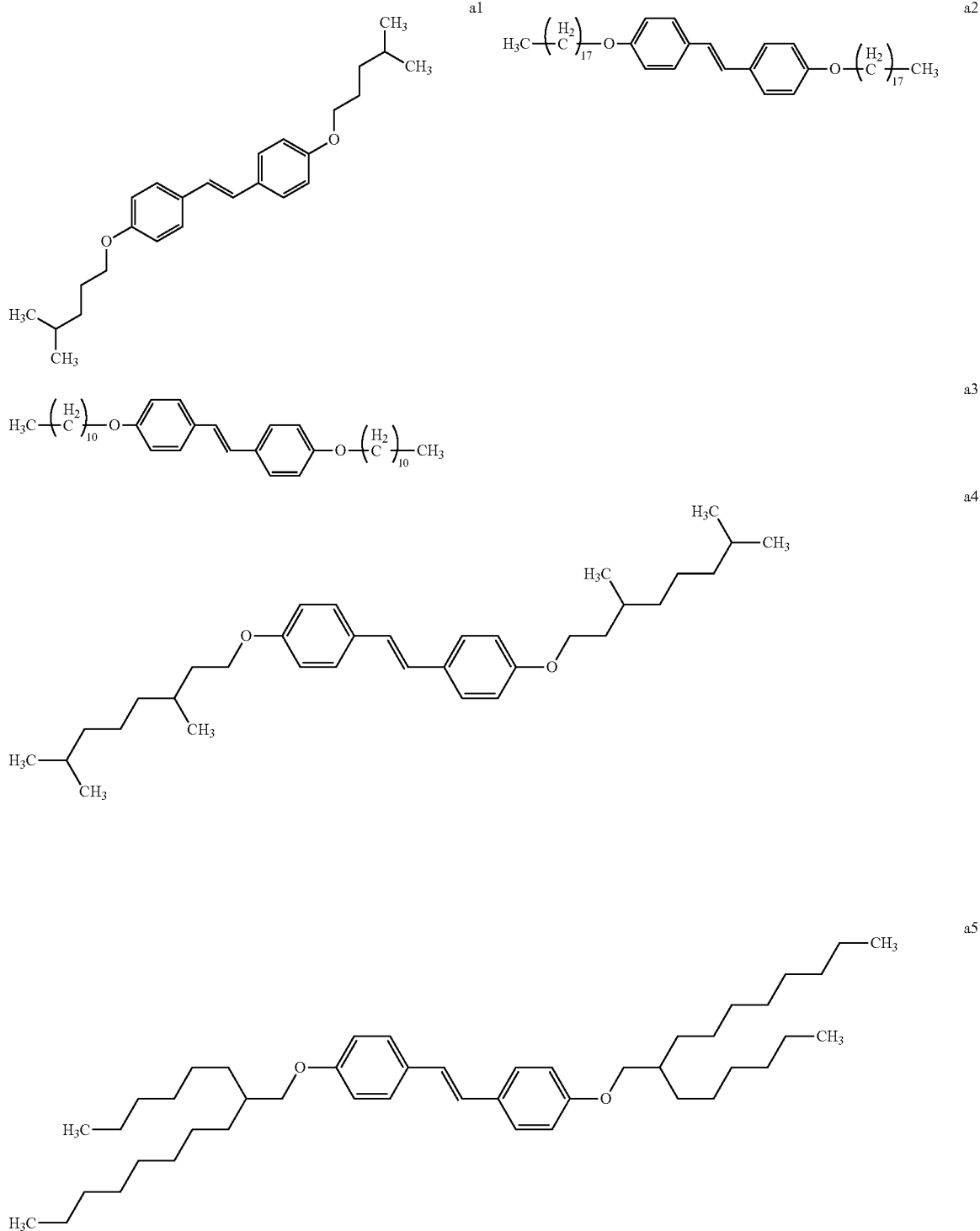

-continued
a6
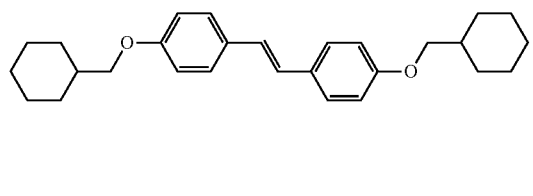
a7
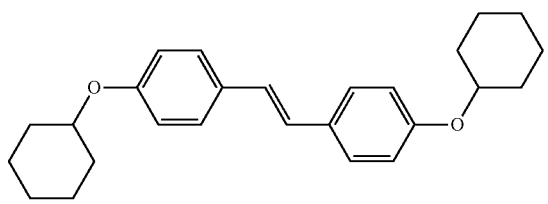
a8
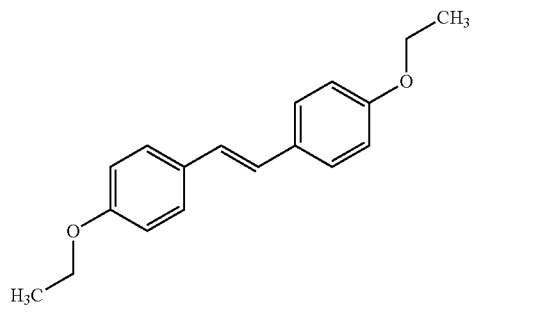
a9
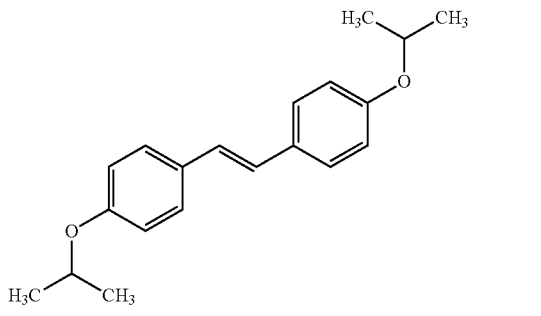
a10
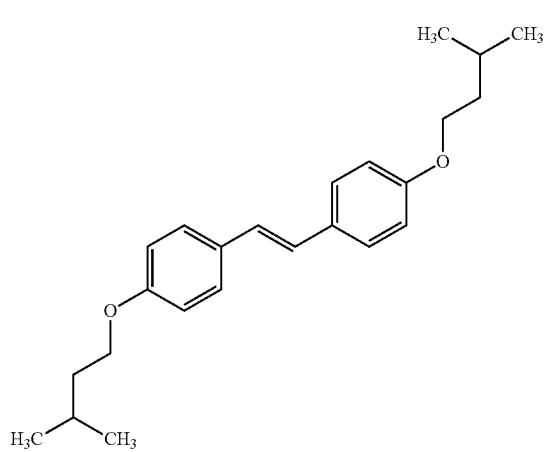
<<Compound Group b>>
b1
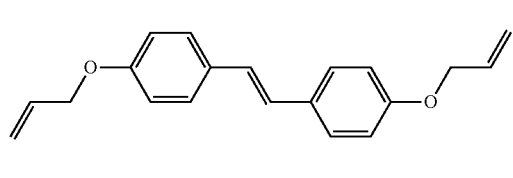
b2
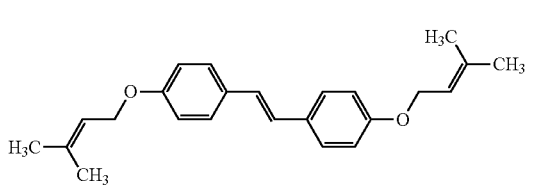
b3
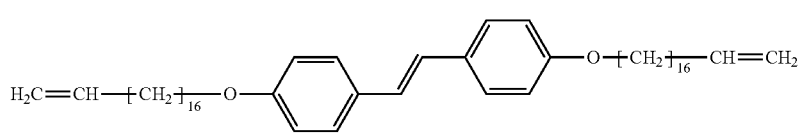
<<Compound Group c>>
c1
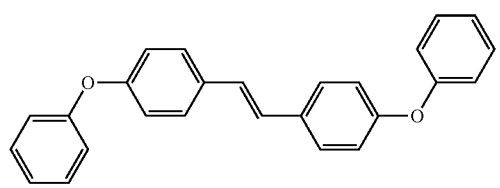
c2
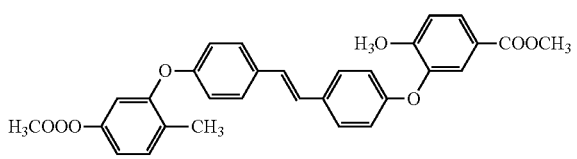

-continued
c3
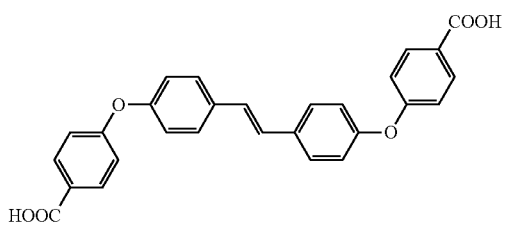
c4
c5
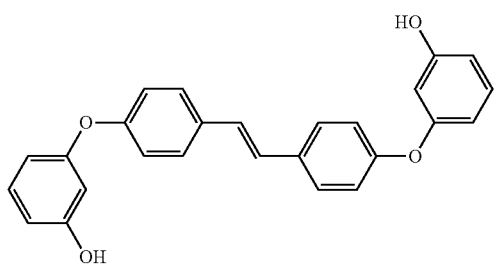
c6
c7
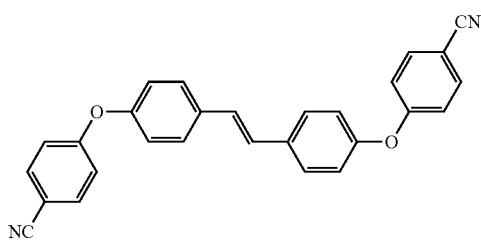
c8
c9
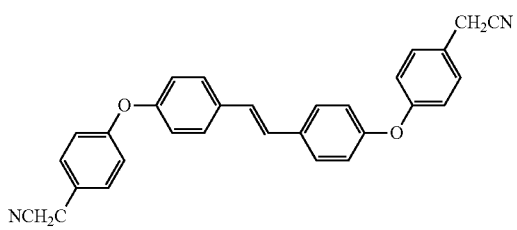
c10
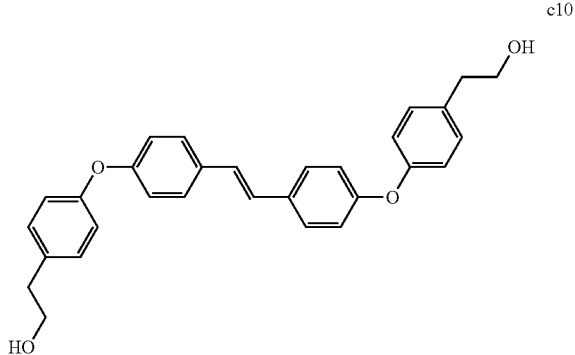
c11
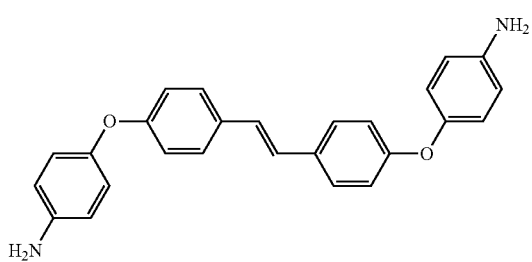

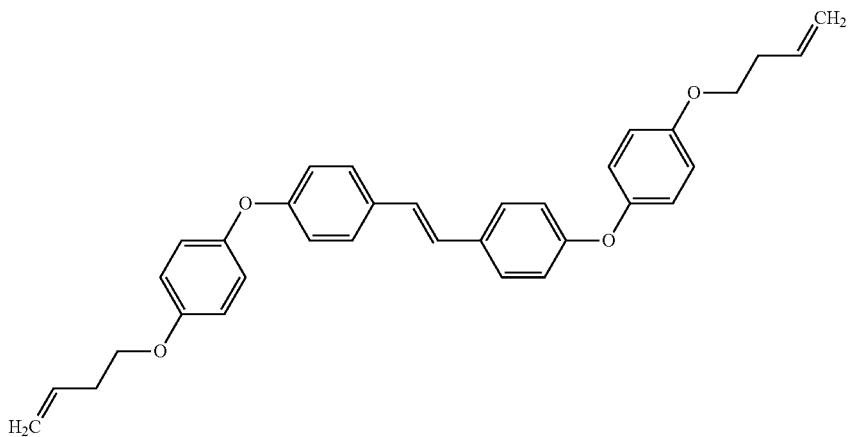
c12
<<Compound Group d>>
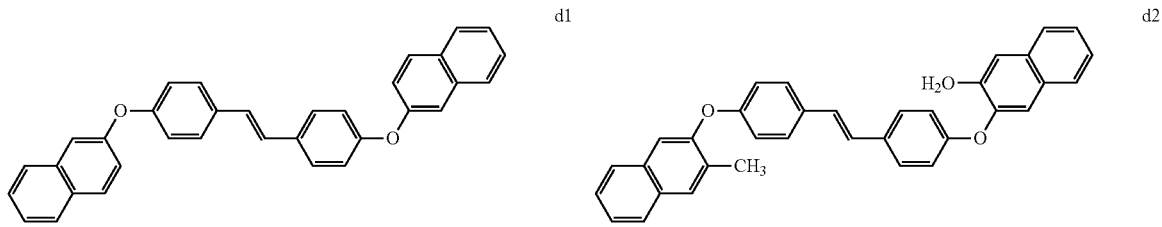
d1    d2
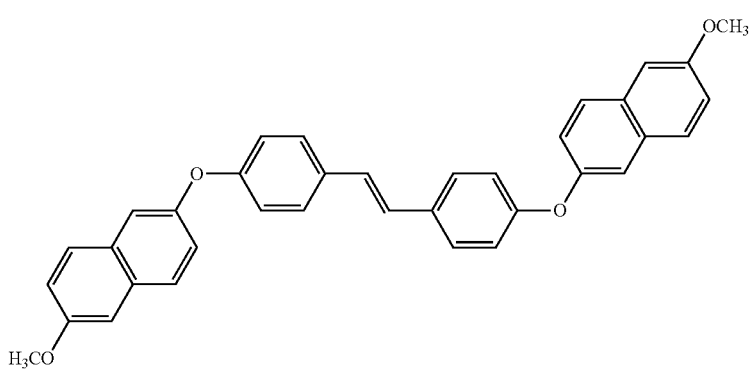
d3
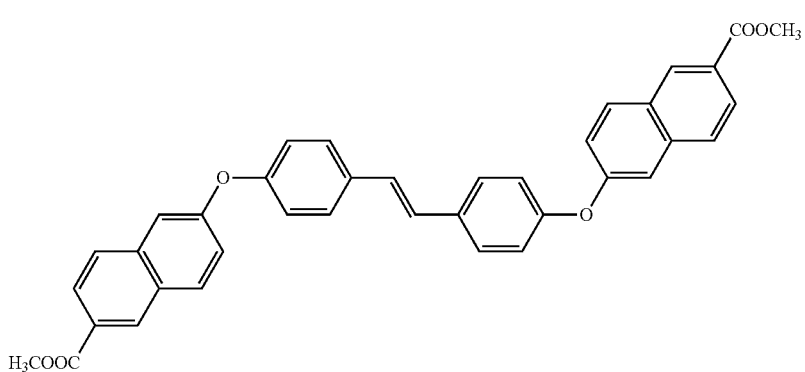
d4

-continued
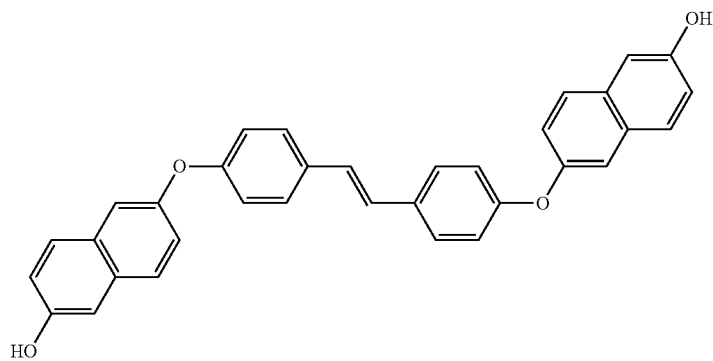
d5
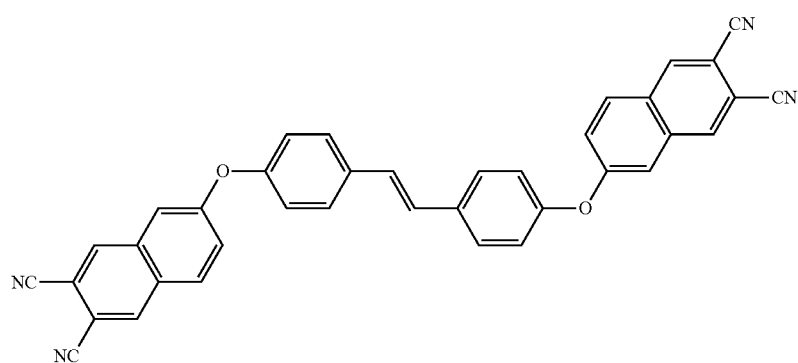
d6
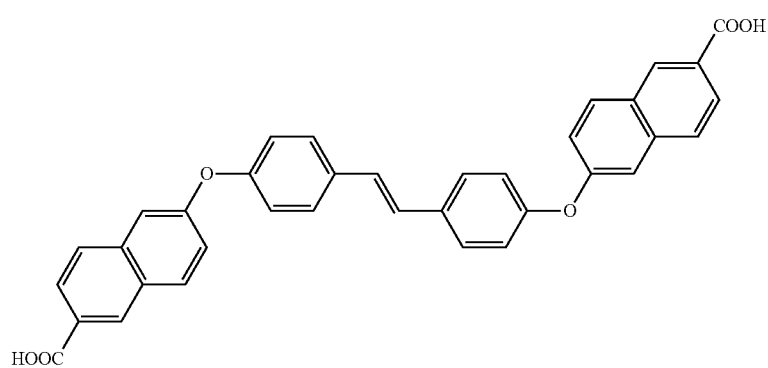
d7
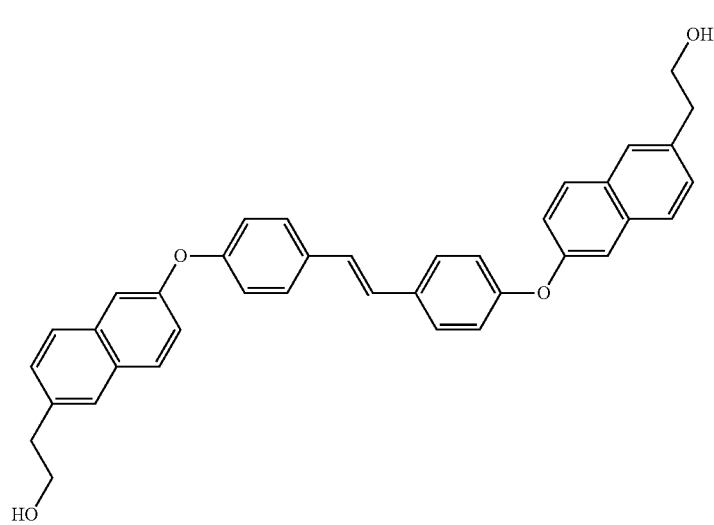
d8

-continued
d9
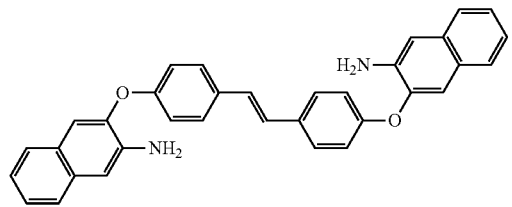
d10
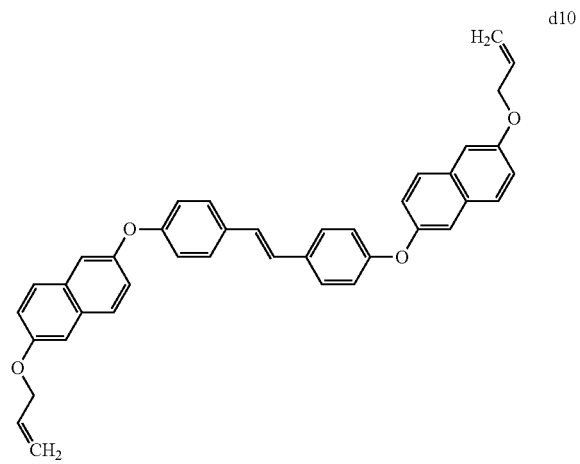
<<Compound Group e>>
e1
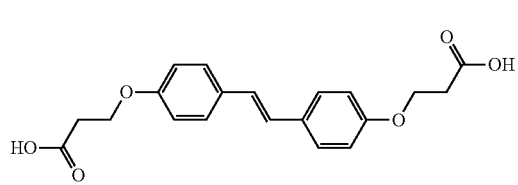
e2
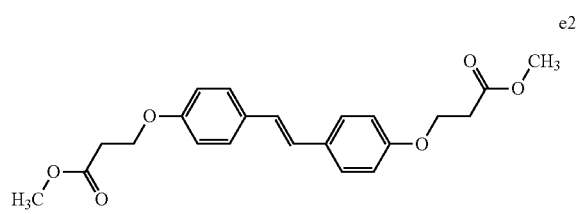
e3
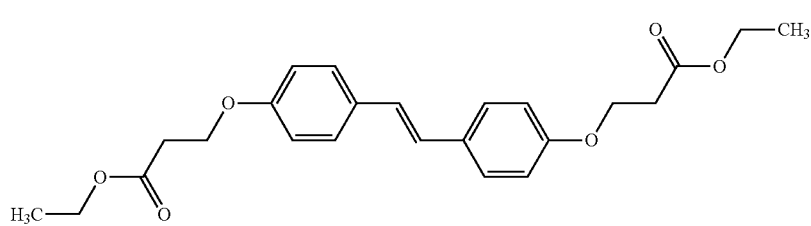
e4
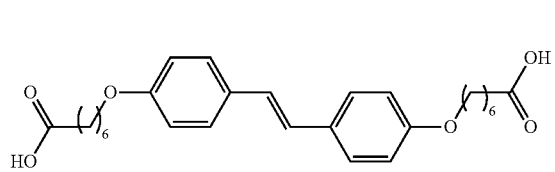
e5
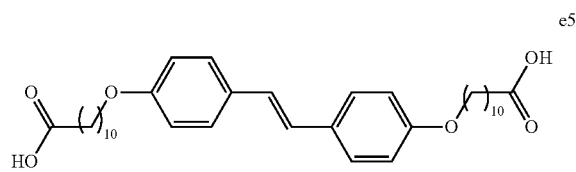

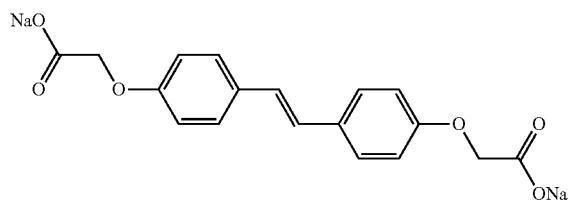
e6
<<Compound Group f>>
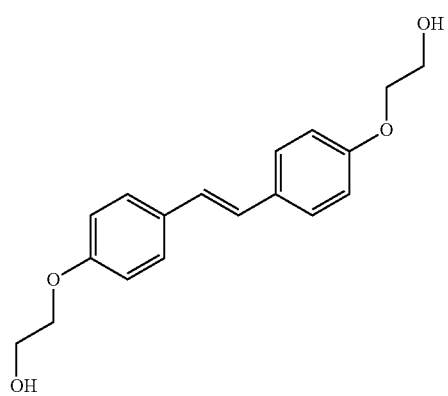
f1
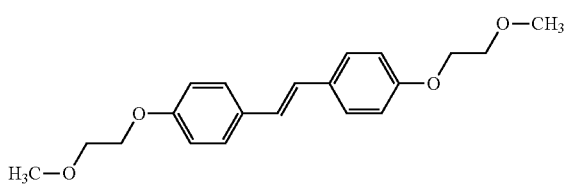
f2
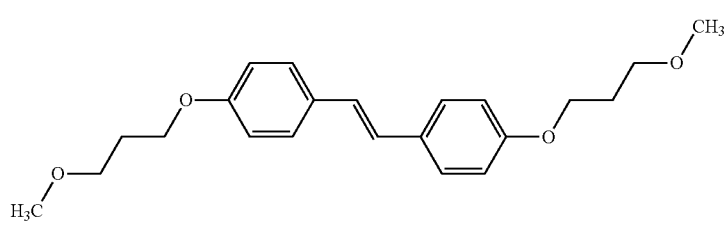
f3
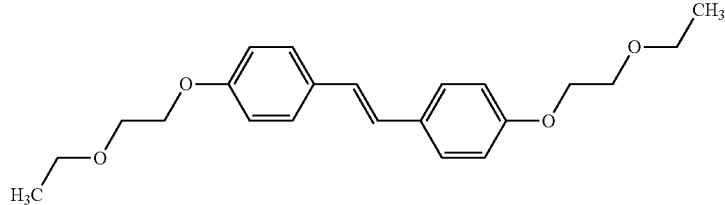
f4
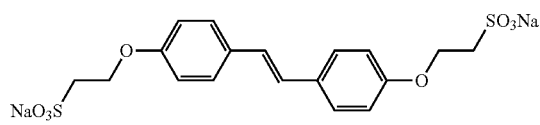
f5
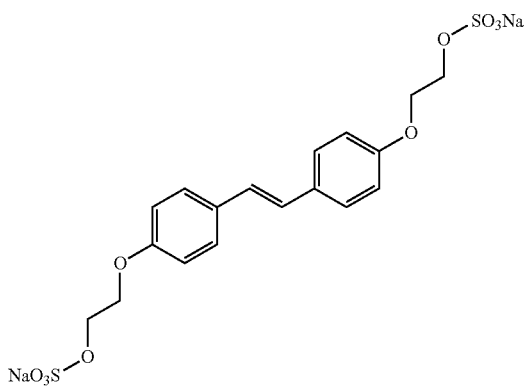
f6

-continued
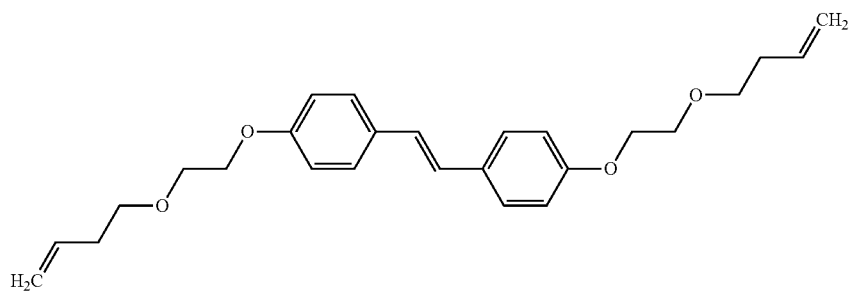
f7
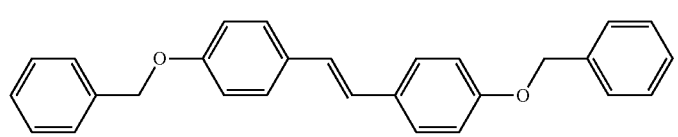
f8
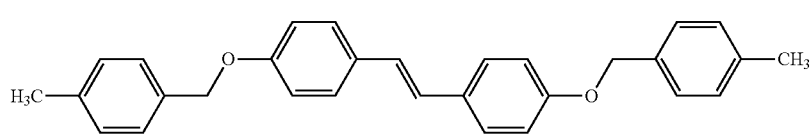
f9
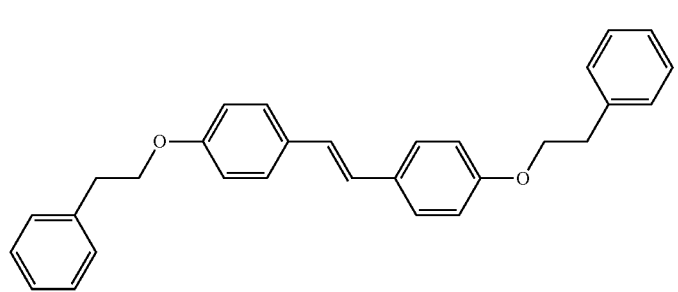
f10
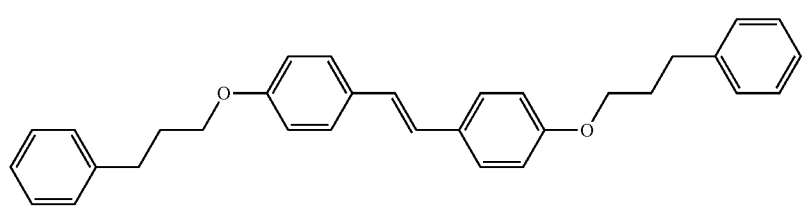
f11
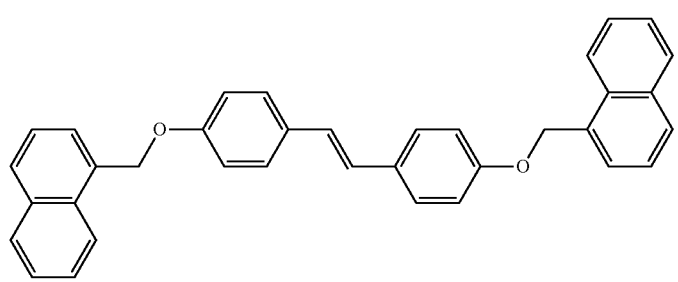
f12
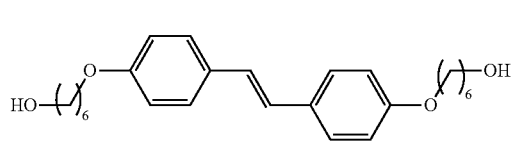
f13
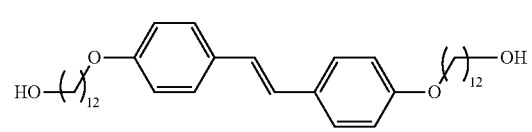
f14

-continued
<<Compound Group g>>
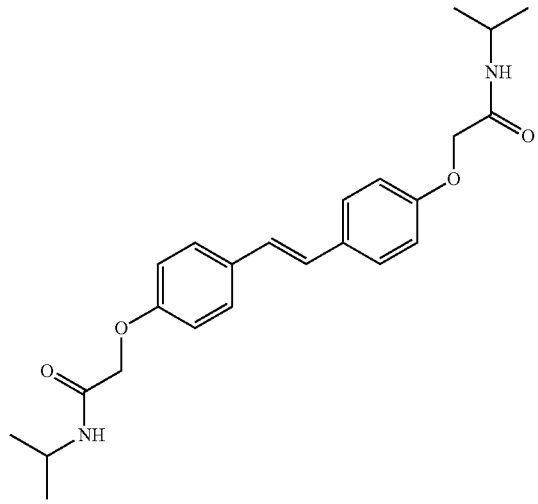
g1
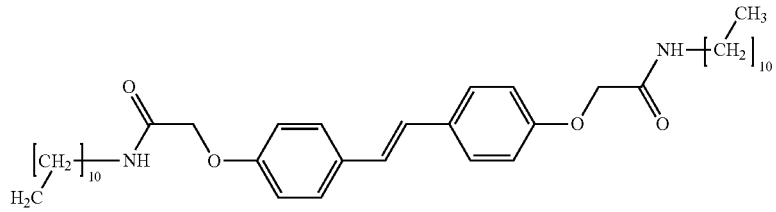
g2
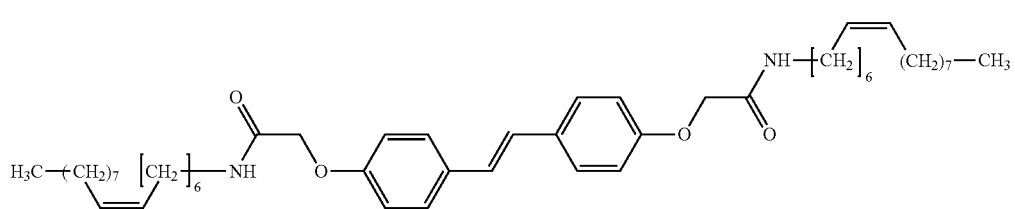
g3
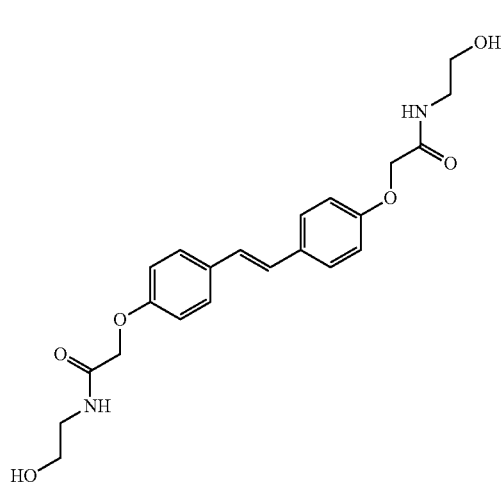
g4
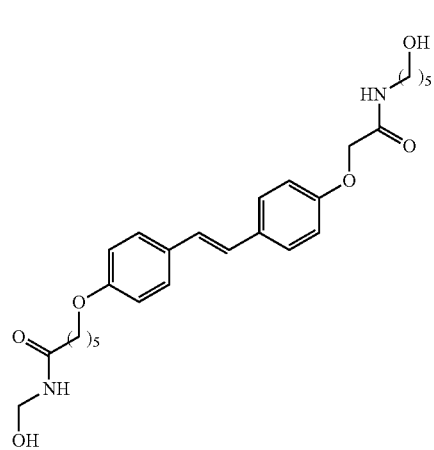
g5

-continued
g6
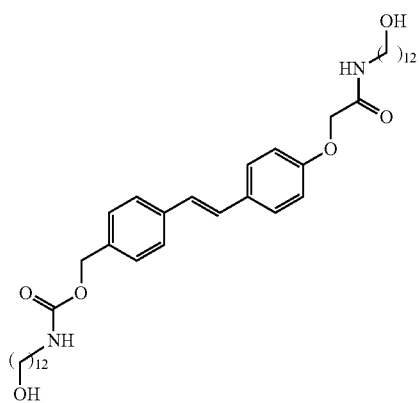
g7
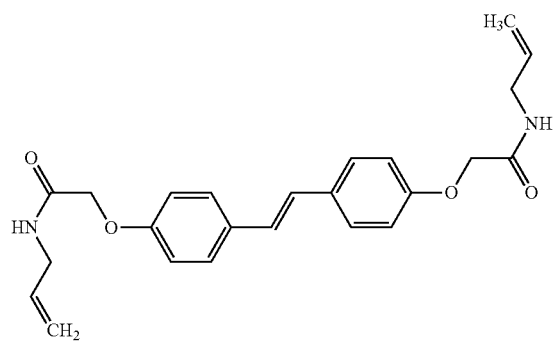
g8
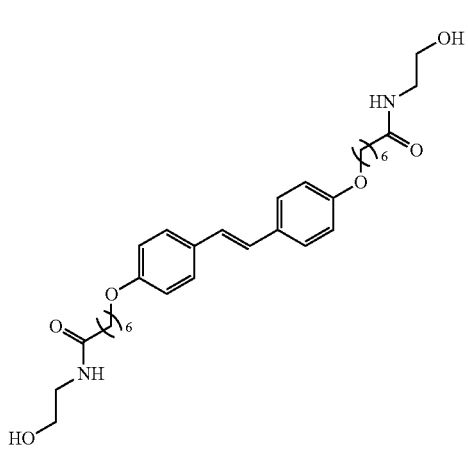
g9
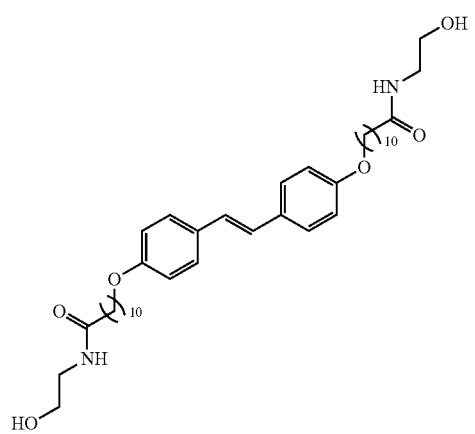
<<Compound Group h>>
h1
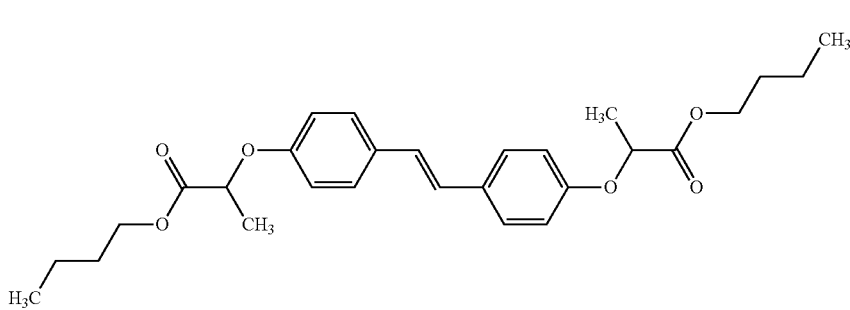

-continued
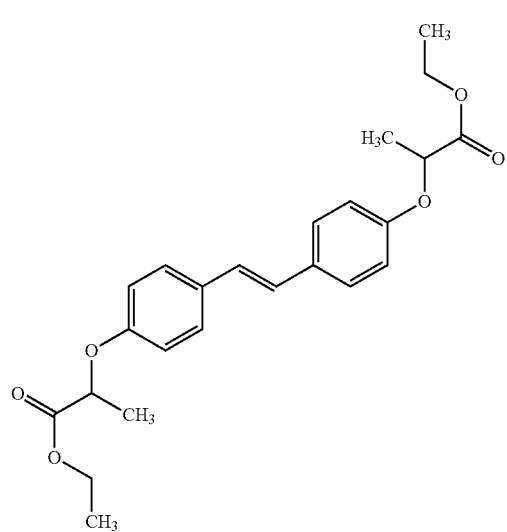 h2
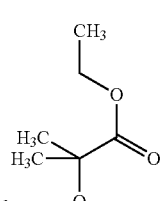 h3
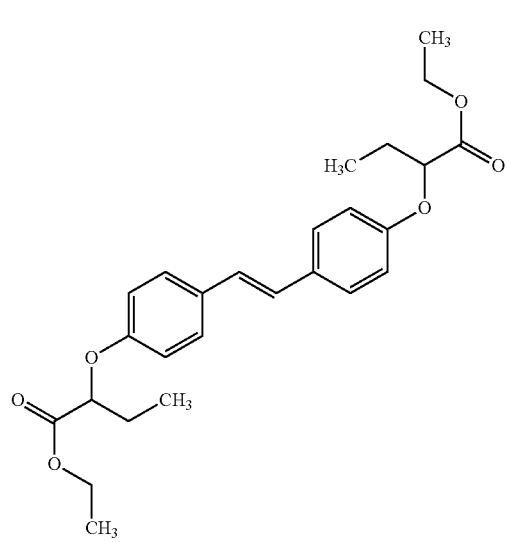 h4
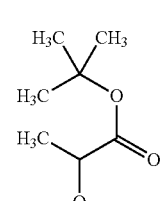 h5
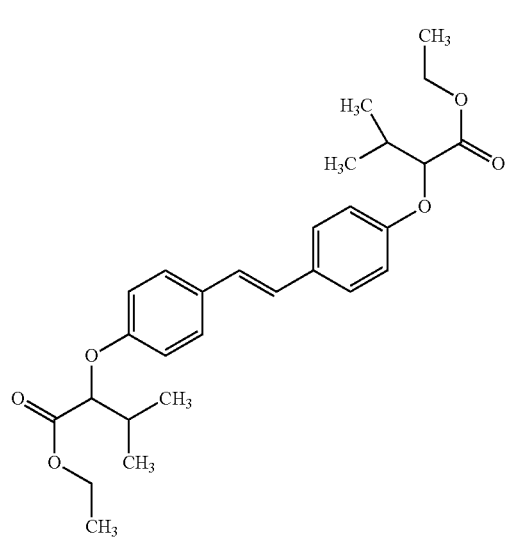 h6

<<Compound Group i>>
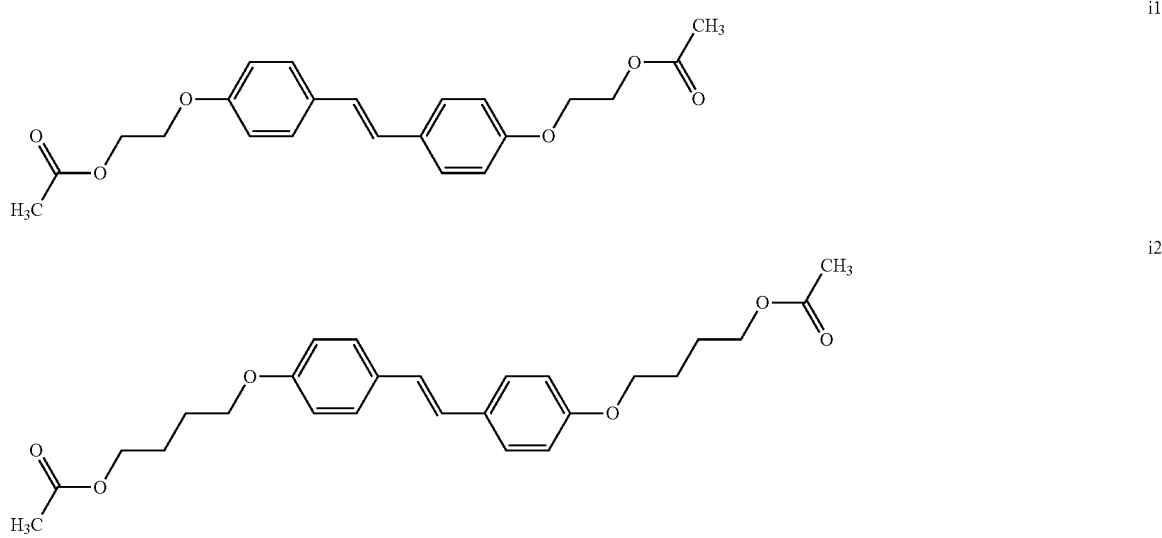
<<Compound Group j>>
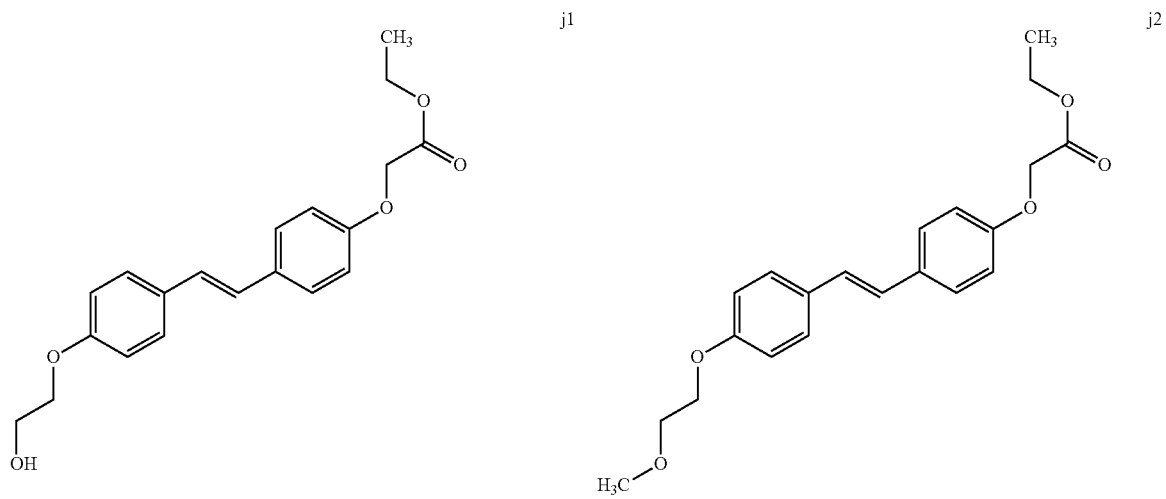
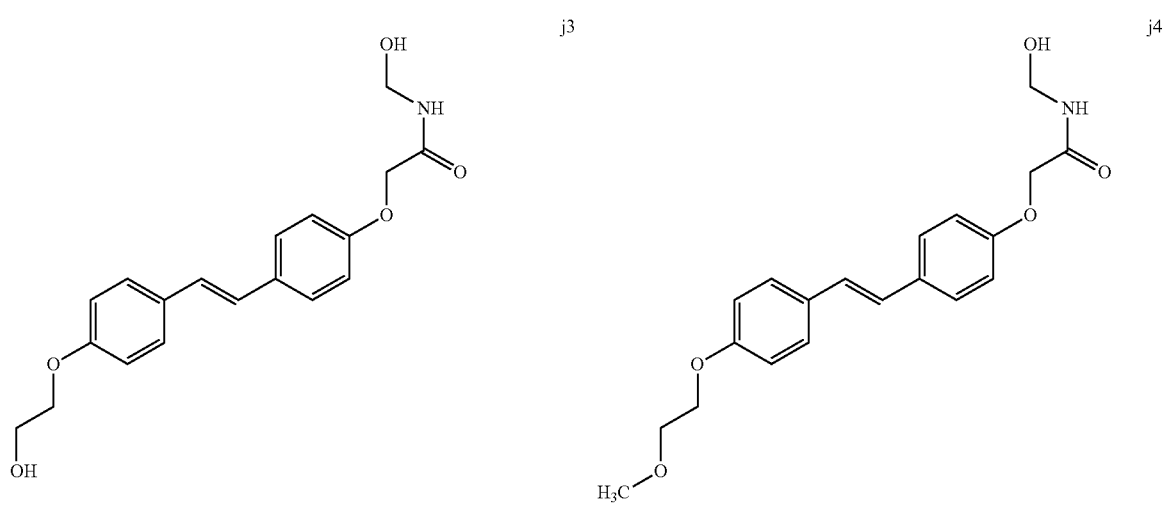

-continued

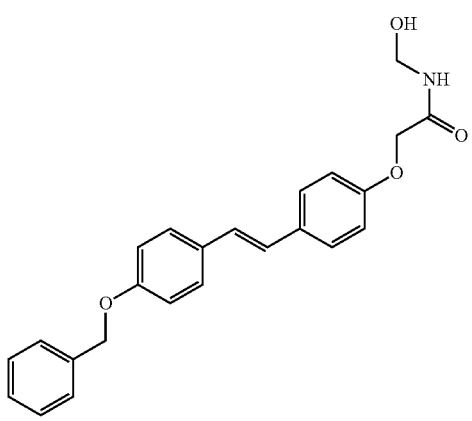
j5

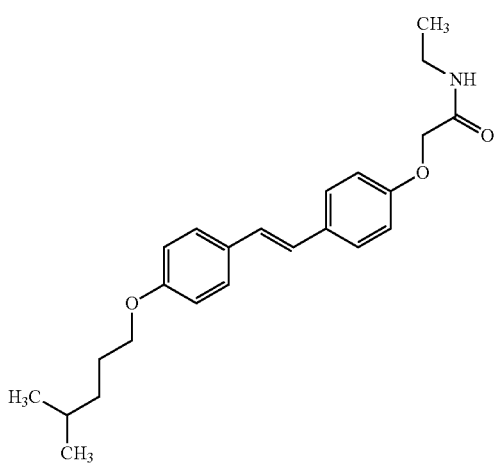
j6

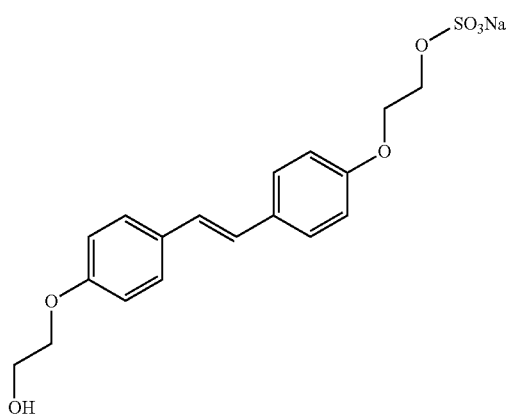
j7

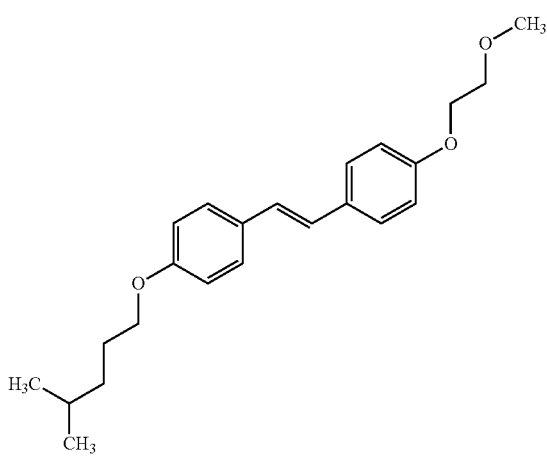
j8

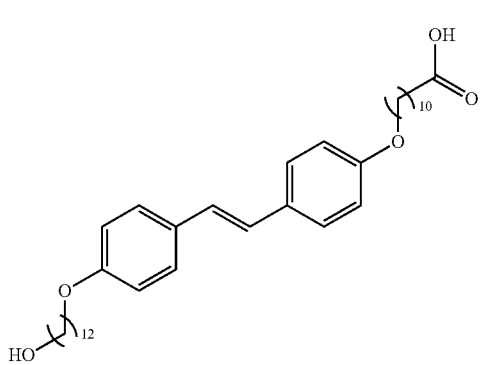
j9

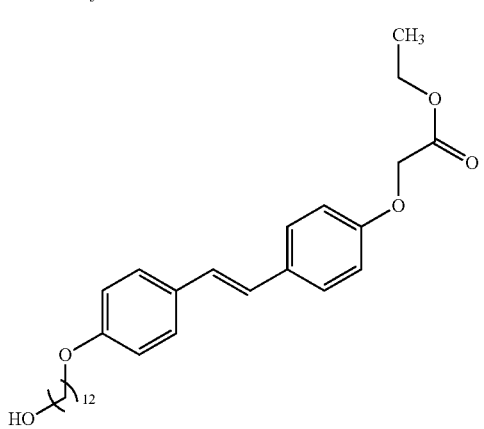
j10

Among these structures, the compounds b2, c1, d1, e1, e2, e6, f1, f4, f5, f6, f8, f12, g1, g3, g4, h2, i1, j1, and the compounds in the Compound Group a are preferable. The compounds b2, e2, e6, f1, f4, and the compounds in the Compound Group a are more preferable, the compounds a1 and a8 are still more preferable, the compound a1 is particularly preferable, because it is easy for these compounds to form a scaly crystalline structure necessary for development of silvery gloss.

The stilbene-based compound may be an appropriately synthesized product. A method for synthesizing the stilbene-based compound is not particularly limited and may be appropriately selected depending on the intended purpose. The method can be performed as presented below, for example.

A recovery flask (100 mL) equipped with a reflux tube is charged with titanocene dichloride and zinc powders. Then, dehydrated THF (free of a stabilizer) is added to the resultant product under a nitrogen atmosphere. The solution obtained is stirred until the color of the solution changes from red to green at room temperature. Next, the solution is allowed to start reflux, and intermediate X and intermediate Y are added thereto. The reaction mixture is refluxed for 8 hours and is cooled to room temperature. Then, it is quenched with tert-butyl methyl ether, and the solution obtained is filtrated. The solvent is removed under reduced pressure, and the residue is dissolved in chloroform. The chloroform solution obtained is separated using hydrochloric acid (1 N) and saturated saline and is dried with magnesium sulfate. The solvent is removed under reduced pressure to obtain a stilbene-based compound represented by the General Formula (1), as presented in the following (Reaction Scheme A). When the stilbene-based compound is synthesized by the typical method described below, the trans stilbene-based compound can be obtained in a high yield.

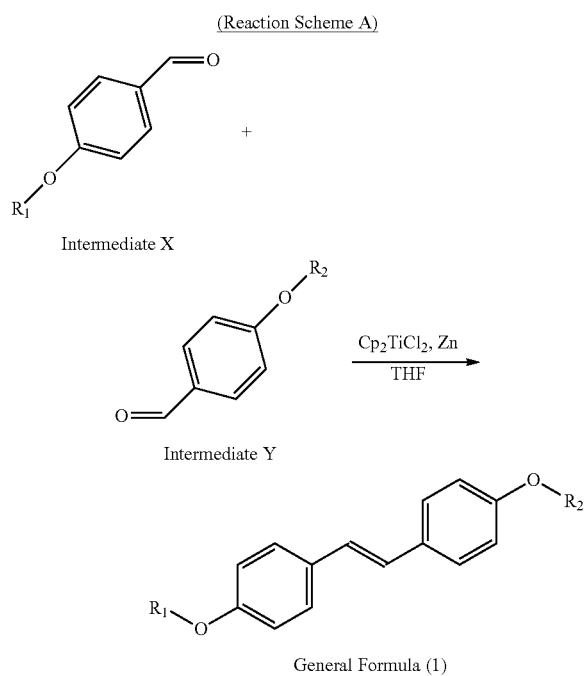

(Reaction Scheme A)

Intermediate X

Intermediate Y

General Formula (1)

An amount of the stilbene-based compound is preferably 1.0% by mass or more but 30.0% by mass or less, more preferably 3.0% by mass or more but 25.0% by mass or less, relative to the total amount of the coloring composition. When the amount is 1.0% by mass or more but 30.0% by mass or less, an image excellent in the metallic gloss can be obtained.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 to 15 percent by mass and more preferably from 1 to 10 percent by mass in terms of enhancement of image density, fixability, and discharging stability.

<Organic Solvent>

As the aforementioned organic solvent, an organic solvent used for the typical ink can be used.

Examples of the organic solvent include:

alcohols (e.g., methyl alcohol, ethyl alcohol, n-propyl alcohol, isopropyl alcohol, n-butyl alcohol, tridecyl alcohol, cyclohexyl alcohol, and 2-methylcyclohexyl alcohol);

glycols (e.g., ethylene glycol, diethylene glycol, triethylene glycol, polyethylene glycol, propylene glycol, dipropylene glycol, and glycerin);

glycol ethers (e.g., ethylene glycol monomethyl ether, ethylene glycol monoethyl ether, ethylene glycol monobutyl ether, ethylene glycol diethyl ether, ethylene glycol dimethyl ether, diethylene glycol monomethyl ether, diethylene glycol monoethyl ether, diethylene glycol monobutyl ether, diethylene glycol ethyl methyl ether, diethylene glycol dimethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, diethylene glycol monomethyl ether acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl ether acetate, diethylene glycol monobutyl ether acetate, and triethylene glycol monobutyl ether);

esters (e.g., ethyl acetate, isopropylene acetate, n-butyl acetate, methyl lactate, ethyl lactate, and butyl lactate);

ketones (e.g., acetone, methyl ethyl ketone, methyl isobutyl ketone, cyclohexanone, isophorone, and diacetone alcohol); and others (e.g., toluene, xylene, acetonitrile, γ-butyrolactone, and γ-valerolactone). In terms of compatibility with respect to properties of head nozzles during printing, safety, and drying ability, various solvents are selected from the aforementioned solvents, mixture of one or more solvents can be used if necessary.

These may be used alone or in combination.

Among them, solvents including glycol ethers are preferable, and diethylene glycol ethyl methyl ether, diethylene glycol diethyl ether, diethylene glycol dibutyl ether, dipropylene glycol monomethyl ether, dipropylene glycol dimethyl ether, propylene glycol monomethyl ether acetate, diethylene glycol monoethyl ether acetate, and diethylene glycol monobutyl ether acetate are more preferable because they are excellent in printing property.

An amount of the organic solvent is preferably 1.0% by mass or more but 40% by mass or less, more preferably 3.0% by mass or more but 30% by mass or less relative to the total amount of the coloring composition in terms of moisture retaining property of the coloring composition, solubility of the stilbene-based compound, improvement of dispersibility, and effective permeation of the coloring composition into a print medium.

<Water>

The water is not particularly limited and may be appropriately selected depending on the intended purpose. Examples thereof include pure waters (e.g., ion exchanged water, ultrafiltrated water, reverse osmotic water, and distilled water) and ultrapure water. These may be used alone or in combination.

When the stilbene-based compound, which is a colorant capable of forming an image having silvery gloss, is dissolved or dispersed in a medium, all of the resultant products can be used as the coloring composition. The medium used is preferably water, a mixture solvent of water and an aqueous organic solvent, or an organic solvent. The organic solvent used is particularly preferably a solvent that prevents the coloring composition from drying. The water used is preferably ion exchanged water, rather than typical water including various ions.

An amount of the water in the coloring composition is not particularly limited and may be appropriately selected depending on the intended purpose. The amount is preferably 30% by mass or more but 95% by mass or less in terms of solubility of the stilbene-based compound in the coloring composition, discharge stability of the coloring composition, and prevention of nozzle clogging at tip of the nozzle.

<Resin>

The type of the resin contained in the ink has no particular limit. Specific examples thereof include, but are not limited to, urethane resins, polyester resins, acrylic-based resins, vinyl acetate-based resins, styrene-based resins, butadiene-based resins, styrene-butadiene-based resins, vinylchloride based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The resin preferably exists as a resin emulsion in the coloring composition.

As the resin emulsion, a commercially available product can be used. Examples thereof include ACRIT WEM-321U (acrylic urethane aqueous emulsion, available from Taisei Kako Co., Ltd.).

<Dispersing Agent>

In order to disperse the stilbene-based compound according to the present disclosure in a medium, a dispersing agent may be used. As the dispersing agent, a chemically synthesized surfactant (e.g., ionic surfactants and nonionic surfactants) can be used. In addition, a surfactant originated from natural products or this surfactant modified with, for example, an enzyme can be used.

As the dispersing agent, a commercially available product can be used. Examples thereof include DISPERBYK-190 (available from BYK-Chemie).

An amount of the dispersing agent is preferably 0.5% by mass or more but 20% by mass or less relative to the total amount of the coloring composition in order to favorably retain dispersion stability of the stilbene-based compound according to the present disclosure.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluorosurfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

Examples of the fluorosurfactants include PolyFox PF-156A (available from Omnova).

<Other Components>

In addition to the aforementioned components, the coloring composition of the present disclosure may include a pH regulator, a preservative, a fungicide, and various additives if necessary, in order to obtain the ink indicating desired physical property values within such a range that the effects of the present disclosure are not inhibited.

<pH Regulator>

The pH regulator has no particular limit. It is preferable to adjust the pH to 7 or higher. Specific examples thereof include, but are not limited to, amines such as diethanol amine and triethanol amine.

<Preservatives and Fungicides>

The preservatives and fungicides are not particularly limited. A specific example is 1,2-benzisothiazolin-3-one.

How to use the ink is not limited to the inkjet printing method. Specific examples of such methods other than the inkjet printing method include, but are not limited to, blade coating methods, gravure coating methods, bar coating methods, roll coating methods, knife coating methods, dip coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

Moreover, image forming, recording, printing, etc. in the present disclosure represent the same meaning.

(Coloring Composition)

A coloring composition of the present disclosure includes a stilbene-based compound represented by General Formula (I) below and a coloring material, and further includes an organic solvent, water, a resin, a surfactant, and other components, if necessary.

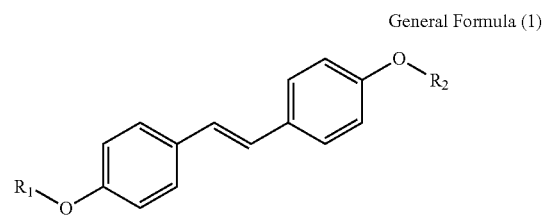

General Formula (1)

In the General Formula (1), $R_1$ and $R_4$ each independently represent an alkyl group including 1 to 20 carbon atoms, an alkenyl group including 1 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_6$, or —$(CH_2)_n$—OCOCH$_3$;

$R_3$ represents a hydrogen atom, an alkali metal atom, or an alkyl group including 1 to 2 carbon atoms.

$R_4$ represents a hydroxy group, an alkoxy group including 1 to 2 carbon atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms;

$R_5$ represents an alkyl group including 1 to 20 carbon atoms, an alkenyl group including 1 to 20 carbon atoms, or a hydroxyalkyl group including 1 to 12 carbon atoms;

$R_6$ represents a hydrogen atom or a methyl group;

$R_7$ represents an alkyl group including 1 to 4 carbon atoms;

$R_8$ represents an alkyl group including 1 to 5 carbon atoms; and n is an integer of from 1 to 12.

The coloring composition of the present disclosure is based on the finding that the existing inks including, for example, metallic particles are problematic because these inks have large particles of the pigment in the ink, resulting in nozzle clogging and precipitation of the luster pigment.

In addition, the coloring composition of the present disclosure is based on the finding that an organic dye material having silvery gloss that is the most versatilely used has not been proposed and an ink excellent in silvery gloss has not been developed yet with respect to the existing ink including an organic dye material, which is problematic.

According to the present disclosure, it is possible to provide a coloring composition capable of forming an image having silvery gloss.

Here, an evaluation method of the metallic gloss is as follows.

Specifically, presence or absence of metallic gloss is judged by measuring glossiness at a measuring angle of 60°.

The glossiness of 30 or more is judged "presence of the metallic gloss". When the glossiness is less than 30, matt tone strongly appears, which may be difficult to be considered as "presence of the metallic gloss".

Note that, a color sample of the metallic print matter (product name: PANTONE PLUS PREMIUM METALLIC GUIDE/coat paper PMC1.2 silver, available from PANTONE) has glossiness of 71.8 at a measuring angle of 60°.

According to the present disclosure, addition of the stilbene-based compound and the coloring material to the coloring composition makes it possible to obtain an image having a metallic gloss color. When the coloring composition is applied to a print medium, it is easy for the coloring material to penetrate into the print medium. However, the stilbene-based compound does not penetrate into the print medium because of a size of its crystal and forms a coated film having metallic gloss on the surface of the print medium. As a result, it was found that the coated film of the stilbene-based compound is formed on the coated film layer of the coloring material that is formed on the print medium, which makes it possible to obtain coated films having various metallic gloss colors depending on the colors of the coloring materials.

The stilbene-based compound represented by the General Formula (1) can be appropriately employed from the matters described in the stilbene based compound of the inkjet ink of the present disclosure.

The organic solvent, the water, the resin, the surfactant, and the other components can be appropriately employed from the matters described in the inkjet ink of the present disclosure.

EXAMPLES

The present disclosure will be described in detail with reference to the following Examples. However, it is noted that the present disclosure is not limited to these Examples.

Production Example 1

Synthesis of Stilbene-Based Compound f1

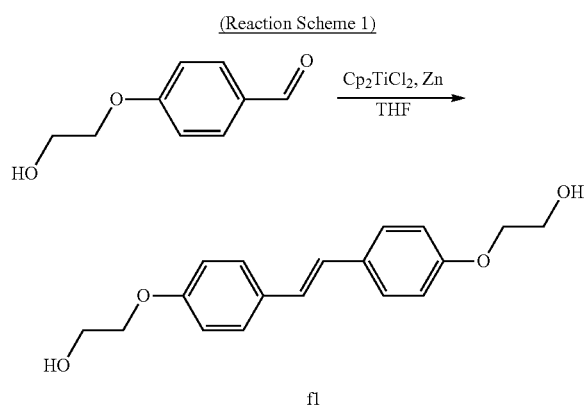

Under a nitrogen atmosphere, a two-necked, recovery flask was charged with titanocene dichloride (2.99 g, 12.0 mmol) and zinc powders (1.57 g, 24.0 mmol). Then, 35 mL of dehydrated tetrahydrofuran free of a stabilizer (hereinafter may be referred to as "dehydrated THF") was added to the resultant mixture. The solution obtained was stirred until the color of the solution changed from red to green at room temperature. After this solution was heated to reflux at 70° C. for 15 hours, 4-(2-hydroxyethoxy)benzaldehyde (1.66 g, 10.0 mmol)-including dehydrated THF (15 mL) was added dropwise thereto over 30 minutes. The reaction system was heated to reflux for 19 hours, and then tert-butyl methyl ether (25 mL) was added dropwise thereto over 20 minutes. The solvent was removed under reduced pressure. The residue was washed twice with ice-cooled methanol (50 mL) and was washed twice with chloroform (50 mL). Next, the crude product was dissolved in hot methanol (60° C., 600 mL) and was subjected to vacuum filtration to remove the zinc powders. Finally, the solvent was removed under reduced pressure from the filtrate and was dried under reduced pressure to obtain a product (yield: 27.4%). The product obtained (0.05 g) and methanol (70 mL) were charged into a 100 mL-sample container and were heated to 63° C. to be completely dissolved. The resultant was left to stand for 3 hours at room temperature. The precipitated crystal was subjected to vacuum filtration and was stacked on a round-shaped filter paper (diameter: 21 mm) to obtain a crystalline thin film body having silvery gloss of stilbene-based compound (f1).

Results of NMR measurements and elementary analysis of the f1 are as follows.

$^1$H NMR (400 MHz; dimethyl sulfoxide-$d_6$ (DMSO-$d_6$)): δ 3.71 (triplet (t), 4H), 3.99 (t, 4H), 4.87 (singlet(s), 2H), 6.92 (doublet (d), 4H), 7.02 (s, 2H), 7.48 (d, 4H); $^{13}$C NMR (100 MHz; DMSOd$_6$): δ 59.6, 69.5, 114.7, 125.8, 127.4, 130.0, 158.1

Values of the elementary analysis: C: 71.98, H: 6.71, O: 21.31

Production Example 2

Synthesis of Stilbene-Based Compound A1

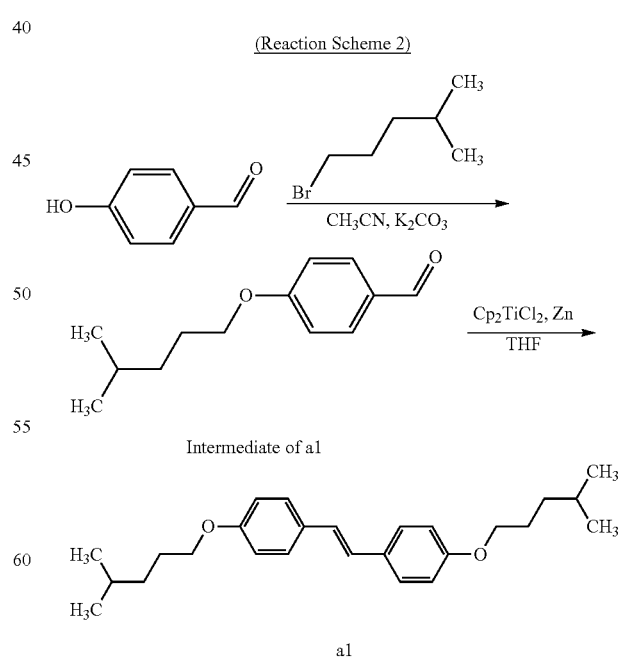

A recovery flask (100 mL) equipped with a reflux tube was charged with 4-hydroxybenzaldehyde (7.0 g, 57.4 mmol) and potassium carbonate (14.2 g, 102.7 mmol). Then, under a nitrogen atmosphere, acetonitrile (50 mL) serving as a solvent was added thereto. The reaction system was warmed to 75° C. Then, 1-bromo-4-methylpentane (8.4 g, 50.9 mmol) was added to the system and the resultant was refluxed for 24 hours. After the reaction had been finished, potassium carbonate in the reaction mixture was removed through filtration to remove acetonitrile. The product was dissolved in ethyl acetate and the solution using 25% by mass sodium hydroxide (2×100 mL) and saturated saline (2×100 mL). The organic layer was dried with magnesium sulfate and was removed to obtain a transparent liquid (intermediate of a1, yield: 98%).

Next, a recovery flask (100 mL) equipped with a reflux tube was charged with titanocene dichloride (3.9 g, 15.7 mmol) and zinc powders (2.0 g, 31.5 mmol). Under a nitrogen atmosphere, 65 mL of dehydrated THF (free of a stabilizer) was added thereto and the resultant was stirred until the color of the solution changed from red to green at room temperature. Next, the solution was allowed to start reflux and the intermediate (2.0 g, 11.6 mmol) was added thereto. The reaction mixture was refluxed for 8 hours and was cooled to room temperature. Then, it was quenched with tert-butyl methyl ether and the solution obtained was filtrated. The solvent was removed under reduced pressure and the residue was dissolved in chloroform. The chloroform solution obtained was partitioned using 1N hydrochloric acid and saturated saline and was dried with magnesium sulfate to be removed under reduced pressure. The white solid obtained was recrystallized twice with ethanol. The precipitated crystal was subjected to vacuum filtration and was stacked on a round-shaped filter paper (diameter: 21 mm) to obtain a crystalline thin film body having silvery gloss of stilbene-based compound (a1). Identification was performed by elementary analysis and NMR in the same manner as in the Production Example 1 in order to confirm that the a1 was obtained.

Production Example 3

Synthesis of Stilbene-Based Compound f2

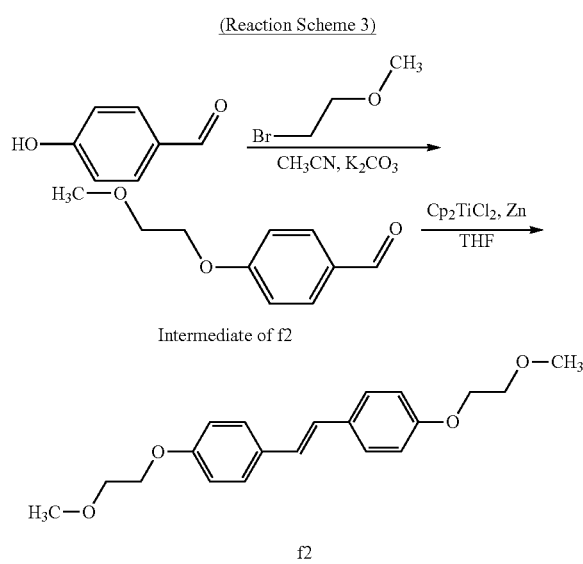

A crystalline thin film body having silvery gloss of stilbene-based compound (f2) was obtained in the same manner as in the Production Example 2 except that 1-bromo-4-methylpentane in the Production Example 2 was changed to 2-bromoethyl methyl ether (10.7 g, 50.9 mmol). Identification was performed by elementary analysis and NMR in the same manner as in the Production Example 1 in order to confirm that the f2 was obtained.

Production Example 4

Synthesis of Stilbene-Based Compound f4

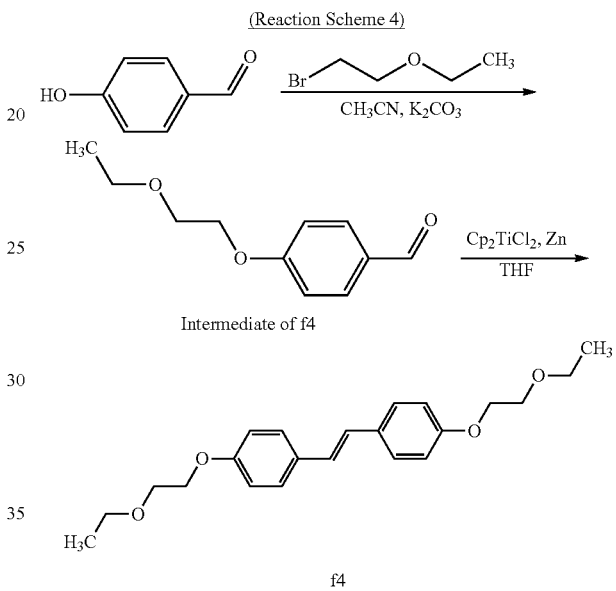

A crystalline thin film body having silvery gloss of stilbene-based compound (f4) was obtained in the same manner as in the Production Example 2 except that 1-bromo-4-methylpentane in the Production Example 2 was changed to 2-bromoethyl ethyl ether (7.79 g, 50.9 mmol). Identification was performed by elementary analysis and NMR in the same manner as in the Production Example 1 in order to confirm that the f4 was obtained.

Production Example 5

Synthesis of Stilbene-Based Compound f5

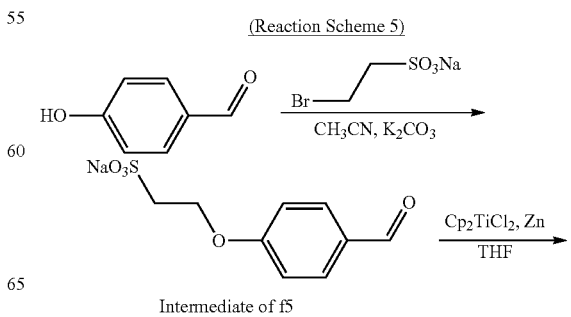

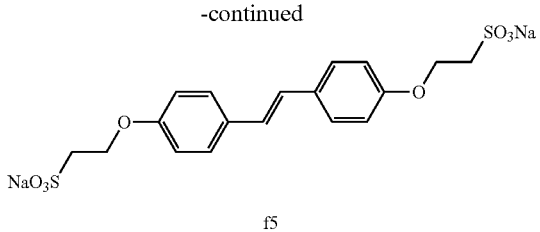

f5

A recovery flask (100 mL) equipped with a reflux tube was charged with 4-hydroxybenzaldehyde (7.0 g, 57.4 mmol) and potassium carbonate (14.2 g, 102.7 mmol). Then, under a nitrogen atmosphere, acetonitrile (50 mL) serving as a solvent was added thereto. The reaction system was warmed to 75° C. Then, sodium 2-bromoethanesulfonate (10.74 g, 50.9 mmol) was added to the system and the resultant was refluxed for 24 hours. After the reaction had been finished, potassium carbonate in the reaction mixture was removed through filtration to remove acetonitrile. The product was dissolved in ethyl acetate and the solution was partitioned using 25% by mass sodium hydroxide (2×100 mL) and saturated saline (2×100 mL). The organic layer was dried with magnesium sulfate and was removed to obtain a transparent liquid (intermediate of f5, yield: 98%).

Next, a recovery flask (100 mL) equipped with a reflux tube was charged with titanocene dichloride (3.9 g, 15.7 mmol) and zinc powders (2.0 g, 31.5 mmol). Under a nitrogen atmosphere, 65 mL of dehydrated THF was added thereto and the resultant was stirred until the color of the solution changed from red to green at room temperature. Next, the solution was allowed to start reflux and the intermediate (2.0 g, 11.6 mmol) was added thereto. The reaction mixture was refluxed for 8 hours and was cooled to room temperature. Then, it was quenched with tert-butyl methyl ether and the mixture solution was filtrated. The solvent in the filtrate was removed under reduced pressure and the residue was dissolved in chloroform. The solution was partitioned using 1N hydrochloric acid and saturated saline and was dried with magnesium sulfate to be removed under reduced pressure. The white solid obtained was recrystallized twice with ethanol. The precipitated crystal was subjected to vacuum filtration and was stacked on a round-shaped filter paper (diameter: 21 mm) to obtain a crystalline thin film body having silvery gloss of stilbene-based compound (f5). Identification was performed by elementary analysis and NMR in the same manner as in the Production Example 1 in order to confirm that the f5 was obtained.

Production Example 6

Synthesis of Stilbene-Based Compound f6

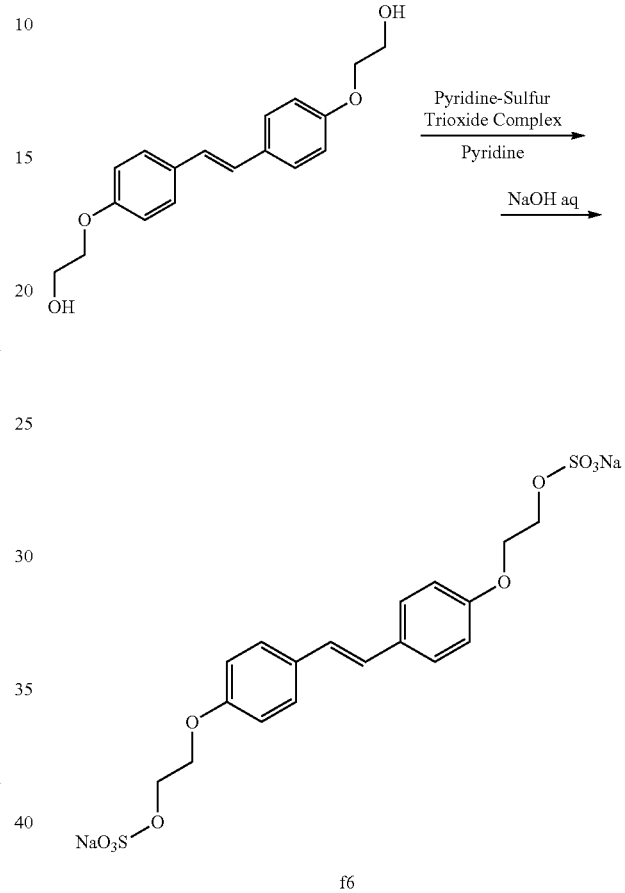

f6

A reaction mixture of the compound f1 (2.1 g, 7 mmol), sulfur trioxide/pyridine complex (2.38 g, 15.0 mmol), and pyridine (20 mL) was stirred at 50° C. for 24 hours. A sodium hydroxide (1.2 g, 30 mmol)—including solution (10 mL) was added thereto and was stirred for 10 minutes. Pyridine and water were removed under reduced pressure. Then, methanol was added to the residue and the product was extracted with methanol. Next, hexane was added to methanol to precipitate a crystal of the product. The crystal was subjected to vacuum filtration and was stacked on a round-shaped filter paper (diameter: 21 mm) to obtain a crystalline thin film body having silvery gloss of stilbene-based compound (f6). Identification was performed by element analysis and NMR in the same manner as in the Production Example 1 in order to confirm that the f6 was obtained.

Production Example 7

Synthesis of Stilbene-Based Compound f8

(Reaction Scheme 7)

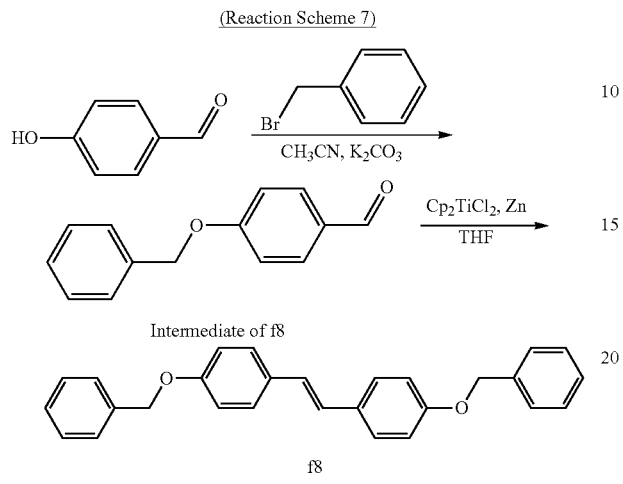

A crystalline thin film body having silvery gloss of stilbene-based compound (f8) was obtained in the same manner as in the Production Example 2 except that 1-bromo-4-methylpentane in the Production Example 2 was changed to benzyl bromide (8.7 g, 50.9 mmol). Identification was performed by elementary analysis and NMR in the same manner as in the Production Example 1 in order to confirm that the f8 was obtained.

Production Example 8

Synthesis of Stilbene-Based Compound f9

(Reaction Scheme 8)

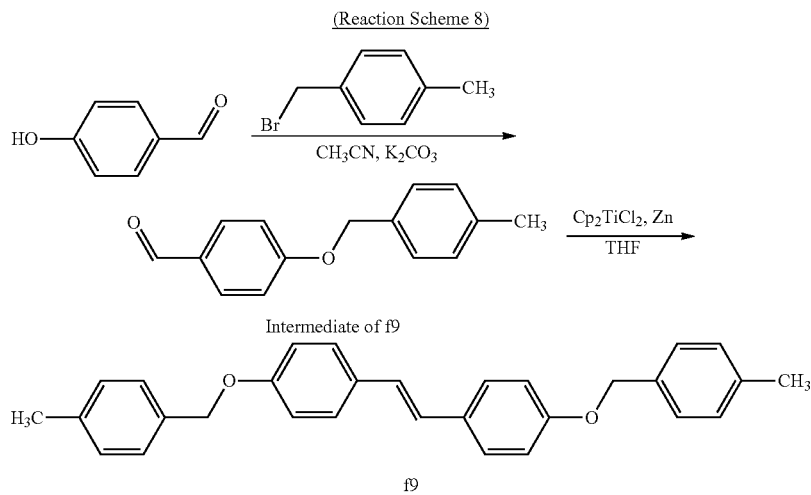

A crystalline thin film body having silvery gloss of stilbene-based compound (f9) was obtained in the same manner as in the Production Example 2 except that 1-bromo-4-methylpentane in the Production Example 2 was changed to 4-methyl benzyl bromide (9.4 g, 50.9 mmol). Identification was performed by elementary analysis and NMR in the same manner as in the Production Example 1 in order to confirm that the f9 was obtained.

Production Example 9

Synthesis of Stilbene-Based Compound f12

(Reaction Scheme 9)

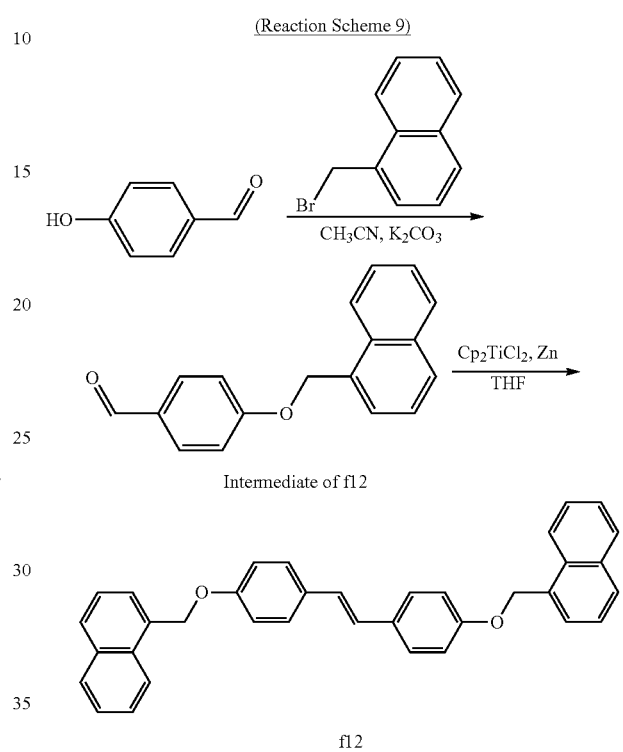

A crystalline thin film body having silvery gloss of stilbene-based compound (f12) was obtained in the same manner as in the Production Example 2 except that 1-bromo-4-methylpentane in the Production Example 2 was changed to 1-(bromomethyl)naphthalene (11.3 g, 50.9 mmol). Identification was performed by elementary analysis and NMR in the same manner as in the Production Example 1 in order to confirm that the f12 was obtained.

Production Example 10

Synthesis of Stilbene-Based Compound f14

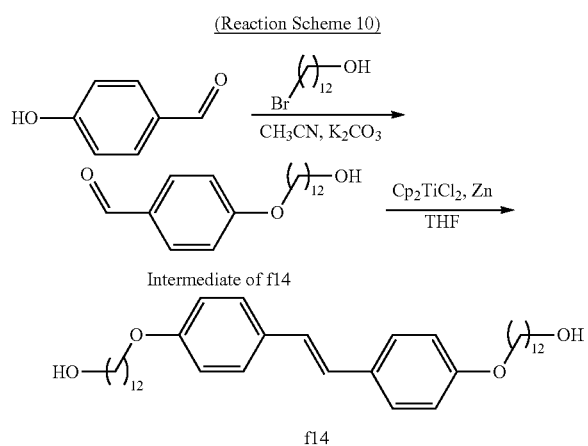

A crystalline thin film body having silvery gloss of stilbene-based compound (f14) was obtained in the same manner as in the Production Example 2 except that 1-bromo-4-methylpentane in the Production Example 2 was changed to 12-bromo-1-dodecanol (13.5 g, 50.9 mmol). Identification was performed by elementary analysis and NMR in the same manner as in the Production Example 1 in order to confirm that the f14 was obtained.

Production Example 11

Synthesis of Stilbene-Based Compound a2

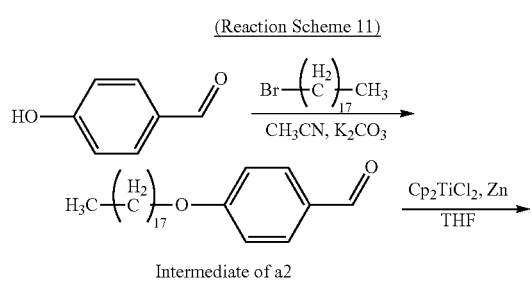

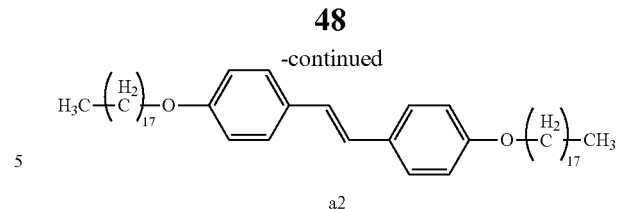

A crystalline thin film body having silvery gloss of stilbene-based compound (a2) was obtained in the same manner as in the Production Example 2 except that 1-bromo-4-methylpentane in the Production Example 2 was changed to 1-bromooctadecane (17.0 g, 50.9 mmol). Identification was performed by elementary analysis and NMR in the same manner as in the Production Example 1 in order to confirm that the a2 was obtained.

Production Example 12

Synthesis of Stilbene-Based Compound a3

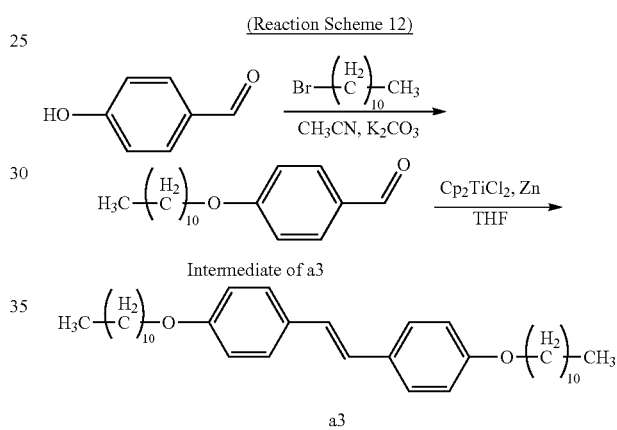

A crystalline thin film body having silvery gloss of stilbene-based compound (a3) was obtained in the same manner as in the Production Example 2 except that 1-bromo-4-methylpentane in the Production Example 2 was changed to 1-bromoundecane (12.0 g, 50.9 mmol). Identification was performed by elementary analysis and NMR in the same manner as in the Production Example 1 in order to confirm that the a3 was obtained.

Production Example 13

Synthesis of Stilbene-Based Compound a4

(Reaction Scheme 13)

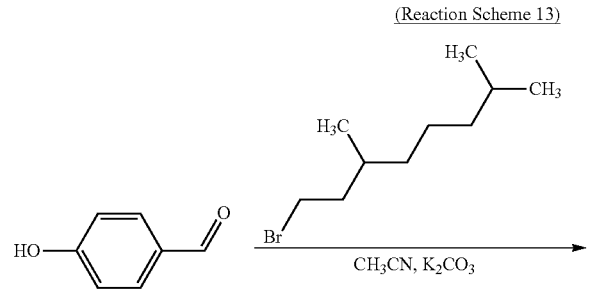

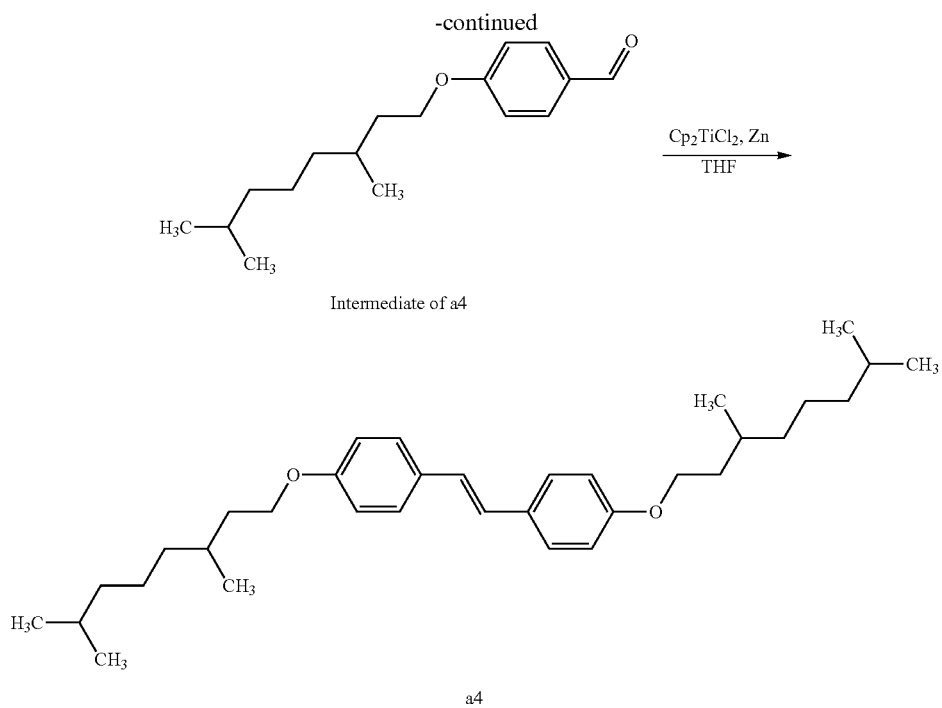

Intermediate of a4 a4

A crystalline thin film body having silvery gloss of stilbene-based compound (a4) was obtained in the same manner as in the Production Example 2 except that 1-bromo-4-methylpentane in the Production Example 2 was changed to 1-bromo-3,7-dimethyloctane (11.3 g, 50.9 mmol). Identification was performed by elementary analysis and NMR in the same manner as in the Production Example 1 in order to confirm that the a4 was obtained.

Production Example 14

Synthesis of Stilbene-Based Compound a8

(Reaction Scheme 14)

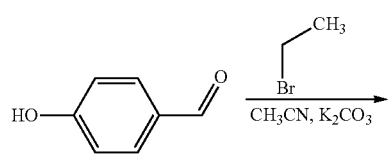

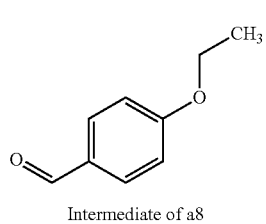

Intermediate of a8

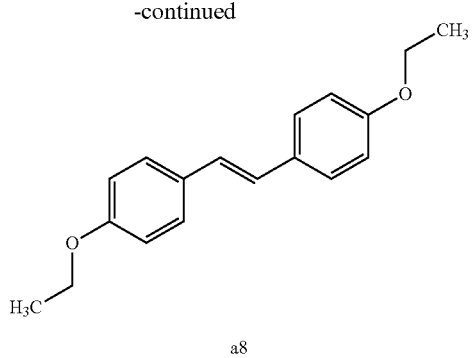

a8

A crystalline thin film body having silvery gloss of stilbene-based compound (a8) was obtained in the same manner as in the Production Example 2 except that 1-bromo-4-methylpentane in the Production Example 2 was changed to bromoethane (5.55 g, 50.9 mmol). Identification was performed by elementary analysis and NMR in the same manner as in the Production Example 1 in order to confirm that the a8 was obtained.

Production Example 15

Synthesis of Stilbene-Based Compound a10

(Reaction Scheme 15)

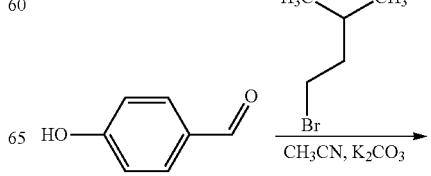

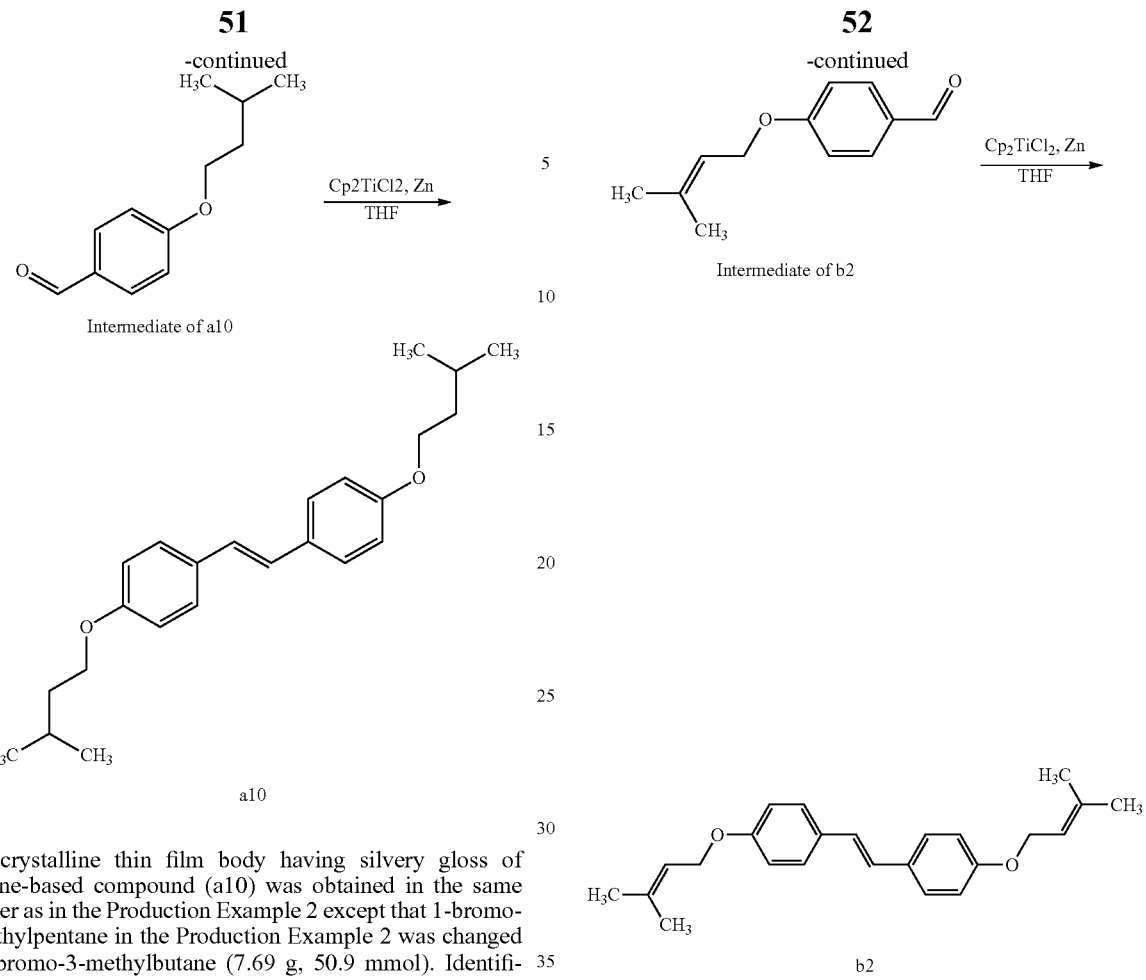

Intermediate of a10 a10

A crystalline thin film body having silvery gloss of stilbene-based compound (a10) was obtained in the same manner as in the Production Example 2 except that 1-bromo-4-methylpentane in the Production Example 2 was changed to 1-bromo-3-methylbutane (7.69 g, 50.9 mmol). Identification was performed by elementary analysis and NMR in the same manner as in the Production Example 1 in order to confirm that the a10 was obtained.

Production Example 16

Synthesis of Stilbene-Based Compound b2

(Reaction Scheme 16)

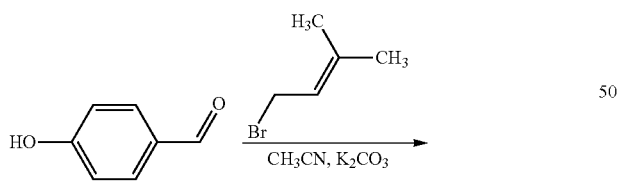

Intermediate of b2 b2

A crystalline thin film body having silvery gloss of stilbene-based compound (b2) was obtained in the same manner as in the Production Example 2 except that 1-bromo-4-methylpentane in the Production Example 2 was changed to 1-bromo-3 methyl-2 butene (7.6 g, 50.9 mmol). Identification was performed by elementary analysis and NMR in the same manner as in the Production Example 1 in order to confirm that the b2 was obtained.

Production Example 17

Synthesis of Stilbene-Based Compound b3

(Reaction Scheme 17)

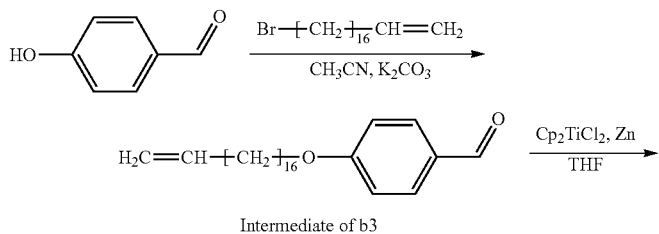

Intermediate of b3

-continued

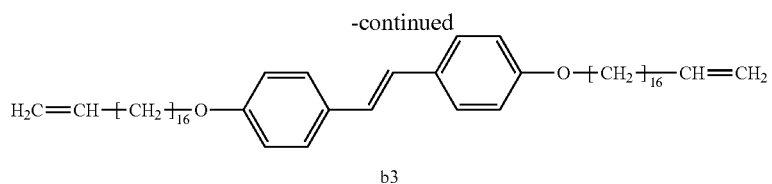

b3

A crystalline thin film body having silvery gloss of stilbene-based compound (b3) was obtained in the same manner as in the Production Example 2 except that 1-bromo-4-methylpentane in the Production Example 2 was changed to 18-bromo-1-octadecene (16.87 g, 50.9 mmol). Identification was performed by elementary analysis and NMR in the same manner as in the Production Example 1 in order to confirm that the b3 was obtained.

Production Example 18

Synthesis of Stilbene-Based Compound c1

(Reaction Scheme 18)

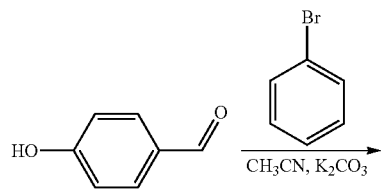

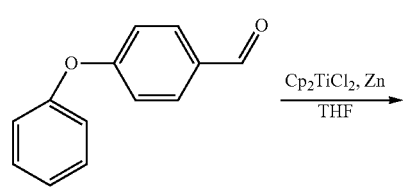

Intermediate of c1

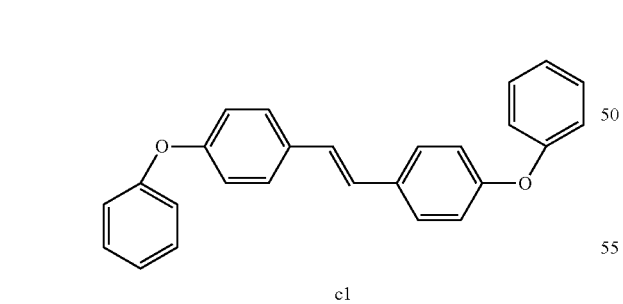

c1

A crystalline thin film body having silvery gloss of stilbene-based compound (c1) was obtained in the same manner as in the Production Example 2 except that 1-bromo-4-methylpentane in the Production Example 2 was changed to bromobenzene (8.0 g, 50.9 mmol). Identification was performed by elementary analysis and NMR in the same manner as in the Production Example 1 in order to confirm that the c1 was obtained.

Production Example 19

Synthesis of Stilbene-Based Compound c3

(Reaction Scheme 19)

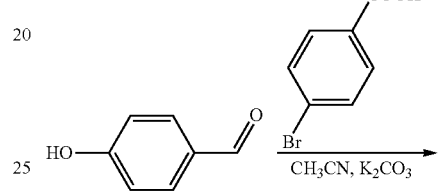

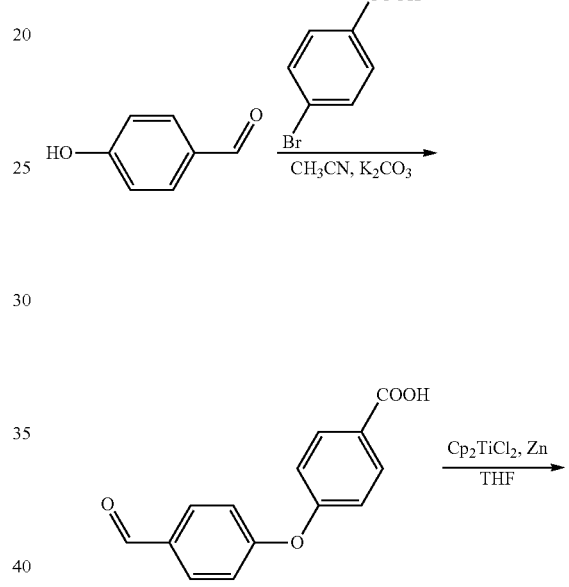

Intermediate of c3

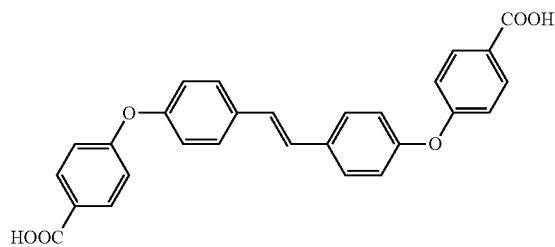

c3

A crystalline thin film body having silvery gloss of stilbene-based compound (c3) was obtained in the same manner as in the Production Example 2 except that 1-bromo-4-methylpentane in the Production Example 2 was changed to 4-bromobenzoic acid (10.2 g, 50.9 mmol). Identification was performed by elementary analysis and NMR in the same manner as in the Production Example 1 in order to confirm that the c3 was obtained.

Production Example 20

Synthesis of Stilbene-Based Compound d1

(Reaction Scheme 20)

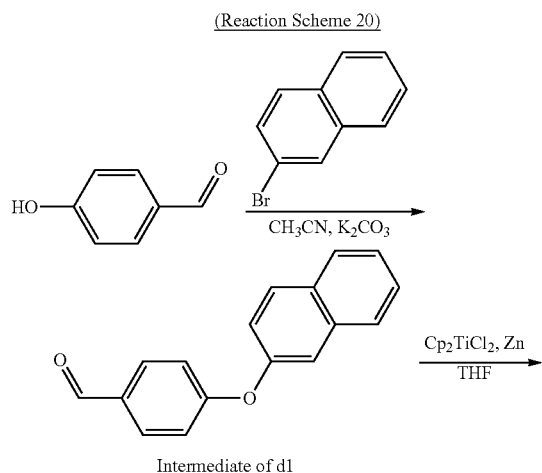

Intermediate of d1

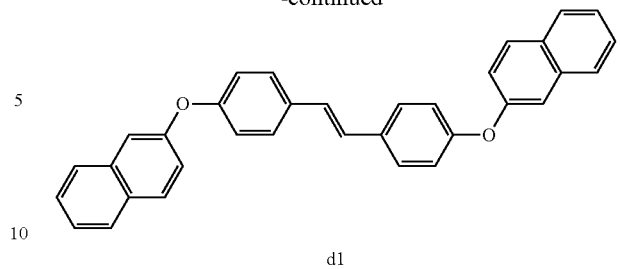

d1

A crystalline thin film body having silvery gloss of stilbene-based compound (d1) was obtained in the same maimer as in the Production Example 2 except that 1-bromo-4-methylpentane in the Production Example 2 was changed to 2-bromonaphthalene (1.1.3 g, 50.9 mmol). Identification was performed by elementary analysis and NMR in the same manner as in the Production Example 1 in order to confirm that the d1 was obtained.

Production Example 21

Synthesis of Stilbene-Based Compound d7

(Reaction Scheme 21)

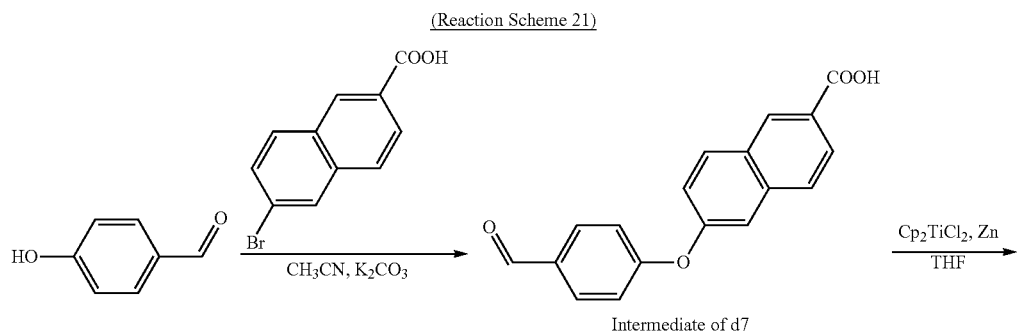

Intermediate of d7

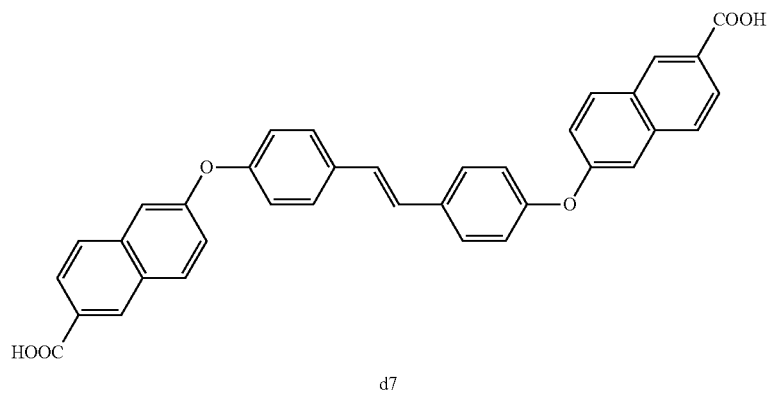

d7

A crystalline thin film body having silvery gloss of stilbene-based compound (d7) was obtained in the same manner as in the Production Example 2 except that 1-bromo-4-methylpentane in the Production Example 2 was changed to 6-bromo-2-naphthoic acid (12.8 g, 50.9 mmol). Identification was performed by elementary analysis and NMR in the same manner as in the Production Example 1 in order to confirm that the d7 was obtained.

Production Example 22

Synthesis of Stilbene-Based Compound e1

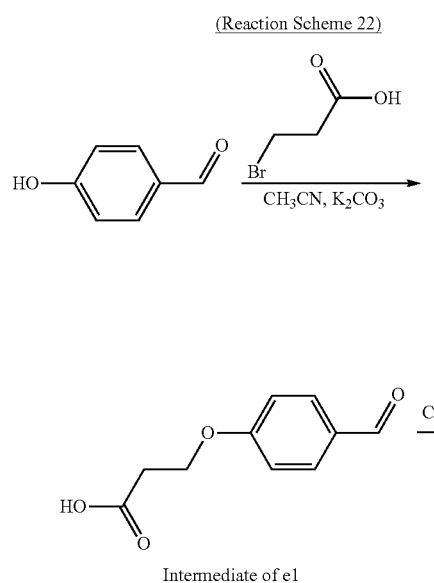

A crystalline thin film body having silvery gloss of stilbene-based compound (e1) was obtained in the same manner as in the Production Example 2 except that 1-bromo-4-methylpentane in the Production Example 2 was changed to 3-bromopropionic acid (7.8 g, 50.9 mmol). Identification was performed by elementary analysis and NMR in the same manner as in the Production Example 1 in order to confirm that the e1 was obtained.

Production Example 23

Synthesis of Stilbene-Based Compound e2

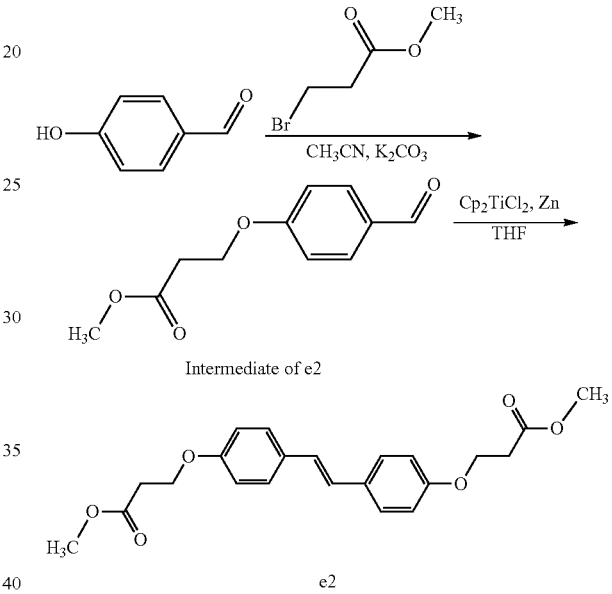

A crystalline thin film body having silvery gloss of stilbene-based compound (e2) was obtained in the same manner as in the Production Example 2 except that 1-bromo-4-methylpentane in the Production Example 2 was changed to methyl 3-bromopropionate (8.5 g, 50.9 mmol). Identification was performed by elementary analysis and NMR in the same manner as in the Production Example 1 in order to confirm that the e2 was obtained.

Production Example 24

Synthesis of Stilbene-Based Compound e3

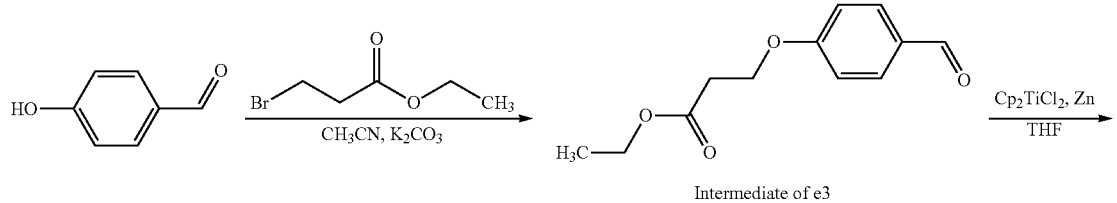

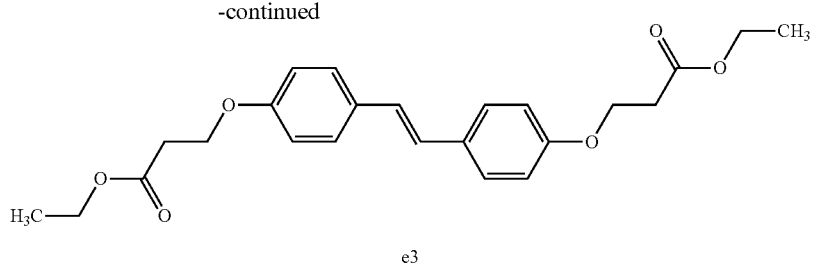

e3

A crystalline thin film body having silvery gloss of stilbene-based compound (e3) was obtained in the same manner as in the Production Example 2 except that 1-bromo-4-methylpentane in the Production Example 2 was changed to ethyl 3-bromopropionate (9.21 g, 50.9 mmol). Identification was performed by elementary analysis and NMR in the same manner as in the Production Example 1 in order to confirm that the e3 was obtained.

Production Example 25

Synthesis of Stilbene-Based Compound e5

(Reaction Scheme 25)

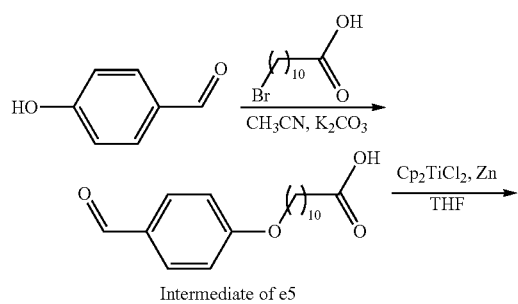

Intermediate of e5

-continued

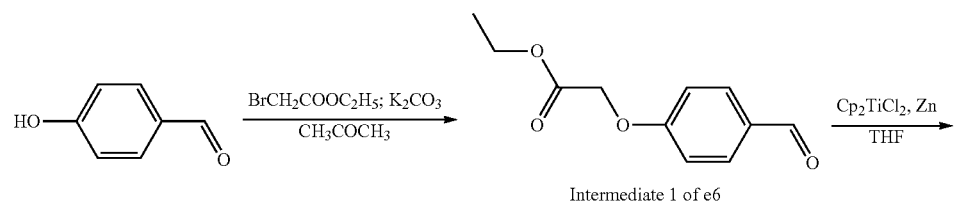

e5

A crystalline thin film body having silvery gloss of stilbene-based compound (e5) was obtained in the same manner as in the Production Example 2 except that 1-bromo-4-methylpentane in the Production Example 2 was changed to 11-bromoundecanoic acid (13.5 g, 50.9 mmol). Identification was performed by elementary analysis and NMR in the same manner as in the Production Example 1 in order to confirm that the e5 was obtained.

Production Example 26

Synthesis of Stilbene-Based Compound e6

(Reaction Scheme 26)

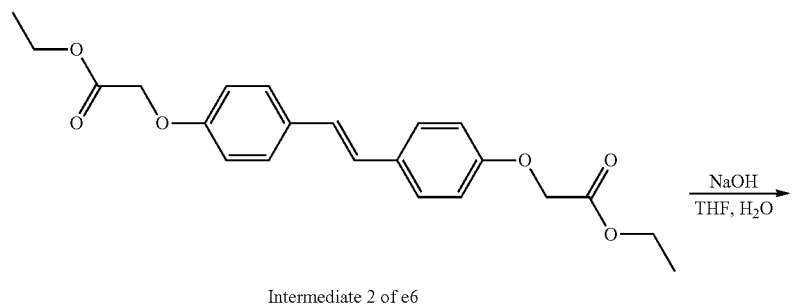

Intermediate 2 of e6

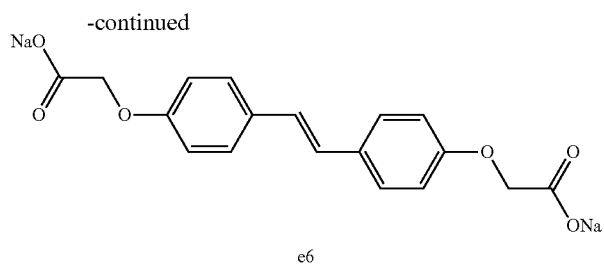

e6

Intermediate 2 of stilbene-based compound (e6) was obtained in the same manner as in the Production Example 2 except that 1-bromo-4-methylpentane in the Production Example 2 was changed to ethyl bromoacetate and the solvent was changed from acetonitrile to acetone.

Next, a two-necked, recovery flask was charged with the intermediate 1 of e6 (1.10 g, 2.86 mmol). Then, tetrahydrofuran (30 mL) was added thereto. The resultant was stirred with heating at 50° C. to be completely dissolved. Then, NaOH (1.35 g, 33.75 mmol)-including water (50 mL) was added to the solution and the reaction system was heated to reflux at 70° C. overnight. The reaction system was cooled to room temperature and a precipitated product was collected through vacuum filtration to obtain a crystalline thin film body having silvery gloss of stilbene based compound (e6). Identification was performed by elementary analysis and NMR in the same manner as in the Production Example 1 in order to confirm that the e6 was obtained.

Production Example 27

Synthesis of Stilbene-Based Compound g1

(Reaction Scheme 27)

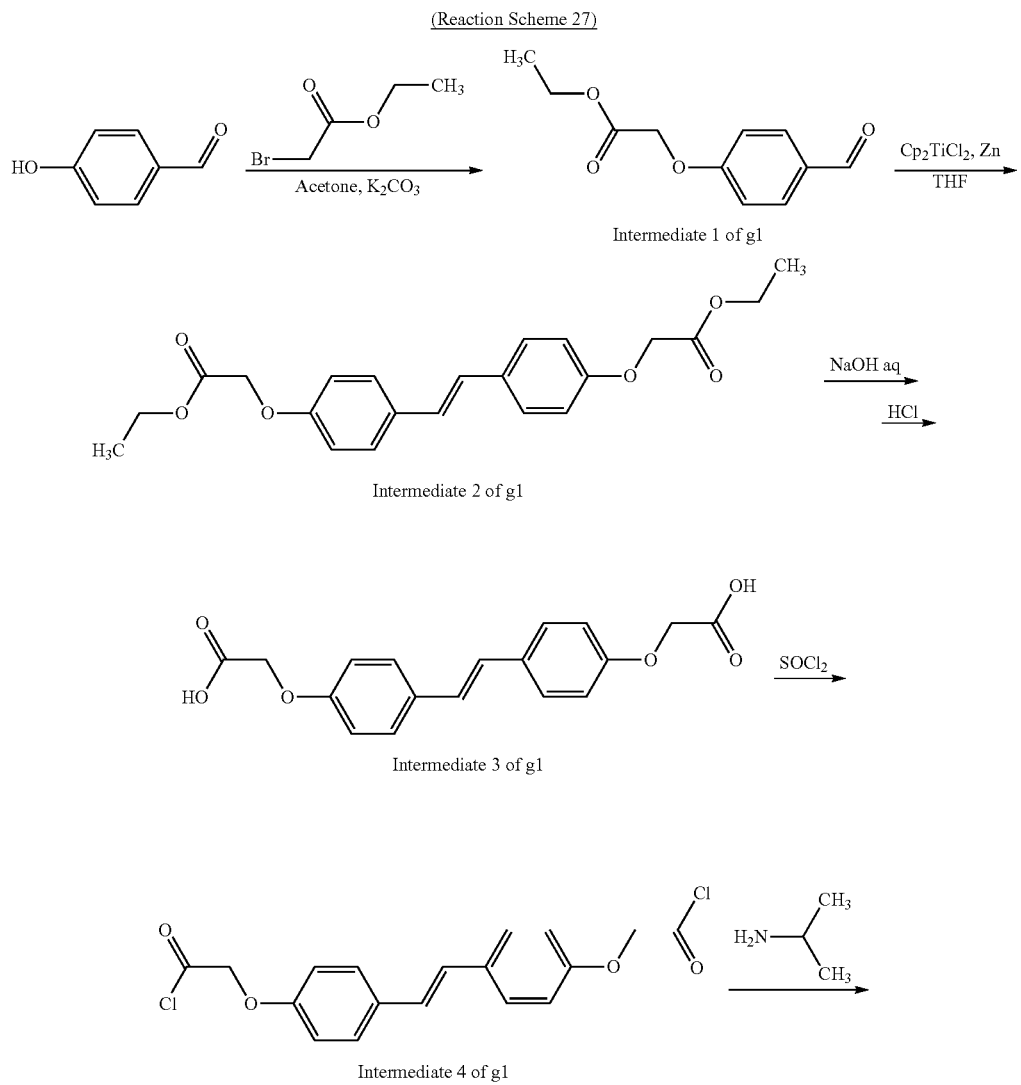

-continued

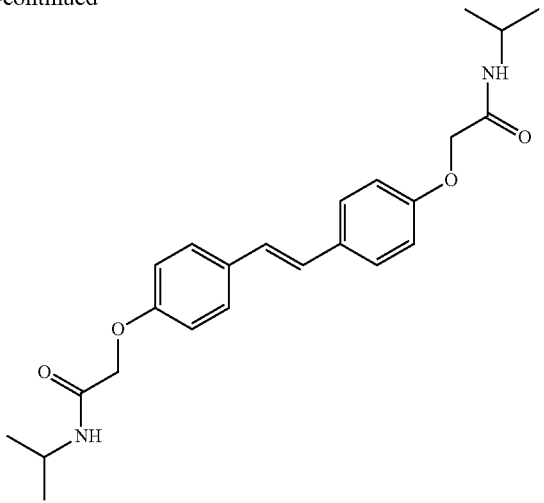

g1

A two-necked, recovery flask was charged with 4-hydroxybenzaldehyde (0.1 g, 0.8 mmol) and potassium carbonate (0.17 g, 1.2 mmol) and acetone (10 mL) was added thereto. The solution obtained was stirred at room temperature for 30 minutes and ethyl bromoacetate (0.14 g, 0.8 mmol) was added dropwise thereto. The reaction system was refluxed for 4 hours and was subjected to vacuum filtration to remove potassium carbonate. The solvent was removed from the filtrate under reduced pressure and the resultant oily residue was washed with water. Finally, purification was performed through column chromatography to obtain an oily product (intermediate 1 of g1).

Next, under a nitrogen atmosphere, a two-necked, recovery flask was charged with titanocene dichloride (3.00 g, 12.0 mmol) and zinc powders (1.57 g, 24.0 mmol). Then, dehydrated THF (50 mL) was added thereto and the resultant was stirred until the color of the solution changed from red to green at room temperature. Furthermore, the solution was refluxed at 70° C. for 30 minutes and the intermediate 1 (2.10 g, 10.0 mmol) was added thereto. With presence of the intermediate 1 being confirmed through thin-layer chromatography, the reaction mixture was refluxed until the intermediate 1 was consumed. Then, it was quenched with tert-butyl methyl ether. The resultant was subjected to vacuum filtration to remove zinc powders from the reaction solution. The filtrate was washed with 1N hydrochloric acid and saturated saline and was dehydrated with magnesium sulfate. Furthermore, the solvent was removed under reduced pressure. The residue was washed with hexane and was recrystallized with ethanol to obtain intermediate 2 of g1.

Then, the intermediate 2 (1.00 g, 2.60 mmol) and dehydrated THF (30 mL) were charged into a two-necked, recovery flask. When the resultant was allowed to start reflux at 70° C., 0.5% by mass sodium hydroxide aqueous solution (50 mL) was added thereto. When the reaction system was refluxed for 2 hours, the solvent was removed under reduced pressure. Then, water (100 mL) was added to the residue. A water insoluble matter was removed through vacuum filtration. Then, until the filtrate became acidity, dilute hydrochloric acid was added dropwise to the filtrate to precipitate a crude product. The crude product was washed with acetone (30 mL) to obtain intermediate 3 of g1.

Next, thionyl chloride (8 mL) was added into a two-necked, recovery flask, which was charged with the intermediate 3 (0.50 g, 1.52 mmol), under a nitrogen atmosphere. The reaction system was refluxed at 80° C. for 5 hours and unreacted thionyl chloride was removed under reduced pressure to obtain intermediate 4 of g1.

Next, chloroform (10 mL) was added to the intermediate 4 and was cooled to 0° C. in an ice bath. Then, isopropylamine (0.89 g, 15.1 mmol) and 5 mL of 2.4% by mass sodium hydroxide aqueous solution (0° C.) were added thereto. The solution obtained was stirred for 90 minutes and was subjected to vacuum filtration. The product obtained was stacked on a round-shaped filter paper (diameter: 21 mm) and was washed with methanol (30 mL) to obtain a crystalline thin film body having silvery gloss of stilbene-based compound (g1). Identification was performed by elementary analysis and NMR in the same manner as in the Production Example 1 in order to confirm that the g1 was obtained.

Production Example 28

Synthesis of Stilbene-Based Compound g2

(Reaction Scheme 28)

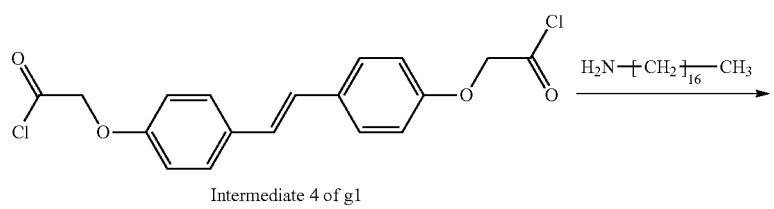

Intermediate 4 of g1

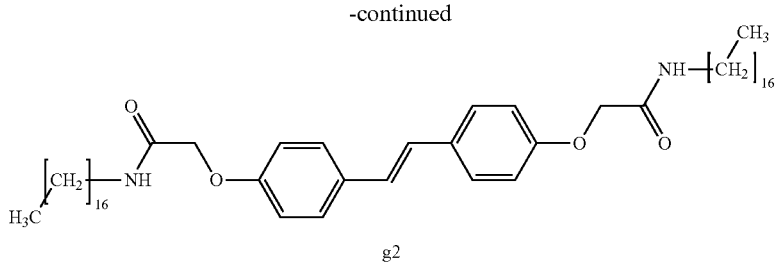

g2

Chloroform (10 mL) was added to the intermediate 4 of g1 obtained in the Production Example 27 and was cooled to 0° C. in an ice bath. Then, 5 mL of heptadecylamine (3.83 g, 15.0 mmol) and 2.4% by mass sodium hydroxide aqueous solution 5 mL (0° C.) were added thereto. The solution obtained was stirred for 90 minutes and was subjected to vacuum filtration. The product obtained was stacked on a round-shaped filter paper (diameter: 21 mm) and was finally washed with methanol (30 mL) to obtain a crystalline thin film body having silvery gloss of stilbene-based compound (g2). Identification was performed by elementary analysis and NMR in the same manner as in the Production Example 1 in order to confirm that the g2 was obtained.

Production Example 29

Synthesis of Stilbene-based Compound g3

(Reaction Scheme 29)

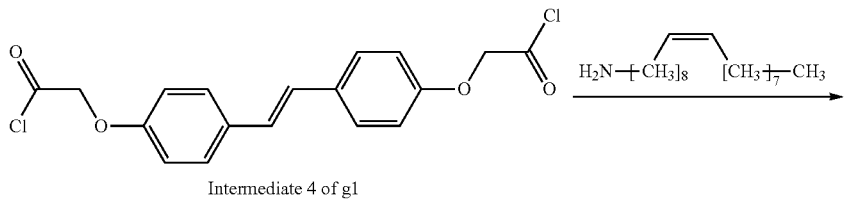

Intermediate 4 of g1

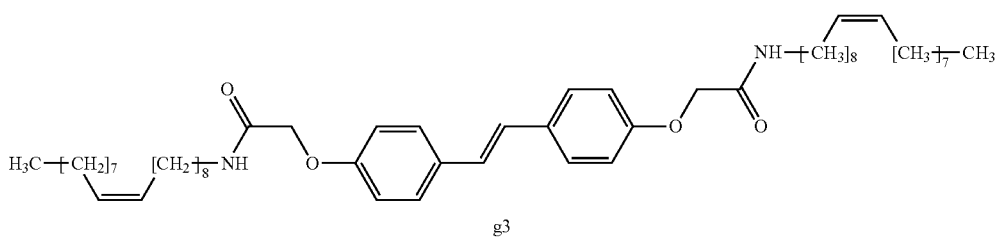

g3

Chloroform (10 mL) was added to the intermediate 4 of g1 obtained in the Production Example 27 and was cooled to 0° C. in an ice bath. Then, oleylamine (4.01 g, 15.0 mmol) and 2.4% by mass sodium hydroxide aqueous solution (5 mL) (0° C.) were added thereto. The solution obtained was stirred for 90 minutes and was subjected to vacuum filtration. The product obtained was stacked on a round-shaped filter paper (diameter: 21 mm) and was finally washed with methanol (30 mL) to obtain a crystalline thin film body having silvery gloss of stilbene-based compound (g3). Identification was performed by elementary analysis and NMR in the same manner as in the Production Example 1 in order to confirm that the g3 was obtained.

Production Example 30

Synthesis of Stilbene-Based Compound g4

(Reaction Scheme 30)

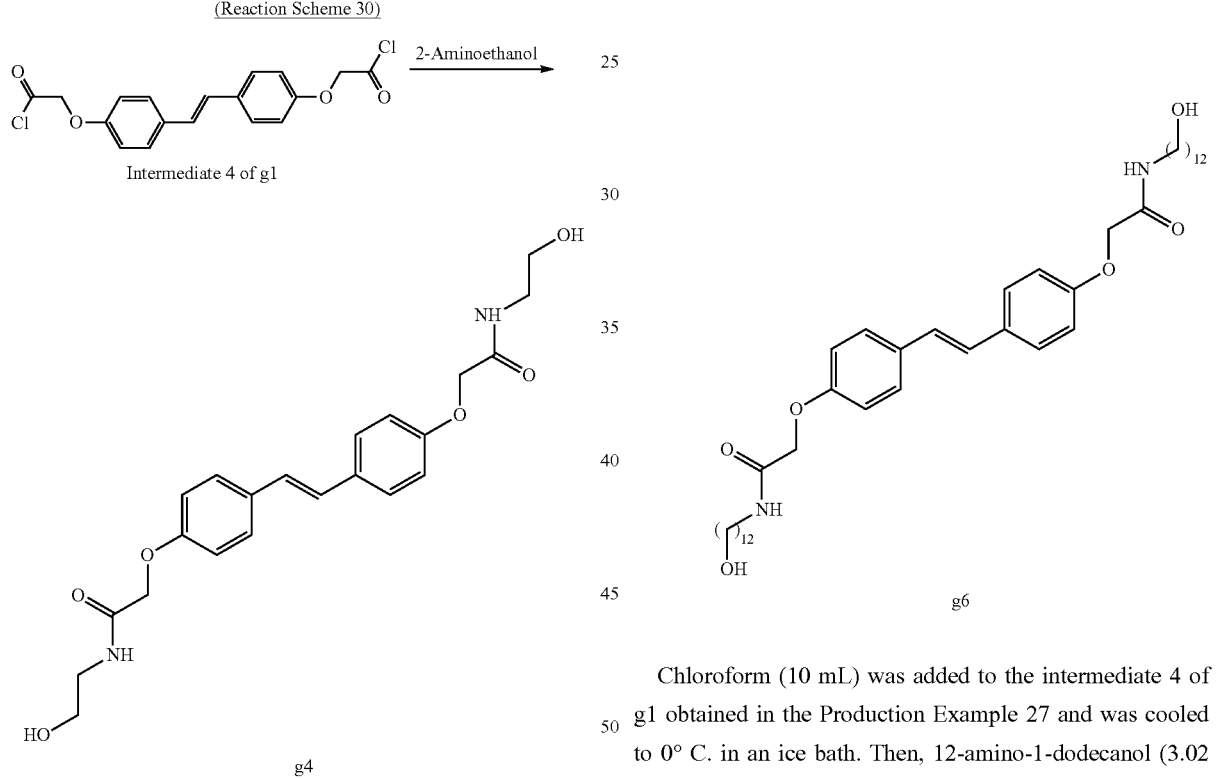

g4

Chloroform (10 mL) was added to the intermediate 4 of g1 obtained in the Production Example 27 and was cooled to 0° C. in an ice bath. Then, 2-ethanolamine (0.90 mL, 15.0 mmol) and 5 mL of 2.4% by mass sodium hydroxide aqueous solution (0° C.) were added thereto. The solution obtained was stirred for 90 minutes and was subjected to vacuum filtration. The product obtained was stacked on a round-shaped filter paper (diameter: 21 mm) and was finally washed with methanol (30 mL) to obtain a crystalline thin film body having silvery gloss of stilbene-based compound (g4). Identification was performed by elementary analysis and NMR in the same manner as in the Production Example 1 in order to confirm that the g4 was obtained.

Production Example 31

Synthesis of Stilbene-Based Compound g6

(Reaction Scheme 31)

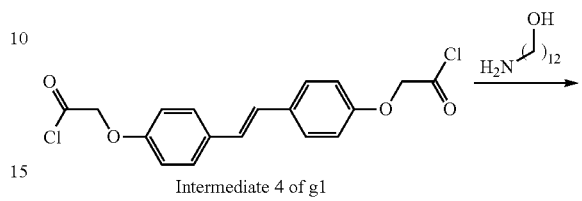

g6

Chloroform (10 mL) was added to the intermediate 4 of g1 obtained in the Production Example 27 and was cooled to 0° C. in an ice bath. Then, 12-amino-1-dodecanol (3.02 mL, 15.0 mmol) and 5 mL of 2.4% by mass sodium hydroxide aqueous solution (0° C.) were added thereto. The solution obtained was stirred for 90 minutes and was subjected to vacuum filtration. The product obtained was stacked on a round-shaped filter paper (diameter: 21 mm) and was finally washed with methanol (30 mL) to obtain a crystalline thin film body having silvery gloss of stilbene based compound (g6). Identification was performed by elementary analysis and NMR in the same manner as in the Production Example 1 in order to confirm that the g6 was obtained.

Production Example 32

Synthesis of Stilbene-Based Compound g7

(Reaction Scheme 32)

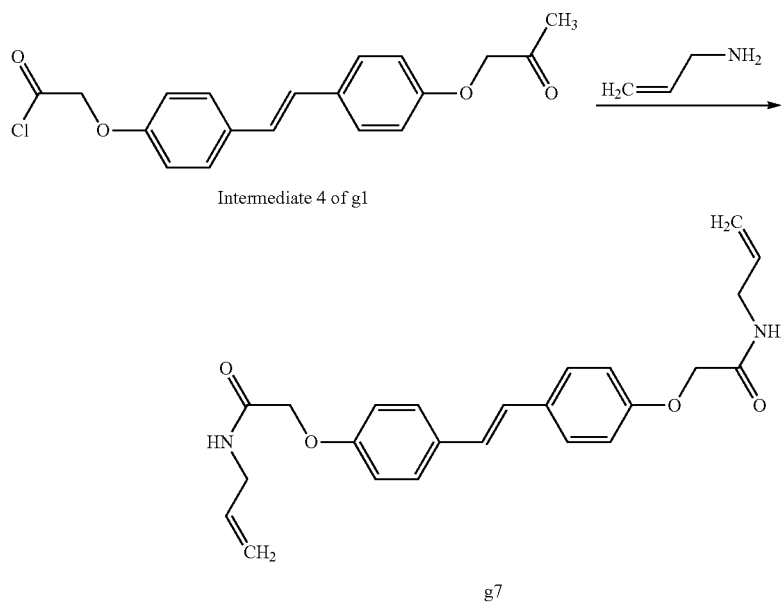

Intermediate 4 of g1 g7

Chloroform (10 mL) was added to the intermediate 4 of g1 obtained in the Production Example 27 and was cooled to 0° C. in an ice bath. Then, 3-aminopropylene (0.86 g, 15.0 mmol) and 5 mL of 2.4% by mass sodium hydroxide aqueous solution (0° C.) were added thereto. The solution obtained was stirred for 90 minutes and was subjected to vacuum filtration. The product obtained was stacked on a round-shaped filter paper (diameter: 21 mm) and was finally washed with methanol (30 mL) to obtain a crystalline thin film body having silvery gloss of stilbene-based compound (g7). Identification was performed by elementary analysis and NMR in the same manner as in the Production Example 1 in order to confirm that the g7 was obtained.

Production Example 33

Synthesis of Stilbene-Based Compound h2

(Reaction Scheme 33)

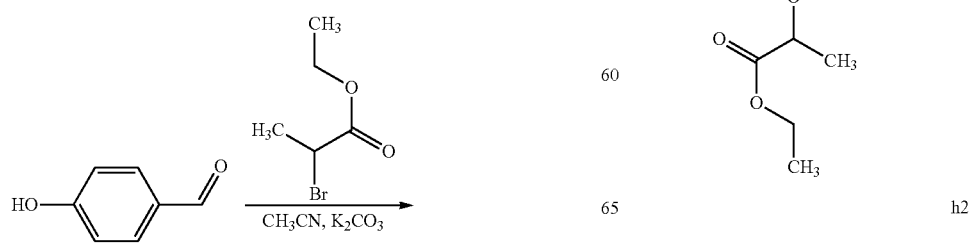

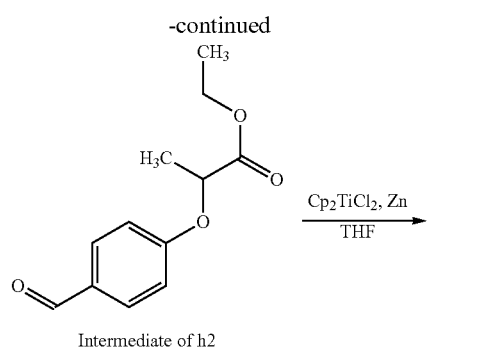

Intermediate of h2

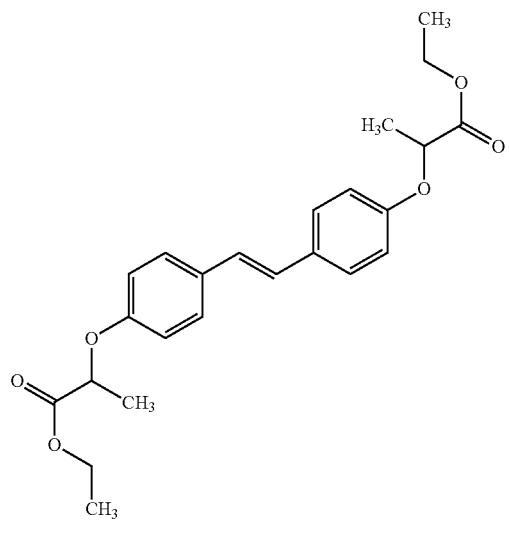

h2

A crystalline thin film body having silvery gloss of stilbene-based compound (h2) was obtained in the same manner as in the Production Example 2 except that 1-bromo-4-methylpentane in the Production Example 2 was changed to ethyl 2-bromopropionate (9.2 g, 50.9 mmol). Identification was performed by elementary analysis and NMR in the same manner as in the Production Example 1 in order to confirm that the h2 was obtained.

Production Example 34

Synthesis of Stilbene-Based Compound i1

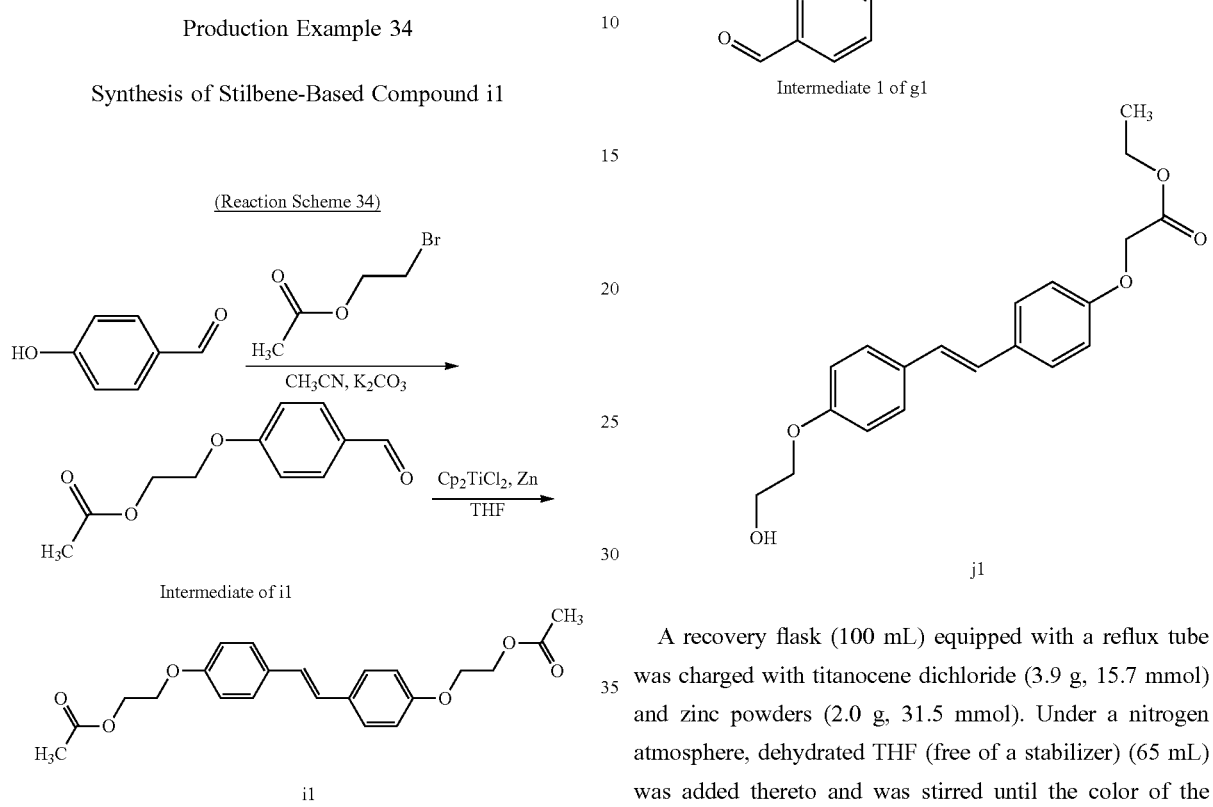

A crystalline thin film body having silvery gloss of stilbene-based compound (i1) was obtained in the same manner as in the Production Example 2 except that 1-bromo-4-methylpentane in the Production Example 2 was changed to 2-bromoethyl acetate (8.5 g, 50.9 mmol). Identification was performed by elementary analysis and NMR in the same manner as in the Production Example 1 in order to confirm that the i1 was obtained.

Production Example 35

Synthesis of Stilbene-Based Compound j1

A recovery flask (100 mL) equipped with a reflux tube was charged with titanocene dichloride (3.9 g, 15.7 mmol) and zinc powders (2.0 g, 31.5 mmol). Under a nitrogen atmosphere, dehydrated THF (free of a stabilizer) (65 mL) was added thereto and was stirred until the color of the solution changed from red to green. Next, the solution was allowed to start reflux and 4-(2-hydroxyethoxy)benzaldehyde (1.66 g, 10.0 mmol) and the intermediate of g1 (2.10 g, 10.0 mmol) in the Production Example 26 were added thereto. A reaction mixture was refluxed for 8 hours and was cooled to room temperature. Then, it was quenched with tert-butyl methyl ether and the solution obtained was filtrated. The solvent was removed under reduced pressure and the residue was dissolved in chloroform. The chloroform solution obtained was partitioned using 1N hydrochloric acid and saturated saline and was dried with magnesium sulfate to be removed under reduced pressure. The white solid obtained was recrystallized twice with ethanol. The precipitated crystal was subjected to vacuum filtration and was stacked on a round-shaped filter paper (diameter: 21 mm) to obtain a crystalline thin film body having silvery gloss of stilbene-based compound (j1). Identification was performed by elementary analysis and NMR in the same manner as in the Production Example 1 in order to confirm that the j1 was obtained.

Production Example 36

Synthesis of Stilbene-Based Compound j2

(Reaction Scheme 36)

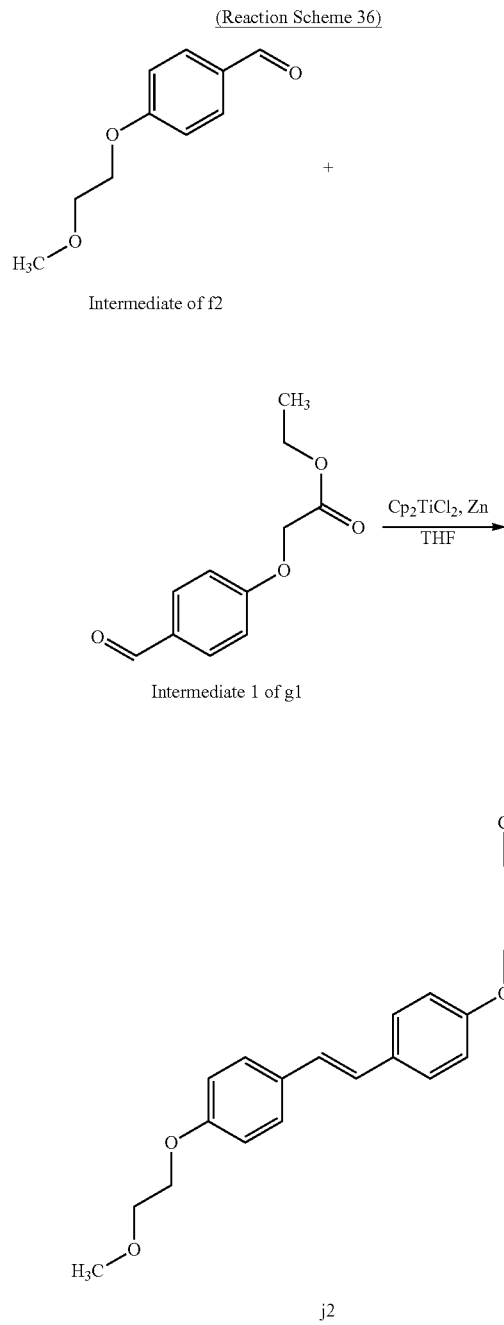

j2

A crystalline thin film body having silvery gloss of stilbene-based compound (j2) was obtained in the same manner as in the Production Example 35 except that 4-(2-hydroxyethoxy)benzaldehyde in the Production Example 35 was changed to the intermediate of f2 in the Production Example 3. Identification was performed by elementary analysis and NMR in the same manner as in the Production Example 1 in order to confirm that the j2 was obtained.

Production Example 37

Synthesis of Stilbene-Based Compound j10

(Reaction Scheme 37)

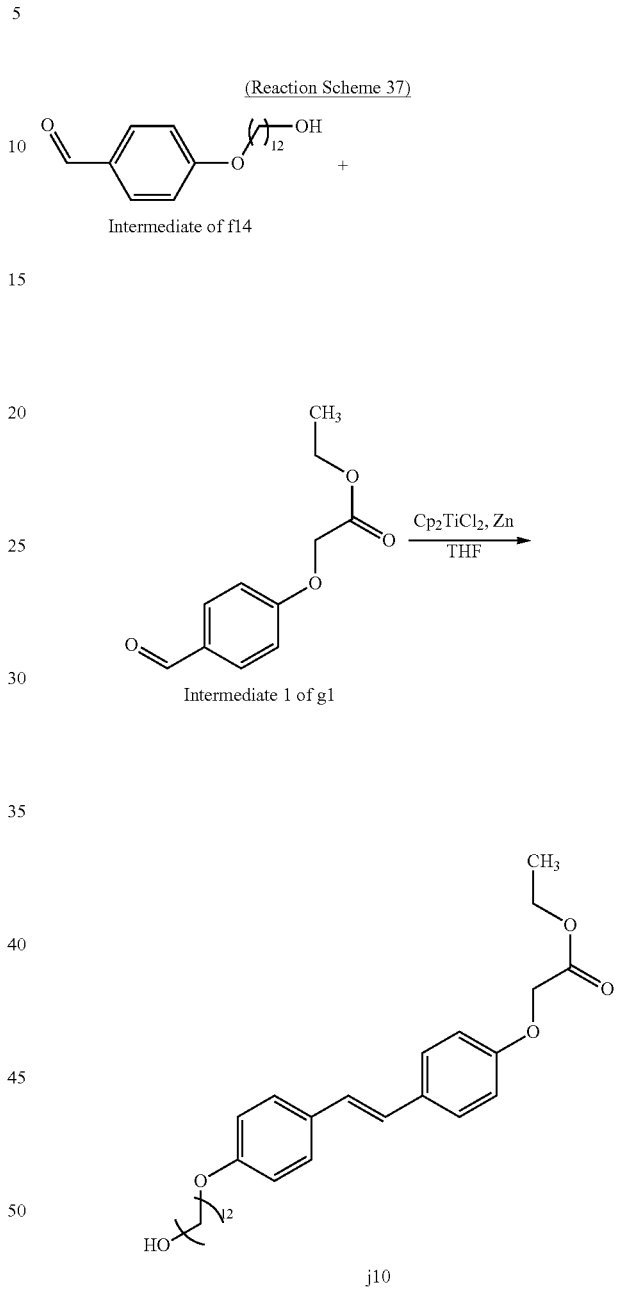

j10

A crystalline thin film body having silvery gloss of stilbene-based compound (j10) was obtained in the same manner as in the Production Example 35 except that 4-(2-hydroxyethoxy)benzaldehyde in the Production Example 35 was changed to the intermediate of f14 in the Production Example 10 (3.06 g, 10.0 mmol). Identification was performed by elementary analysis and NMR in the same manner as in the Production Example 1 in order to confirm that the j10 was obtained.

Production Example 38

Synthesis of Stilbene-Based Compound k1

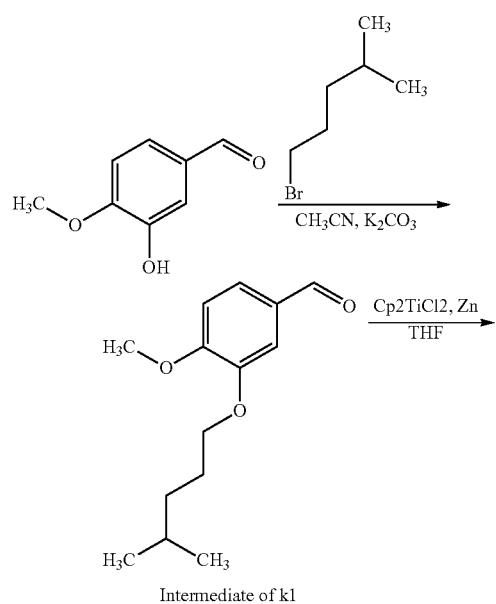

A recovery flask (100 mL) equipped with a reflux tube was charged with isovanillin (8.7 g, 57.4 mmol) and potassium carbonate (14.2 g, 102.7 mmol). Then, under a nitrogen atmosphere, acetonitrile (50 mL) serving as a solvent was added thereto. The reaction system was warmed to 75° C. Then, 1-bromo-4-methylpentane (8.4 g, 50.9 mmol) was added to the system and was refluxed 24 hours. After the reaction had been finished, potassium carbonate in the reaction mixture was removed through filtration to remove acetonitrile. The product was dissolved in ethyl acetate and the solution was partitioned using 25% by mass sodium hydroxide (2×100 mL) and saturated saline (2×100 mL). The organic layer was dried with magnesium sulfate and was removed to obtain a transparent liquid (intermediate of k1, yield: 95%).

Next, a recovery flask (100 mL) equipped with a reflux tube was charged with titanocene dichloride (3.9 g, 15.7 mmol) and zinc powders (2.0 g, 31.5 mmol). Under a nitrogen atmosphere, 65 mL of dehydrated THF (free of a stabilizer) was added thereto and the resultant was stirred until the color of the solution changed from red to green at room temperature. Next, the solution was allowed to start reflux and the intermediate of k1 (2.72 g, 5.8 mmol) was added thereto. The reaction mixture was refluxed for 8 hours and was cooled to room temperature. Then, it was quenched with tert-butyl methyl ether and the solution obtained was filtrated. The solvent was removed under reduced pressure and the residue was dissolved in chloroform. The chloroform solution obtained was partitioned using 1N hydrochloric acid and saturated saline and was dried with magnesium sulfate to be removed under reduced pressure. The white solid obtained was recrystallized twice with ethanol. The precipitated crystal was subjected to vacuum filtration and was stacked on a round-shaped filter paper (diameter: 21 mm) to obtain a crystalline thin film body having silvery gloss of stilbene-based compound (k1). Identification was performed by elementary analysis and NMR in the same manner as in the Production Example 1 in order to confirm that the k1 was obtained.

Production Example 39

Synthesis of Xylene Compound

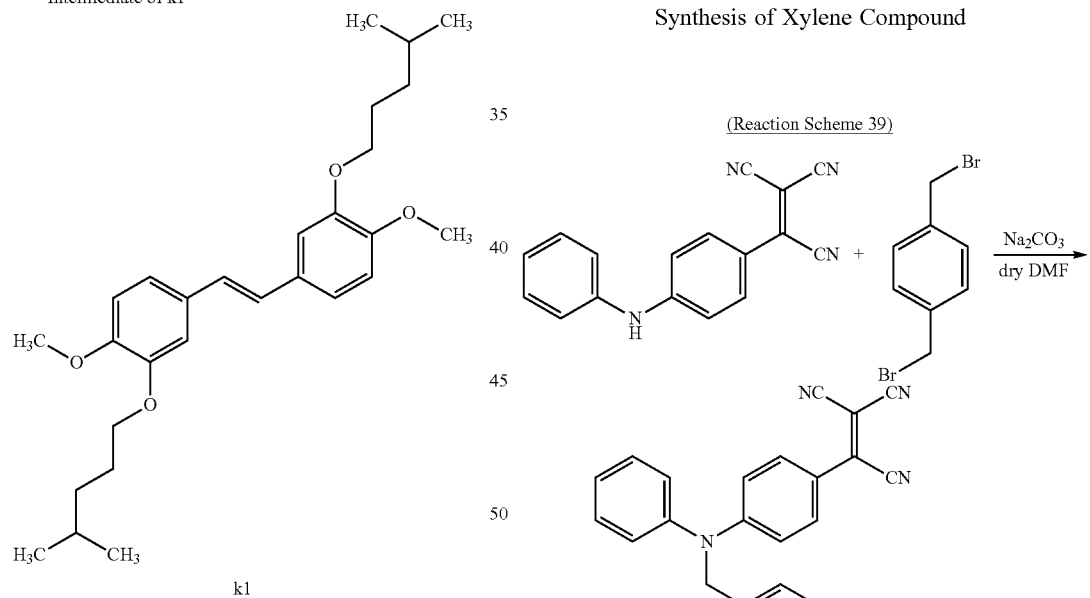

Under a nitrogen atmosphere, α,α'-dibromo-p-xylene (1.06 g, 4.00 mmol) was added to ice-cooled N-phenyl-N-

[4-(tricyanoethenyl)phenyl]amine (2.487 g, 9.2 mmol) and sodium carbonate (2.12 g, 20.0 mmol) and the resultant was suspended in dry DMF. Then, the resultant was stirred at 30° C. for 45 hours. After the reaction had been finished, vacuum filtration was performed and the solid obtained was extracted with saturated ammonium aqueous solution (100 mL). Then, the resultant was extracted with chloroform (100 mL) three times and the organic layer was dried with anhydrous magnesium sulfate to be removed under reduced pressure. Then, red powders of α,α'-bis{N-phenyl-N-[4-(tricyanoethenyl)phenylamino]}-p-xylene (0.652 g, 1.01 mmol, 25%) were obtained. These powders were recrystallized to obtain a silvery gloss crystal of the xylene compound. The xylene compound obtained was identified by elementary analysis and NMR in the same manner as in the Production Example 1 in order to confirm that the xylene compound expressed by the above Structural Formula was obtained.

Example A-1

—Preparation of Coloring Composition 1—

In a vial bottle (product name: SV-50A, available from NICHIDEN-RIKA GLASS CO., LTD), the following materials were homogeneously mixed to obtain a mixture. The crystalline thin film body having silvery gloss of stilbene-based compound a1 (10 parts by mass) was added to the mixture and the resultant was irradiated with ultrasonic wave (120 μA) at normal temperature for 1 minute using an ultrasonic homogenizer (device name: US-300T: tip diameter 7 mm, available from NIHONSEIKI KAISHA LTD.). Then, the resultant was filtrated through a filter having an average pore diameter of 5.0 μm (product name: Minisart 17594-K, Sartorius Stedim Japan K.K.) to prepare a luster material dispersion.

| -Mixture- | |
|---|---|
| Ion exchanged water: | 19.0 parts by mass |
| 3-Methyl-1,3-butanediol (JUNSEI CHEMICAL CO., LTD.): | 20.0 parts by mass |
| Dispersing agent (product name: DISPERBYK-190, available from BYK-Chemie): | 1.0 part by mass |

Moreover, the following raw materials were mixed in another vial bottle to prepare a coloring composition 1.

| -Raw materials- | |
|---|---|
| Coloring material (yellow pigment dispersion, pigment solid content: 15% by mass): | 20.3 parts by mass |
| ACRIT WEM-321U: (acrylic urethane water-based emulsion, available from Taisei Kako Co., Ltd.) | 5.0 parts by mass |
| Glycerin (available from NOF CORPORATION): | 5.0 parts by mass |
| 1,3-Butanediol (available from Tokyo Chemical Industry Co., Ltd.): | 15.0 parts by mass |
| 2-Ethyl-1,3-hexanediol (available from Tokyo Chemical Industry Co., Ltd.): | 2.5 parts by mass |
| PolyFox PF-156A: (anionic fluorosurfactant, available from OMMNOVA SOLUTIONS) | 2.0 parts by mass |
| Proxel LV: (preservative and fungicide, 1,2-benzisothiazolin-3-one, available from Avecia) | 0.12 parts by mass |
| Triethanolamine (available from NIPPON SHOKUBAI CO., LTD.): | 0.08 parts by mass |

Here, raw materials described below were mixed and the resultant was subjected to circulation dispersion for 7 hours to prepare a yellow pigment dispersion.

A yellow pigment (C.I. Pigment Yellow 74, product name: Fast Yellow 531, available from Dainichiseika Color & Chemicals Mfg. Co., Ltd.) (15 parts by mass), an anionic surfactant (product name: PIONIN A-51-B, available from TAKEMOTO OIL & FAT CO., LTD) (2 parts by mass), and ion exchanged water (83 parts by mass) were mixed and were subjected to circulation dispersion for 7 hours using a disc-type bead mill (KDL model, available from SHIN-MARU ENTERPRISES CORPORATION, media: use of zirconia balls having a diameter of 0.3 mm) to obtain a yellow pigment dispersion (pigment solid content: 15% by mass).

The prepared luster material dispersion and the raw materials were mixed in a vial bottle in equal amounts to obtain yellow luster coloring composition 1.

Examples A-2 to A-24

—Preparation of Coloring Compositions A-2 to A 24—

Yellow luster coloring compositions 2 to 9, red luster coloring compositions 1 to 6, silver luster coloring compositions 1 to 3, blue luster coloring compositions 1 to 4, green luster coloring composition 1, and orange luster coloring composition 1 were obtained in the same manner as in Example A-1 except that the stilbene-based compound in the luster material dispersion and the coloring material in the Example A-1 were changed as described in the following Tables 1-1, 1-2, 2-1, 2-2, 3-1, and 3-2.

Here, a water dispersion of titanium oxide in the following Tables 1-1 and 1-2 was prepared as follows.

Highly pure water (30.8 g) and a dispersing agent (product name: DISPERBYK-190, available from BYK Japan KK) (1.2 g) were charged into a dispersion cup and were roughly stirred to be homogenized. Then, titanium oxide (product name: GTR-100, available from Sakai Chemical Industry Co., Ltd., primary particle diameter: 260 nm, crystal form: rutile type, organic treatment product for water dispersion) (12.0 g) was added thereto. The resultant was treated using an ultrasonic homogenizer (product name: US-300T, tip diameter: 26 mm, available from NIHONSEIKI KAISHA LTD.) at 200 μA for 1 hour while cooled with water. Then, the resultant was filtered through a cellulose acetate membrane filter having an average pore diameter of 5 μm (product name: Minisart (registered trademark) NML syringe filter, available from Sartorius Japan K.K.) to obtain a water dispersion of titanium oxide having a solid content concentration of 30% by mass. A volume average particle diameter (D50) thereof was 352 nm. The volume average particle diameter (D50) was measured using a particle size distribution measuring device (product name: MICROTRAC UPA, available from NIKKISO CO., LTD.).

Comparative Example A-1

—Preparation of Yellow Luster Coloring Composition 10—

A PET film (product name: TOYOBO ESTER (registered trademark) film E5100, available from TOYOBO CO., LTD., average thickness: 100 μm) was subjected to a corona treatment and polystyrene (product name: VS1063, available from SEIKO PMC CORPORATION) dissolved in THF was coated on the surface of the film with a bar coater. Then, the surface was dried at 70° C. for 15 minutes to form a release layer of resin on the PET film.

On the surface of the release layer of resin formed on the PET film, a deposition aluminum layer having an average thickness of 30 nm was formed using a vacuum vapor deposition device (device name: VE-2012 model desktop-type vacuum vapor deposition device, available from VACUUM DEVICE CO., LTD.) to prepare an aluminum deposition PET film.

The aluminum deposition PET film was immersed in a mixture solution in which ion exchanged water and 3-methyl-1,3 butanediol were mixed at 1:1 (volume ratio) and was subjected to a release treatment for 2 hours using an ultrasonic cleaning device (device name: VS150, available from AS ONE Corporation).

After the deposition aluminum layer was released from the PET film, the PET film was removed and then an aluminum dispersion liquid was obtained. The aluminum dispersion liquid obtained was subjected to vacuum filtration and was washed with the mixture solution in which ion exchanged water and 3-methyl-1,3butanediol were mixed at 1:1 (volume ratio) to separate aluminum and polystyrene. Then, the filtrated product was dispersed again in the mixture solution in which ion exchanged water and 3-methyl-1,3-butanediol were mixed at 1:1 (volume ratio) and was subjected to a microminiaturization treatment using an ultrasonic homogenizer (device name: US-300T: tip diameter 26 mm, available from NIHONSEIKI KAISHA LTD.) for 10 hours to prepare a solution including aluminum particles.

The solution including aluminum particles was filtrated using a filter (product name: LCF-24110, available from NIHON PALL LTD., SUS304L Rigimesh, filtration precision 18 μm) and was subjected to pressure filtration using a cellulose acetate membrane filter having an average pore diameter of 5 μm to remove coarse particles. From the filtrate obtained, the mixture solution in which ion exchanged water and 3-methyl-1,3-butanediol were mixed at 1:1 (volume ratio) was partially removed using a rotary evaporator to prepare an aluminum dispersion having a solid content concentration of 40 parts by mass.

Finally, the aluminum dispersion and the raw materials described in the Example A-1 were mixed at 50:50 (volume ratio) to obtain a yellow luster coloring composition 10.

The aluminum dispersion liquid was 5,000-fold diluted. Then, the aluminum dispersion liquid was sprayed on a collodion film for transmission electron microscope (product name: collodion support film, available from EMJapan Co., Ltd.) using a sprayer and was dried. Aluminum particles on the collodion film were observed using a reflection electron microscope (device name: VE-7800, available from KEYENCE CORPORATION). When 50 aluminum particles were measured for the length of the long axis, an average length of the long axis was 3.1 μm.

Comparative Examples A-2 and A-3

Red luster coloring composition 7 and blue luster coloring composition 5 were obtained in the same manner as in the Comparative Example A-1 except that the coloring material in the coloring composition in the Comparative Example A-1 was changed as presented in the following Tables 4-1 and 4-2.

Comparative Example A-4

—Preparation of Yellow Luster Coloring Composition 11—

Yellow luster coloring composition 11 was prepared in the same manner as in the Example A-1 except that the stilbene-based compound a1 in the Example A-1 was changed to the xylene compound obtained in the Production Example 39 and formulation of the luster material dispersion was changed as presented below.

Chloroform (available from Wako Pure Chemical Industries, Ltd.): 29.0 parts by mass
Ion exchanged water: 10.0 parts by mass
Dispersing agent (product name: DISPERBYK-190, available from BYK-Chemie): 1.0 parts by mass Comparative Examples A-5 and A-6

Red luster coloring composition 8 and blue luster coloring composition 6 were obtained in the same manner as in Comparative Example A-4 except that the coloring material in the coloring composition in the Comparative Example A-4 was changed as presented in the following Tables 4-1 and 4-2.

Next, the coloring composition obtained was used to evaluate "precipitability" and "glossiness of print image" as described below. Results are presented in the following Tables 1-1, 1-2, 2-1, 2-2, 3-1, 3-2, 4-1, and 4-2.

<Evaluation of Precipitability>

The coloring composition obtained (2 mL) was collected in a flat can (product name: 10 g flat can, available from Sakamoto-kukan) and was dried in a drying machine (model number: OF-300B, available from AS ONE Corporation) at 150° C. for 8 hours. The dried product was measured for mass using an electronic balance (type: PM4000, available from Mettler Toledo International Inc.). Then, an initial solid content $NV_0$ of the coloring composition was determined.

Meanwhile, a 50 mL vial bottle (product name: SV-50A, available from NICHIDEN RIKA GLASS CO, LTD.) was charged with the coloring composition (30 mL) and was warmed to 60° C. using a digital hot stirrer (device name: digital hot stirrer DP-1M, available from AS ONE Corporation). Then, the vital bottle was left to stand at 60° C. for a week. A supernatant (2 mL) was gently collected in a flat can without shaking the vital bottle that had been left to stand. The supernatant was dried in a drying machine at 150° C. for 8 hours. Then, the coloring composition was determined for solid content $NV_1$ obtained after the coloring composition was left to stand over time (hereinafter referred to as "over time solid content $NV_1$").

The measured $NV_0$ and $NV_1$ were used to calculate a precipitability rate using the following Formula. The precipitability was evaluated based on the evaluation criteria.

$$\text{Precipitability rate (\%)} = \{1-(\text{over time sohd content } NV_1 \text{ of the coloring composition/initial solid content } NV_0 \text{ of the coloring composition})\} \times 100 \quad \text{Formula (1)}$$

<Evaluation Criteria>
Rank 1: Precipitability rate is 5% or less.
Rank 2: Precipitability rate is more than 5%.

—Method for Forming Image—

The coloring composition including the stilbene-based compound obtained was loaded into an ink cartridge. Then, an inkjet printer (device name: IPSiO GX3000, available from RICOH Company, Ltd.) including the ink cartridge was used to obtain a solid image (50 mm×50 mm). Here, the ink was loaded into all nozzles and it was confirmed that no abnormal image was formed. A discharge amount of the ink was adjusted so that a deposition amount of the ink on a print medium (product name: COLOR PAPER A4 medium thickness, available from Nagatoya-shouten co., ltd.) was 100 g/m².

<Evaluation of Glossiness of Print Image>

Each of the print images was measured for glossiness using a precision gloss meter (device name: GM26-DS, available from MURAKAMI COLOR RESEARCH LABORATORY). The "glossiness of print image" was evaluated based on the following evaluation criteria. Results are presented in the following Tables 1-1, 1-2, 2-1, 2-2, 3-1, 3-2, 4-1, and 4-2.

<Evaluation Criteria>
Rank 1: Glossiness is 70 or more.
Rank 2: Glossiness is 50 or more but less than 70.
Rank 3: Glossiness is 30 or more but less than 50.
Rank 4: Glossiness is less than 30.

The print image obtained was visually observed and it was confirmed that the print image had the desired metallic gloss color.

TABLE 1-1

| | Coloring composition | Luster coloring material Kind | General Formula $R_1$ | General Formula $R_2$ | Coloring material | Precipitability rank | Rank of glossiness of print image |
|---|---|---|---|---|---|---|---|
| Example A-1 | Yellow luster coloring composition 1 | a1 | | (CH(CH₃)₂-CH₂-CH=CH-*) | C.I. Pigment Yellow 74 | 1 | 2 |
| Example A-2 | Red luster coloring composition 1 | a1 | | (CH(CH₃)₂-CH₂-CH=CH-*) | C.I. Pigment Red 122 | 1 | 2 |
| Example A-3 | Blue luster coloring composition 1 | a1 | | (CH(CH₃)₂-CH₂-CH=CH-*) | C.I. Pigment Blue 15:3 | 1 | 2 |
| Example A-4 | Silver luster coloring composition 1 | a1 | | (CH(CH₃)₂-CH₂-CH=CH-*) | C.I. Pigment Black 1 | 1 | 2 |

TABLE 1-2

| | Coloring composition | Luster coloring material Kind | General Formula $R_1$ | General Formula $R_2$ | Coloring material | Precipitability rank | Rank of glossiness of print image |
|---|---|---|---|---|---|---|---|
| Example A-5 | Silver luster coloring composition 2 | a1 | | (CH(CH₃)₂-CH₂-CH=CH-*) | Titanium oxide | 1 | 2 |
| Example A-6 | Yellow luster coloring composition 2 | a8 | | (CH(CH₃)-*) | C.I. Pigment Yellow 74 | 1 | 2 |

TABLE 1-2-continued

| Coloring composition | Luster coloring material | | | Coloring material | Evaluation results | |
|---|---|---|---|---|---|---|
| | Kind | General Formula R₁ | R₂ | | Precipitability rank | Rank of glossiness of print image |
| Example A-7 | Red luster coloring composition 2 | b2 | 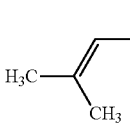 | C.I. Pigment Red 122 | 1 | 2 |
| Example A-8 | Blue luster coloring composition 2 | c1 | 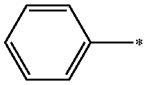 | C.I. Pigment Blue 15:3 | 1 | 2 |

Note that, the symbol * presented in the Tables 1-1 and 1-2 is a position at which R₁ and R₂ are bound to each oxygen atom of the stilbene skeleton.

TABLE 2-1

| Coloring composition | Luster coloring material | | | Coloring material | Evaluation results | |
|---|---|---|---|---|---|---|
| | Kind | General Formula R₁ | R₂ | | Precipitability rank | Rank of glossiness of print image |
| Example A-9 | Yellow luster coloring composition 3 | d1 | 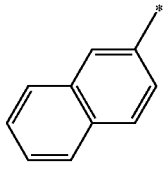 | C.I. Acid Yellow 142 | 1 | 2 |
| Example A-10 | Red luster coloring composition 3 | e1 | 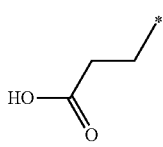 | C.I. Direct Red 80 | 1 | 2 |
| Example A-11 | Blue luster coloring composition 3 | e2 | 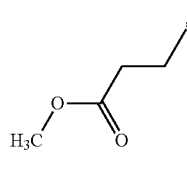 | C.I. Direct Blue 71 | 1 | 2 |
| Example A-12 | Yellow luster coloring composition 4 | e6 | 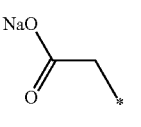 | C.I. Pigment Yellow 74 | 1 | 2 |

TABLE 2-2

| | Coloring composition | Luster coloring material | | | Coloring material | Evaluation results | |
|---|---|---|---|---|---|---|---|
| | | | General Formula | | | Precipitability rank | Rank of glossiness of print image |
| | | Kind | R₁ | R₂ | | | |
| Example A-13 | Green luster coloring composition 1 | f1 | *—(CH₂)₂—OH | | C.I. Pigment Green 26 | 1 | 1 |
| Example A-14 | Orange luster coloring composition 1 | f4 | | 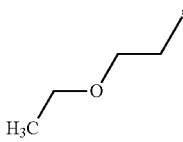 | C.I. Pigment Orange 43 | 1 | 2 |
| Example A-15 | Yellow luster coloring composition 5 | f5 | | 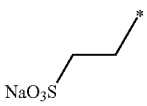 | C.I. Acid Yellow 142 | 1 | 1 |
| Example A-16 | Yellow luster coloring composition 6 | f6 | | 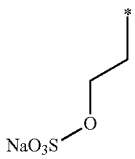 | C.I. Pigment Yellow 74 | 1 | 2 |

Note that, the symbol * presented in the Tables 2-1 and 2-2 is a position at which R₁ and R₂ are bound to each oxygen atom of the stilbene skeleton.

TABLE 3-1

| | Coloring composition | Luster coloring material | | | Coloring material | Evaluation results | |
|---|---|---|---|---|---|---|---|
| | | | General Formula | | | Precipitability rank | Rank of glossiness of print image |
| | | Kind | R₁ | R₂ | | | |
| Example A-17 | Yellow luster coloring composition 7 | f8 | | 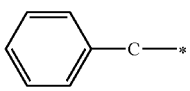 | C.I. Pigment Yellow 74 | 1 | 3 |
| Example A-18 | Red luster coloring composition 4 | f12 | | 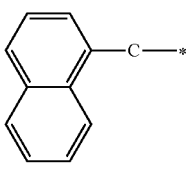 | C.I. Pigment Red 122 | 1 | 3 |
| Example A-19 | Yellow luster coloring composition 8 | g1 | | 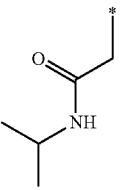 | C.I. Pigment Yellow 74 | 1 | 2 |
| Example A-20 | Yellow luster coloring composition 5 | g3 | | 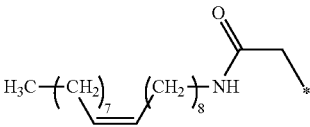 | C.I. Pigment Red 122 | 1 | 3 |

TABLE 3-2

| Coloring composition | Luster coloring material Kind | General Formula $R_1$ | General Formula $R_2$ | Coloring material | Precipitability rank | Rank of glossiness of print image |
|---|---|---|---|---|---|---|
| Example A-21 | Blue luster coloring composition 4 | g4 | | *-C(=O)-CH$_2$-NH-CH$_2$-CH$_2$-OH | C.I. Pigment Blue 15:3 | 1 | 2 |
| Example A-22 | Silver luster coloring composition 3 | h2 | | *-C(=O)-CH(CH$_3$)-O-CH$_2$-CH$_3$ | C.I. Pigment Black 1 | 1 | 2 |
| Example A-23 | Yellow luster coloring composition 9 | i1 | | H$_3$C-C(=O)-O-CH$_2$-CH$_2$-* | C.I. Pigment Yellow 74 | 1 | 2 |
| Example A-24 | Red luster coloring composition 6 | j1 | *—(CH$_2$)$_2$—OH | CH$_3$-O-C(=O)-CH$_2$-* | C.I. Pigment Red 122 | 1 | 3 |

Note that, the symbol * presented in the Tables 3-1 and 3-2 is a position at which $R_1$ and $R_2$ are bound to each oxygen atom of the stilbene skeleton.

TABLE 4-1

| Coloring composition | Luster coloring material Kind | General Formula | Coloring material | Precipitability rank | Rank of glossiness of print image |
|---|---|---|---|---|---|
| Comparative Example A-1 | Yellow luster coloring composition 10 | Aluminum particles | — | C.I. Pigment Yellow 74 | 2 | 1 |
| Comparative Example A-2 | Red luster coloring composition 7 | Aluminum particles | — | C.I. Pigment Red 122 | 2 | 1 |
| Comparative Example A-3 | Blue luster coloring composition 5 | Aluminum particles | — | C.I. Pigment Blue 15:3 | 2 | 1 |

TABLE 4-2

| Coloring composition | Luster coloring material | | | Coloring material | Evaluation results | |
|---|---|---|---|---|---|---|
| | Kind | General Formula | | | Precipitability rank | Rank of glossiness of print image |
| Comparative Example A-1 | Yellow luster coloring composition 11 | Xylene compound | Structure Formula (triarylamine dicyanomethylene compound) | | C.I. Pigment Yellow 74 | 1 | 4 |
| Comparative Example A-5 | Red luster coloring composition 8 | Xylene compound | Structure Formula (triarylamine dicyanomethylene compound) | | C.I. Pigment Red 122 | 1 | 4 |
| Comparative Example A-6 | Blue luster coloring composition 6 | Xylene compound | Structure Formula (triarylamine dicyanomethylene compound) | | C.I. Pigment Blue 15:3 | 1 | 4 |

Here, the product names and their manufacturers of the coloring materials used in the Examples A-1 to A-24 and Comparative Examples A-1 to A-6 are presented in the following Table 5.

TABLE 5

| Coloring material | Product | Manufacturer |
|---|---|---|
| C.I. Pigment Yellow 74 | Fast Yellow 531 | Dainichiseika Color & Chemicals Mfg. Co., Ltd. |
| C.I. Acid Yellow 142 | Acid Yellow 142 | Bayer AG |
| C.I. Pigment Red 122 | Toner Magenta E002 | Clariant (Japan) K. K. |
| C.I. Direct Red 80 | Direct Red 80 | Tokyo Chemical Industry Co., Ltd. |
| C.I. Pigment Blue 15:3 | LIONOL BLUE FG-7351 | TOYO INK CO., LTD. |
| C.I. Direct Blue 71 | Direct Blue 71 | Sigma-Aldrich Japan |
| C.I. Pigment Green 26 | Pigment Green 26 | Asahi Kasei Kogyo Co., LTD. |
| C.I. Pigment Orange 43 | Pigment Orange 43 | Tokyo Chemical Industry Co., Ltd. |
| C.I. Pigment Black 1 | Pigment Black 1 | TOKYO SHIKIZAI INDUSTRY CO., LTD. |
| Titanium oxide | GTR-100 | Sakai Chemical Industry Co., Ltd. |
| Aluminum particles | High-purity aluminum glanules | CRAFT Co., Ltd. |

From the results in the Tables 1-1, 1-2, 2-1, 2-2, 3-1, 3-2, 4-1, and 4-2, it is found that use of the coloring composition including the stilbene-based compound and the coloring material according to the present disclosure makes it possible to obtain an image having a metallic gloss color achieving Rank 1, Rank 2, or Rank 3 without precipitating the luster coloring material even in a state that the coloring composition was stored over time. Here, the Rank 1, the Rank 2, and the Rank 3 are a practical level of the glossiness.

Example B-1

—Preparation of Inkjet Ink 1—

In a vial bottle (product name: SV-50A, available from NICHIDEN-RIKA GLASS CO., LTD), the following materials were homogeneously mixed to obtain a mixture. The crystalline thin film body having silvery gloss of stilbene-based compound f1 (6 parts by mass) was added to the mixture and the resultant was irradiated with ultrasonic wave (120 μA) at normal temperature for 1 minute using an ultrasonic homogenizer (device name: US-300T: tip diameter 7 mm, available from NIHONSEIKI KAISHA LTD.). Then, the resultant was filtrated through a filter having an average pore diameter of 5.0 μm (product name: Minisart 17594-K, Sartorius Stedim Japan K.K.) to prepare a dispersion.

| | |
|---|---|
| Ion exchanged water: | 11.4 parts by mass |
| 3-Methyl-1,3-butanediol: | 12.0 parts by mass |
| Dispersing agent (available from DISPERBYK-190 (YK-Chemie)): | 0.6 parts by mass |

Meanwhile, raw materials presented below were mixed to prepare a vehicle.

| | |
|---|---|
| ACRIT WEM-321U: (acrylic urethane water-based emulsion, available from Taisei Kako Co., Ltd.) | 12.3 parts by mass |
| Glycerin: | 11.7 parts by mass |
| 1,3-Butanediol: | 35.2 parts by mass |
| 2-Ethyl-1,3-hexanediol: | 6.3 parts by mass |
| PolyFox PF-156A: (anionic fluorosurfactant, available from OMMNOVA SOLUTIONS) | 5.2 parts by mass |
| Proxel LV: (preservative and fungicide, 1,2-benzisothiazolin- | 0.3 parts by mass |

-continued

| | |
|---|---|
| 3-one, available from Avecia) | |
| Triethanolamine: | 0.2 parts by mass |
| Ion exchanged water: | 28.9 parts by mass |

The dispersion and the vehicle prepared in the above procedures were mixed in equal amounts to obtain an inkjet ink 1.

Examples B-2 to B-36 and Comparative Example B-1

—Preparation of Inkjet Inks 2 to 37—

Inkjet inks 2 to 37 were obtained in the same manner as in the Example B-1 except that the f1 in the Example B-1 was changed to each stilbene based compound presented in the following Tables 6 to 9.

<Method for Forming Printed Matter>

The inkjet ink including the stilbene-based compound obtained was loaded into an ink cartridge. Then, an inkjet printer (device name: IPSiO GX3000, available from RICOH Company, Ltd.) including the ink cartridge was used to obtain a solid image (50 mm×50 mm) through 1-pass printing. Here, the ink was loaded into all nozzles and it was confirmed that no abnormal image was formed. A discharge amount of the ink was adjusted so that a deposition amount of the ink on a print medium (product name: COLOR PAPER A4 medium thickness, available from Nagatoyashouten co., ltd.) was 100 g/m$^2$.

<Evaluation of Silvery Glossiness>

The printed matters were measured for the specular reflectance and the color values and were evaluated for the silvery glossiness.

That is, an UV-visible spectrophotometer (product name: V-570 UV/VIS/NIR Spectrophotometer, available from JASCO Corporation) was equipped with a large integrating sphere device (product name: ILN-472 model, large integrating sphere device color diagnosis program, available from JASCO Corporation). With the optical trap reflector plate being removed, each printed matter that had been set in a sample holder was measured for the diffuse reflectance. Then, the optical trap reflector plate was inserted therein and the total reflectance was measured. The specular reflectance was calculated according to the formula "specular reflectance=total reflectance−diffuse reflectance". In addition, from the measurement result of the total reflectance, each color value was calculated. The specular reflectance and the color values obtained were judged based on the following evaluation criteria and the results are presented in the following Tables 6 to 9.

Note that, it can be judged that when both the specular reflectance and the color values (a* value, b* value) achieve Rank 1, Rank 2, or Rank 3, the inkjet ink has a practicable silvery gloss.

<Specular Reflectance: Evaluation Criteria>
Rank 3: 20%≤specular reflectance
Rank 2: 15%≤specular reflectance<20%
Rank 1: 10%≤specular reflectance<15%
<Color Value (a* Value): Evaluation Xriteria>
Rank 3: −1.5≤a*≤1.5
Rank 2: −2.5≤a*<−1.5 or 1.5<a*≤2.5
Rank 1: −3.5≤a*<−2.5 or 2.5<a*≤3.5
<Color Value (b* Value): Evaluation Criteria>
Rank 3: −1.5≤b*≤1.5
Rank 2: −2.5≤b*<−1.5 or 1.5<b*≤2.5
Rank 1: −3.5≤b*<−2.5 or 2.5<b*≤3.5

TABLE 6

|  |  | General Formula (1) | | Silvery glossiness | | |
|---|---|---|---|---|---|---|
|  | Kind | $R_1$ | $R_2$ | Specular reflectance | Color value a*value | Color value b*value |
| Example B-1 | f1 | *—(CH$_2$)$_2$—OH | | Rank 3 | Rank 3 | Rank 3 |
| Example B-2 | a1 | 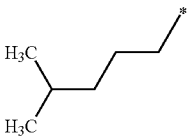 | | Rank 2 | Rank 3 | Rank 3 |
| Example B-3 | f2 | 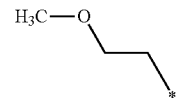 | | Rank 2 | Rank 3 | Rank 3 |
| Example B-4 | f4 | 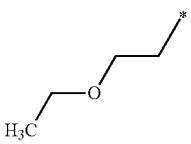 | | Rank 2 | Rank 3 | Rank 3 |
| Example B-5 | f5 | 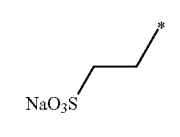 | | Rank 3 | Rank 3 | Rank 3 |
| Example B-6 | f6 | 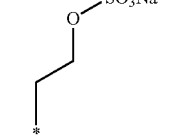 | | Rank 3 | Rank 3 | Rank 3 |
| Example B-7 | f8 | 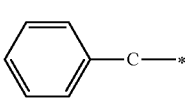 | | Rank 1 | Rank 1 | Rank 1 |
| Example B-8 | f9 | 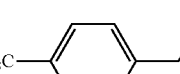 | | Rank 1 | Rank 1 | Rank 1 |
| Example B-9 | f12 | 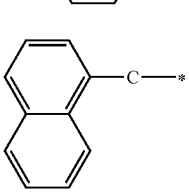 | | Rank 3 | Rank 3 | Rank 3 |

TABLE 6-continued

| | | General Formula (1) | | Silvery glossiness | | |
| | | | | Specular | Color value | Color value |
| | Kind | $R_1$ | $R_2$ | reflectance | a*value | b*value |
|---|---|---|---|---|---|---|
| Example B-10 | f14 | | HO—(  )₁₂—* | Rank 3 | Rank 2 | Rank 2 |
| Example B-11 | a2 | | H₃C—(CH)₁₇—* | Rank 1 | Rank 1 | Rank 1 |
| Example B-12 | a3 | | H₃C—(CH)₁₀—* | Rank 2 | Rank 2 | Rank 2 |

Note that, the symbol * presented in the Table 6 is a position at which $R_1$ and $R_2$ are bound to each oxygen atom of the stilbene skeleton.

TABLE 7

| | | General Formula (1) | | Silvery glossiness | | |
| | | | | Specular | Color value | Color value |
| | Kind | $R_1$ | $R_2$ | reflectance | a*value | b*value |
|---|---|---|---|---|---|---|
| Example B-13 | a4 | |  | Rank 2 | Rank 3 | Rank 3 |
| Example B-14 | a8 | | 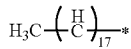 | Rank 2 | Rank 3 | Rank 3 |
| Example B-15 | a10 | 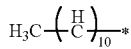 | | Rank 3 | Rank 3 | Rank 3 |
| Example B-16 | b2 | | 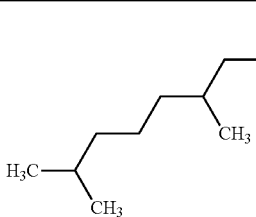 | Rank 2 | Rank 3 | Rank 3 |
| Example B-17 | b3 | | H₂C=CH—(CH₂)₁₆—* | Rank 1 | Rank 1 | Rank 1 |
| Example B-18 | e1 | |  | Rank 1 | Rank 1 | Rank 1 |
| Example B-19 | c3 | | 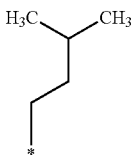 | Rank 2 | Rank 1 | Rank 1 |

TABLE 7-continued

| | | General Formula (1) | | Silvery glossiness | | |
| | Kind | R₁ | R₂ | Specular reflectance | Color value a*value | Color value b*value |
|---|---|---|---|---|---|---|
| Example B-20 | d1 | | 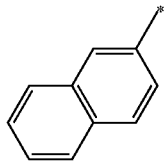 | Rank 1 | Rank 1 | Rank 1 |
| Example B-21 | d7 | | 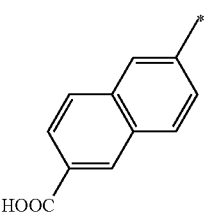 | Rank 2 | Rank 1 | Rank 1 |
| Example B-22 | e1 | | 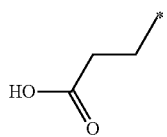 | Rank 3 | Rank 3 | Rank 3 |
| Example B-23 | e2 | | 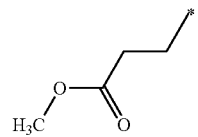 | Rank 3 | Rank 3 | Rank 3 |
| Example B-24 | e3 | | 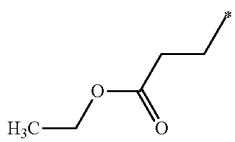 | Rank 3 | Rank 3 | Rank 3 |

Note that, the symbol * presented in the Table 7 is a position at which R₁ and R₂ are bound to each oxygen atom of the stilbene skeleton.

TABLE 8

| | | General Formula (1) | | Silvery glossiness | | |
| | Kind | R₁ | R₂ | Specular reflectance | Color value a*value | Color value b*value |
|---|---|---|---|---|---|---|
| Example B-25 | e5 | 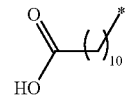 | | Rank 2 | Rank 2 | Rank 2 |
| Example B-26 | g1 | | 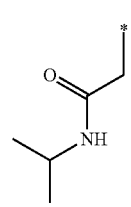 | Rank 3 | Rank 3 | Rank 3 |

TABLE 8-continued

| | | General Formula (1) | | Silvery glossiness | | |
| --- | --- | --- | --- | --- | --- | --- |
| | | | | Specular | Color value | Color value |
| | Kind | R₁ | R₂ | reflectance | a*value | b*value |
| Example B-27 | g2 | $H_3C-(CH_2)_{16}-NH-C(=O)-CH_2-*$ | | Rank 1 | Rank 2 | Rank 2 |
| Example B-28 | g3 | $H_3C-(CH_2)_7-CH=CH-(CH_2)_8-NH-C(=O)-CH_2-*$ | | Rank 1 | Rank 2 | Rank 2 |
| Example B-29 | g4 | $HO-CH_2CH_2-NH-C(=O)-CH_2-*$ | | Rank 3 | Rank 3 | Rank 3 |
| Example B-30 | g6 | $HO-(CH_2)_{12}-NH-C(=O)-CH_2-*$ | | Rank 2 | Rank 2 | Rank 2 |
| Example B-31 | g7 | allyl-NH-C(=CH_2)-* | | Rank 3 | Rank 3 | Rank 3 |
| Example B-32 | h2 | $CH_3CH_2-O-C(=O)-CH(CH_3)-*$ | | Rank 3 | Rank 3 | Rank 3 |
| Example B-33 | i1 | $H_3C-C(=O)-O-CH_2CH_2CH_2-*$ | | Rank 3 | Rank 3 | Rank 3 |
| Example B-34 | j1 | *—(CH₂)₂—OH | $CH_3CH_2-O-C(=O)-CH_2-*$ | Rank 2 | Rank 3 | Rank 3 |

TABLE 8-continued

| | | General Formula (1) | | Silvery glossiness | | |
| | Kind | R₁ | R₂ | Specular reflectance | Color value a*value | Color value b*value |
|---|---|---|---|---|---|---|
| Example B-35 | j2 | 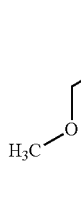 | 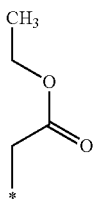 | Rank 2 | Rank 3 | Rank 3 |
| Example B-36 | j10 |  | 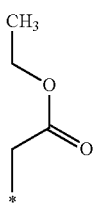 | Rank 1 | Rank 2 | Rank 2 |

Note that, the symbol * presented in the Table 8 is a position at which R₁ and R₂ are bound to each oxygen atom of the stilbene skeleton.

TABLE 9

| | Kind | Structural Formula | Silvery glossiness | | |
| | | | Specular reflectance | Color value a*value | Color value b*value |
|---|---|---|---|---|---|
| Comparative Example B-1 | k1 | 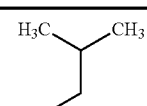 | Less than 10% | 1 | 1 |

From the results in the Tables 6 to 8, it is found that use of each of the inkjet inks 1 to 36 including the stilbene-based compound according to the present disclosure makes it possible to obtain an image having silvery gloss, which achieves a practicably level. In addition, from the results in the Table 9, it was found that the stilbene-based compound k1 including substituents at the stilbene base skeleton in the Comparative Example B-1 did not achieve practically suitable level because the stilbene-based compound k1 exhibited specular reflectance of less than 10% and did not develop silvery gloss.

Aspects of the present disclosure are as follows.

<1> An inkjet ink including
a stilbene-based compound represented by General Formula (1) below,

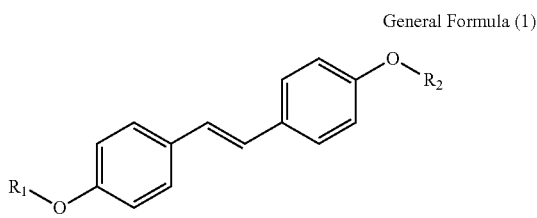

General Formula (1)

where in the General Formula (1), $R_1$ and $R_2$ each independently represent an alkyl group including 1 to 20 carbon atoms, an alkenyl group including 1 to 20 carbon atoms, a phenyl group, a naphthyl group, or a group represented by $-(CH_2)_n-COO-R_3$, $-(CH_2)_n-R_4$, $-(CH_2)_n-CONH-R_5$, $-CR_6R_7-COO-R_8$, or $-(CH_2)_n-OCOCH_3$;

$R_3$ represents a hydrogen atom, an alkali metal atom, or an alkyl group including 1 to 2 carbon atoms;

$R_4$ represents a hydroxy group, an alkoxy group including 1 to 2 carbon atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms;

$R_5$ represents an alkyl group including 1 to 20 carbon atoms, an alkenyl group including 1 to 20 carbon atoms, or hydroxyalkyl group including 1 to 12 carbon atoms;

$R_6$ represents a hydrogen, atom or a methyl group;

$R_7$ represents an alkyl group including 1 to 4 carbon atoms;

$R_8$ represents an alkyl group including 1 to 5 carbon atoms; and n is an integer of from 1 to 12.

<2> The inkjet ink according to <1>, further including a coloring material.

<3> The inkjet ink according to <1> or <2>,
wherein the phenyl group and the naphthyl group in the $R_1$ and the $R_2$ and the phenylalkyl group and the naphthylalkyl group in the $R_4$ may have a substituent, and
wherein the substituent is at least one selected from the group consisting of an alkyl group, an alkenyl group, a hydroxy alkyl group, a hydroxy group, an alkoxy group, an alkenyloxy group, a cyano group, a cyanoalkyl group, a carboxy group, an alkoxycarbonyl group, and an amino group.

<4> The inkjet ink according to any one of <1> to <3>, wherein the $R_1$ and the $R_2$ are $-(CH_2)_2-OH$.

<5> The inkjet ink according to any one of <1> to <3>, wherein the $R_1$ and the $R_2$ are sodium ethylsulfonate.

<6> The inkjet ink according to any one of <1> to <3>, wherein the $R_1$ and the $R_2$ are sodium ethyl ether sulfonate.

<7> The inkjet ink according to any one of <1> to <3>, wherein the $R_1$ and the $R_2$ are 2-methyl butane.

<8> The inkjet ink according to any one of <1> to <3>, wherein the $R_1$ and the $R_2$ are propionic acid.

<9> The inkjet ink according to any one of <1> to <3>, wherein the $R_1$ and the $R_2$ are methyl propionate.

<10> The inkjet ink according to any one of <1> to <3>, wherein the $R_1$ and the $R_2$ are ethyl propionate.

<11> The inkjet ink according to any one of <1> to <10>, wherein the coloring material includes at least one selected from the group consisting of C.I. Pigment Yellow 74, C.I. Acid Yellow 142, C.I. Pigment Red 122, C.I. Direct Red 80, C.I. Pigment Blue 15:3, C.I. Direct Blue 71, C.I. Pigment Green 26, C.I. Pigment Orange 43, C.I. Pigment Black 1, and titanium oxide.

<12> The inkjet ink according to any one of <1> to <11>, further including at least one of water and an organic solvent.

<13> The inkjet ink according to <12>,
wherein the water includes at least one selected from the group consisting of ion exchanged water, ultrafiltrated water, reverse osmotic water, distilled water, and ultrapure water.

<14> The inkjet ink according to <12> or <13>,
wherein the organic solvent is an aqueous organic solvent.

<15> The inkjet ink according to <14>,
wherein the aqueous organic solvent includes at least one selected from the group consisting of 1,3-butanediol, 3-methyl-1,3-butanediol, 2-ethyl-1,3-hexanediol, glycerin, and triethanolamine.

<16> The inkjet ink according to <14> or <15>,
wherein an amount of the aqueous organic solvent is 1% by mass or more but 40% by mass or less.

<17> The inkjet ink according to any one of <14> to <15>,
wherein an amount of the aqueous organic solvent is 3% by mass or more but 30% by mass or less.

<18> The inkjet ink according to any one of <1> to <17>, further including a resin.

<19> The inkjet ink according to <18>,
wherein the resin includes at least one selected from the group consisting of urethane resins, polyester resins, acrylic resins, vinyl acetate-based resins, styrene-based resins, butadiene-based resins, styrene-butadiene-based resins, vinylchloride-based resins, acrylic styrene-based resins, and acrylic silicone-based resins.

<20> The inkjet ink according to any one of <1> to <19>, further including a surfactant.

<21> The inkjet ink according to <20>,
wherein the surfactant includes at least one selected from the group consisting of silicone-based surfactants, fluorosurfactants, amphoteric surfactants, nonionic surfactants, and anionic surfactants.

<22> The inkjet ink according to <20> or <21>,
wherein the surfactant includes the fluorosurfactant.

<23> A coloring composition including:
a stilbene-based compound represented by General Formula (1) below: and
a coloring material.

General Formula (1)

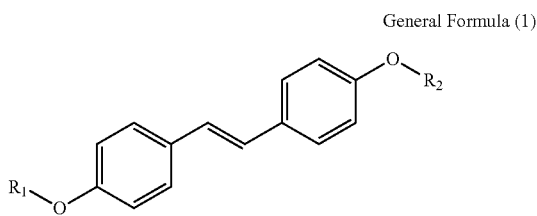

where in the General Formula (1), $R_1$ and $R_2$ each independently represent an alkyl group including 1 to 20 carbon atoms, an alkenyl group including 1 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—$OCOCH_3$;

$R_3$ represents a hydrogen atom, an alkali metal atom, or an alkyl group including 1 to 2 carbon atoms;

$R_4$ represents a hydroxy group, an alkoxy group including 1 to 2 carbon, atoms, an alkenyloxy group including 2 to 5 carbon atoms, a $SO_3Na$ group, an $OSO_3Na$ group, a phenylalkyl group where an alkyl portion of the phenylalkyl group includes from 1 to 3 carbon atoms, or a naphthylalkyl group where an alkyl portion of the naphthylalkyl group includes from 1 to 3 carbon atoms;

$R_5$ represents an alkyl group including 1 to 20 carbon atoms, an alkenyl group including 1 to 20 carbon atoms, or a hydroxyalkyl group including 1 to 12 carbon atoms;

$R_6$ represents a hydrogen atom or a methyl group;

$R_7$ represents an alkyl group including 1 to 4 carbon atoms;

$R_8$ represents an alkyl group including 1 to 5 carbon atoms; and n is an integer of from 1 to 12.

<24> The coloring composition according to <23>,
wherein the phenyl group and the naphthyl group in the $R_1$ and the $R_2$ and the phenylalkyl group and the naphthylalkyl group in the $R_4$ may have a substituent, and
wherein the substituent is at least one selected from the group consisting of an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group.

<25> The coloring composition according to <23> or <24>, wherein the $R_1$ and the $R_2$ are —$(CH_2)_2$—OH.

<26> The coloring composition according to <23> or <24>, wherein the $R_1$ and the $R_2$ are sodium ethylsulfonate.

<27> The coloring composition according to <23> or <24>, wherein the $R_1$ and the $R_2$ are sodium ethyl ether sulfonate.

<28> The coloring composition according to <23> or <24>, wherein the $R_1$ and the $R_2$ are a 2-methylpentyl group.

<29> The coloring composition according to <23> or <24>, wherein the $R_1$ and the $R_2$ are propionic acid.

<30> The coloring composition according to <23> or <24>, wherein the $R_1$ and the $R_2$ are methyl propionate.

<31> The coloring composition according to <23> or <24>, wherein the $R_1$ and the $R_2$ are ethyl propionate.

<32> The coloring composition according to any one of <23> to <31>,
wherein the coloring material includes at least one selected from the group consisting of C.I. Pigment Yellow 74, C.I. Acid Yellow 142, C.I. Pigment Red 122, C.I. Direct Red 80, C.I. Pigment Blue 15:3, C.I. Direct Blue 71, C.I. Pigment Green 26, C.I. Pigment Orange 43, C.I. Pigment Black 1, and titanium oxide.

<33> The coloring composition according to any one of <23> to <32>,
further including at least one of water and an organic solvent.

<34> The coloring composition according to <33>,
wherein the organic solvent includes at least one selected from the group consisting of alcohols, glycol ethers, esters, and ketones.

<35> The coloring composition according to <33> or <34>,
wherein the organic solvent includes at least one selected from the group consisting of 1,3-butanediol, 3-methyl-1, 3-butanediol, 2-ethyl-1,3-hexanediol, glycerin, and triethanolamine.

<36> The coloring composition according to any one of <33> to <35>,
wherein an amount of the organic solvent is 1% by mass or more but 40% by mass or less.

<37> The coloring composition according to any one of <33> to <35>,
wherein the amount of the organic solvent is 3% by mass or more but 30% by mass or less.

<38> The coloring composition according to any one of <23> to <37>,
further including a resin.

<39> The coloring composition according to <38>,
wherein the resin includes at least one selected from the group consisting of urethane resins, polyester resins, acrylic resins, vinyl acetate-based resins, styrene-based resins, butadiene-based resins, styrene-butadiene-based resins, vinylchloride-based resins, acrylic styrene-based resins, and acrylic silicone-based resins.

<40> The coloring composition according to any one of <23> to <39>,
further including a surfactant.

<41> The coloring composition according to <40>,
wherein the surfactant includes at least one selected from the group consisting of silicone-based surfactants, fluorosurfactants, amphoteric surfactants, nonionic surfactants, and anionic surfactants.

<42> The coloring composition according to <40> or <41>,
wherein the surfactant includes the fluorosurfactant.

The inkjet ink according to any one of <1> to <22> and the coloring composition according to any one of <23> to <42> can solve the existing problems in the art and can achieve the object of the present disclosure.

What is claimed is:
1. An inkjet ink comprising:
a stilbene-based compound represented by General Formula (1),

General Formula (1)

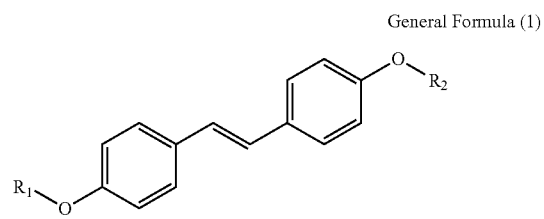

where in the General Formula (1), $R_1$ and $R_2$ each independently represent an alkyl group having 1 to 20 carbon atoms, an alkenyl group having 1 to 20 carbon atoms, a phenyl group, a naphthyl group, or a group represented by —(CH$_2$)$_n$—COO—R$_3$, —(CH$_2$)$_n$—R$_4$, —(CH$_2$)$_n$—CONH—R$_5$, —CR$_6$R$_7$—COO—R$_8$, or —(CH$_2$)$_n$—OCOCH$_3$;

R$_3$ represents a hydrogen atom, an alkali metal atom, or an alkyl group having 1 to 2 carbon atoms;

R$_4$ represents a hydroxy group, an alkoxy group having 1 to 2 carbon atoms, an alkenyloxy group having 2 to 5 carbon atoms, a SO$_3$Na group, an OSO$_3$Na group, a phenylalkyl group where an alkyl portion of the phenylalkyl group has from 1 to 3 carbon atoms, or a naphthylalkyl group where an alkyl portion of the naphthylalkyl group has from 1 to 3 carbon atoms;

R$_5$ represents an alkyl group having 1 to 20 carbon atoms, an alkenyl group having 1 to 20 carbon atoms, or a hydroxyalkyl group having 1 to 12 carbon atoms;

R$_6$ represents a hydrogen atom or a methyl group;

R$_7$ represents an alkyl group having 1 to 4 carbon atoms;

R$_8$ represents an alkyl group having 1 to 5 carbon atoms; and n is an integer of from 1 to 12.

2. The inkjet ink according to claim 1, further comprising a coloring material.

3. The inkjet ink according to claim 1, wherein the phenyl group and the naphthyl group in the R$_1$ and the R$_2$ and the phenylalkyl group and the naphthylalkyl group in the R$_4$ may have a substituent, and wherein the substituent is at least one selected from the group consisting of an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group.

4. The inkjet ink according to claim 1, wherein the R$_1$ and the R$_2$ are each —(CH$_2$)$_2$—OH.

5. A coloring composition comprising:

a stilbene-based compound represented by General Formula (1) below; and a coloring material,

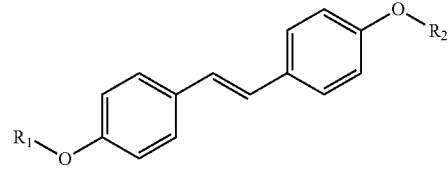

General Formula (1)

where in the General Formula (1), R$_1$ and R$_2$ each independently represent an alkyl group having 1 to 20 carbon atoms, an alkenyl group having 1 to 20 carbon atoms, a phenyl group, a naphthyl group, or a group represented by —(CH$_2$)$_n$—COO—R$_3$, —(CH$_2$)$_n$—R$_4$, —(CH$_2$)$_n$—CONH—R$_5$, —CR$_6$R$_7$—COO—R$_8$, or —(CH$_2$)$_n$—OCOCH$_3$;

R$_3$ represents a hydrogen atom, an alkali metal atom, or an alkyl group having 1 to 2 carbon atoms;

R$_4$ represents a hydroxy group, an alkoxy group having 1 to 2 carbon atoms, an alkenyloxy group having 2 to 5 carbon atoms, a SO$_3$Na group, an OSO$_3$Na group, a phenylalkyl group where an alkyl portion of the phenylalkyl group has from 1 to 3 carbon atoms, or a naphthylalkyl group where an alkyl portion of the naphthylalkyl group has from 1 to 3 carbon atoms;

R$_5$ represents an alkyl group having 1 to 20 carbon atoms, an alkenyl group having 1 to 20 carbon atoms, or a hydroxyalkyl group having 1 to 12 carbon atoms;

R$_6$ represents a hydrogen atom or a methyl group;

R$_7$ represents an alkyl group having 1 to 4 carbon atoms;

R$_8$ represents an alkyl group having 1 to 5 carbon atoms; and n is an integer of from 1 to 12.

* * * * *